United States Patent
Takahashi et al.

(10) Patent No.: US 8,165,459 B2
(45) Date of Patent: Apr. 24, 2012

(54) REPRODUCING APPARATUS

(75) Inventors: Kota Takahashi, Chofu (JP); Yasuo Masaki, Daito (JP)

(73) Assignees: The University of Electro-Communications, Chofu-shi (JP); Funai Electric Co., Ltd., Daito-shi (JP)

( * ) Notice: Subject to any disclaimer, the term of this patent is extended or adjusted under 35 U.S.C. 154(b) by 1204 days.

(21) Appl. No.: 11/935,745

(22) Filed: Nov. 6, 2007

(65) Prior Publication Data

US 2008/0279528 A1    Nov. 13, 2008

(30) Foreign Application Priority Data

May 7, 2007    (JP) .................................. 2007-122542

(51) Int. Cl.
 *H04N 5/91*   (2006.01)
(52) U.S. Cl. ....................................................... 386/353
(58) Field of Classification Search .................... 386/353
 See application file for complete search history.

(56) References Cited

U.S. PATENT DOCUMENTS 7,363,232 B2 *   4/2008   Megeid et al. ................. 704/503
2003/0165327 A1 *   9/2003   Blair et al. ....................... 386/75

FOREIGN PATENT DOCUMENTS

| JP | 10-257596 A | 9/1998 |
| JP | 2001-94948 A | 4/2001 |
| JP | 2001-103401 A | 4/2001 |
| JP | 2001-222300 A | 8/2001 |
| JP | 2006-127647 A | 5/2006 |

* cited by examiner

*Primary Examiner* — Peter Poltorak
(74) *Attorney, Agent, or Firm* — Crowell & Moring LLP

(57) ABSTRACT

Disclosed is a reproducing apparatus to reproduce reproduction data at a speed different from a speed at a time of recording of the reproduction data, the recording apparatus including: a storage section to store the reproduction data; a primary reproducing plan producing section to produce a primary reproducing plan ranging from present time to future, according to the reproduction speed different from the speed at the time of recoding the reproduction data; and a secondary reproducing plan producing section to modify to the primary reproducing plan by solving an optimization problem based on the primary reproducing plan produced by the primary reproducing plan producing section, so as to produce a secondary reproducing plan ranging from the present time to the future.

20 Claims, 21 Drawing Sheets

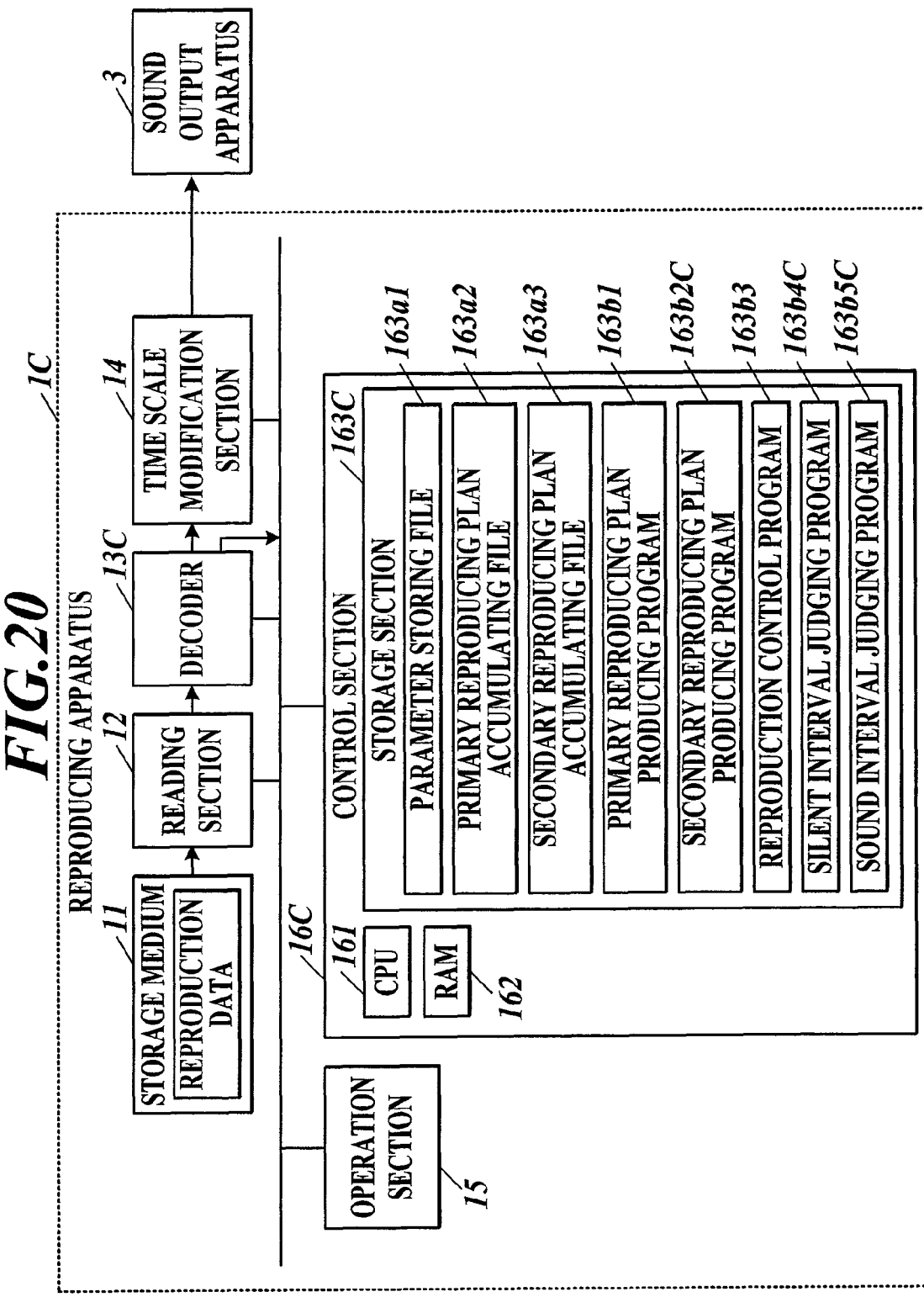

REPRODUCING APPARATUS

BACKGROUND OF THE INVENTION

1. Field of the Invention

The present invention relates to a reproducing apparatus to perform a variable speed reproducing.

2. Description of Related Art

A reproducing apparatus such as a video cassette recorder (VCR), a digital versatile disc (DVD) recorder, or a hard disk recorder is adapted to enable a user to skip the part that the user does not want to hear or see, or to repeatedly hear and see a necessary part, during reproduction of reproduction data composed of sound data and/or image data by freely using a "fast-forward button," a "rewind button," and the like, provided in a remote controller (hereinafter referred to as a "remote control").

However, for example, if the reproduction speed is shifted from a normal speed (1×-speed) to a 2×-speed by an instruction of a user and is fixed as it is, then the reproduction speed is changed from the normal speed to the 2×-speed in a moment. Consequently, human hearing processing cannot cope with the change, and the reproducing apparatus thus has a problem of the occurrence of failing to hear the necessary part.

Moreover, it is also known that, for example, if the time of high-speed reproduction such as 3×-speed reproduction is continued for 10 seconds or longer, the reproduced contents cannot be heard in almost all the cases, but that, if the continuation is made to be a short time for about 0.5 seconds, there is no failing to hear the contents in many cases.

The control of the reproduction speed of reproduction data to gradually change the reproduction speed dependently on the mechanical characteristics of a VCR and the control of the reproduction speed to stepwise increase/decrease the reproduction speed have been conventionally performed.

Moreover, the method of smoothly according an image with a sound was proposed (see, for example, Japanese Patent Application Laid-Open Publication No. 2001-103401). The method reproduces image data at a measurably increased speed, at a stepwise increased speed, or at a speed controlled by a spline function in order to reproduce the image data without causing any uncomfortable feelings when sound data is made to jump to a discontinuous position.

Moreover, the following two methods were proposed as the techniques of artificially changing a reproduction speed in order to make a change of the reproduction speed comfortable for a human being (see, for example, Japanese Patent Application Laid-Open Publications No. 2001-94948 and No. 2006-127647). The method disclosed in the JP-A No. 2001-94948 smoothly connects a reproduced part to the present broadcast by reducing the reproduction speed just before catching up with the present broadcast at the time of the follow-up reproduction (fast-forward reproduction up to the scene that is presently broadcasted). The method disclosed in the JP-A No. 2006-127647 divides a frame into the first half block and the second half block at the time of the high-speed reproduction of sound data to perform fade-out processing making the attenuation factor of the sound data gradually larger in the first half block, and to perform fade-in processing making the attenuation factor of the sound data gradually smaller in the second half block, and overlap the sound data of the first half block subjected to the fade-out processing with the sound data of the second half block subjected to the fade-in processing to smoothly connect the frames in the front and in the rear.

Now, the technique called as the time scale modification (TSM) of sound has been already publicly known as the technique of modifying the speech speed of a sound based on sound data so as to be easy for a user to hear (see, for example, Japanese Patent Application Laid-Open Publication No. Hei 10-257596). The use of the time scale modification technique enables the length of a sound to be changed without changing the height (pitch) of the sound.

Moreover, the method of determining a reproduction plan to make it easy to hear a sound on the premise of the time scale modification technique was proposed (see, for example, Japanese Patent Application Laid-Open Publication No. 2001-222300). The method disclosed in the JP-A 2001-222300 slowly reproduces a sound at the beginning of a document and rapidly reproduces the sound at the end of the document, and the reproduction plan of the method thereby makes it more easy to hear the sound in comparison with the case where the reproduction speed is the same at the beginning and at the end of a document even though the reproducing time is the same.

However, the aforesaid control of the reproduction speed of reproduction data to gradually change the reproduction speed dependently on the mechanical characteristics of a VCR and the control of the reproduction speed to stepwise increase/decrease the reproduction speed are only for moderating the degree of the disadvantages caused by a sudden change of the reproduction speed of reproduction data to the last, and are not the control able to optimally adjust the change of the reproduction speed of the reproduction data on the basis of human properties. Furthermore, the control methods cannot also optimally adjust the change of the reproduction speed of the reproduction data in consideration of the existence of an allowable range of the duration of high-speed reproduction.

Moreover, the JP-A No. 2001-103401 does not discloses the method of determining the optimal speed change, and the disclosed technique is only for moderating the degree of the disadvantage caused by a sudden change of the reproduction speed of reproduction data to the last. The technique cannot optimally adjust the change of the reproduction speed of the reproduction data on the basis of the human property.

Moreover, because the techniques disclosed in the JP-A No. 2001-94948 and No. 2006-127647 artificially change the reproduction speed, the techniques have a problem of causing an unnatural feeling for a human being. Furthermore, because the changes of the reproduction speeds by the techniques disclosed in the JP-A No. 2001-94948 and No. 2006-127647 are expedient and have no criterion of the optimality, they are also only for moderating the degree of the disadvantage caused by the sudden change of the reproduction speed of the reproduction data, and cannot optimally adjust the change of the reproduction speed of the reproduction data on the basis of the human property.

Moreover, the JP-A No. Hei 10-257596 discloses the technique for reproducing a clear sound on the basis of the determined reproduction plan (that is, the technique for reproducing a sound without generating noises), and does not discloses the technique to determine a reproduction plan for optimally adjusting the change of the reproduction speed of reproduction data on the basis of the human property.

Moreover, because the JP-A No. 2001-222300 does not describe the determination of the reproduction plan in the situation including fast-forward reproduction, the disclosure of the JP-A No. 2001-222300 does not enable the determination of the reproduction plan for optimally adjusting the change of the reproduction speed of reproduction data on the basis of the human property when a user instructs the fast-forward reproduction.

SUMMARY OF THE INVENTION

It is an object of the present invention to provide a reproducing apparatus capable of performing variable speed reproduction of reproduction data in the state in which it is easy for a user to perform looking and listening.

In order to achieve the above object, according to a first aspect of the present invention, there is provided a reproducing apparatus to reproduce reproduction data at a speed different from a speed at a time of recording of the reproduction data, the recording apparatus comprising:

a storage section to store the reproduction data;

a primary reproducing plan producing section to produce a primary reproducing plan ranging from present time to future, according to the reproduction speed different from the speed at the time of recoding the reproduction data; and a secondary reproducing plan producing section to modify to the primary reproducing plan by solving an optimization problem based on the primary reproducing plan produced by the primary reproducing plan producing section, so as to produce a secondary reproducing plan ranging from the present time to the future.

According to a second aspect of the invention, there is provided a reproducing apparatus to reproduce reproduction data at a speed different from a speed at a time of recording of the reproduction data when the reproduction data is reproduced, the recording apparatus comprising:

a storage section to store the reproduction data;

an instruction section to instruct the reproduction speed of the reproduction data stored in the storage section;

a primary reproducing plan producing section to produce a primary reproducing plan ranging from present time to future, according to the reproduction speed instructed by the instruction section;

a secondary reproducing plan producing section to modify the primary reproducing plan by solving an optimization problem based on the primary reproducing plan produced by the primary reproducing plan producing section, so as to produce a secondary reproducing plan ranging from the present time to the future;

an obtainment section to obtain the reproduction data from the storage section in accordance with the secondary reproducing plan produced by the secondary reproducing plan producing section; and an output control section to allow a predetermined output apparatus to output the reproduction data obtained by the obtainment section, wherein the optimization problem is solved by using a nonlinear programming method as a nonlinear programming problem so that a vector falls into a previously set region expressing an identifiable condition, the region located in a plane or a space that geometrically includes the vector, the vector having a linear function or a nonlinear function including at least one of a reproduction position, a reproduction speed, and reproduction acceleration by the secondary reproducing plan as an element thereof, as a constraint condition in order to minimize or maximize a predetermined value, as an objective function, and the predetermined value includes a difference between the primary reproducing plan and the secondary reproducing plan in a linear function or a nonlinear function.

According to a third aspect of the present invention, there is provided a reproducing apparatus to reproduce reproduction data at a speed different from a speed at a time of recording of the reproduction data when the reproduction data is reproduced, the recording apparatus comprising:

a storage section to store the reproduction data;

an instruction section to instruct the reproduction speed of the reproduction data stored in the storage section;

a primary reproducing plan producing section to produce a primary reproducing plan ranging from present time to future, according to the reproduction speed instructed by the instruction section;

a secondary reproducing plan producing section to produce a secondary reproducing plan ranging from the present time to the future, in which the secondary reproducing plan is produced by modifying the primary reproducing plan and is based on the primary reproducing plan produced by the primary reproducing plan producing section;

an obtainment section to obtain the reproduction data from the storage section in accordance with the secondary reproducing plan produced by the secondary reproducing plan producing section; and an output control section to allow a predetermined output apparatus to output the reproduction data obtained by the obtainment section, wherein the secondary reproducing plan producing section produces the secondary reproducing plan, where: a vector satisfies a constraint condition that the vector falls in a previously set region expressing an identifiable condition, the region located in a plane or a space that geometrically includes the vector, the vector having at least one linear combination of a reproduction position, the reproduction speed, and a reproduction acceleration by the secondary reproducing plan as an element thereof; the secondary reproducing plan is to minimize or maximize a predetermined value; and the reproduction acceleration is within a predetermined range and is constant in a previously set time interval, and the predetermined value includes a difference between the primary reproducing plan and the secondary reproducing plan.

According to a fourth aspect of the present invention, there is provided a reproducing apparatus to reproduce reproduction data at a speed different from a speed at a time of recording of the reproduction data, the reproduction data composed of sound data, the recording apparatus comprising:

a storage section to store the reproduction data;

an instruction section to instruct the reproduction speed of the reproduction data stored in the storage section;

a primary reproducing plan producing section to produce a primary reproducing plan ranging from present time to future, according to the reproduction speed instructed by the instruction section;

a secondary reproducing plan producing section to modify the primary reproducing plan by solving an optimization problem based on the primary reproducing plan produced by the primary reproducing plan producing section, so as to produce a secondary reproducing plan ranging from the present time to the future;

an obtainment section to obtain the reproduction data from the storage section in accordance with the secondary reproducing plan produced by the secondary reproducing plan producing section;

a time scale modification section to modify a time scale of the reproduction data in consideration of a coincidence factor of a waveform of the reproduction data obtained by the obtainment section; and an output control section to allow a predetermined output apparatus to output the reproduction data the time scale of which is modified by the time scale modification section, wherein the optimization problem is solved by using a linear programming method as a linear programming problem so that a vector falls into a previously set region expressing an identifiable condition in a plane that geometrically includes the vector, the vector having a linear combination of a reproduction position by the secondary reproducing plan as an element thereof, as a constraint condition in order to minimize a sum of a difference between the primary reproducing plan and the secondary reproducing plan and a magnitude of reproduction acceleration by the secondary reproducing plan, as an objective function.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 20 is a diagram showing the functional configuration of a reproducing apparatus of a modification 3;

DETAILED DESCRIPTION OF THE PREFERRED EMBODIMENTS

In the following, the best modes of the reproducing apparatus according to the present invention will be described in detail with reference to the accompanying drawings. Incidentally, the scope of the present invention is not limited to the shown examples.

<Outline of Fundamental Experiments>

An outline of fundamental experiments performed in order to find human properties is first described before the description of the configuration and the like (embodiment) of a reproducing apparatus 1 according to the present invention.

If "the limitation of a reproduction speed change that a human being can hear" can be quantified, then the reproducing apparatus 1 can reproduce reproduction data on the basis of the limitation. Consequently, it becomes possible to provide the most temporally efficient looking and listening to a viewer. Moreover, if "the limitation of a reproduction speed change by which a human being does not feel any stresses" can be quantified, then the reproducing apparatus 1 can reproduce reproduction data on the basis of the limitation. Consequently, it becomes possible to enable a viewer to perform efficient looking and listening without causing any unpleasant feelings.

Accordingly, an experimental apparatus 1000 capable of presenting a sound the speech speed of which was changed at an arbitrary speed change to a subject was produced in order to find the human properties, and the following experiments were performed.

Figure 1:
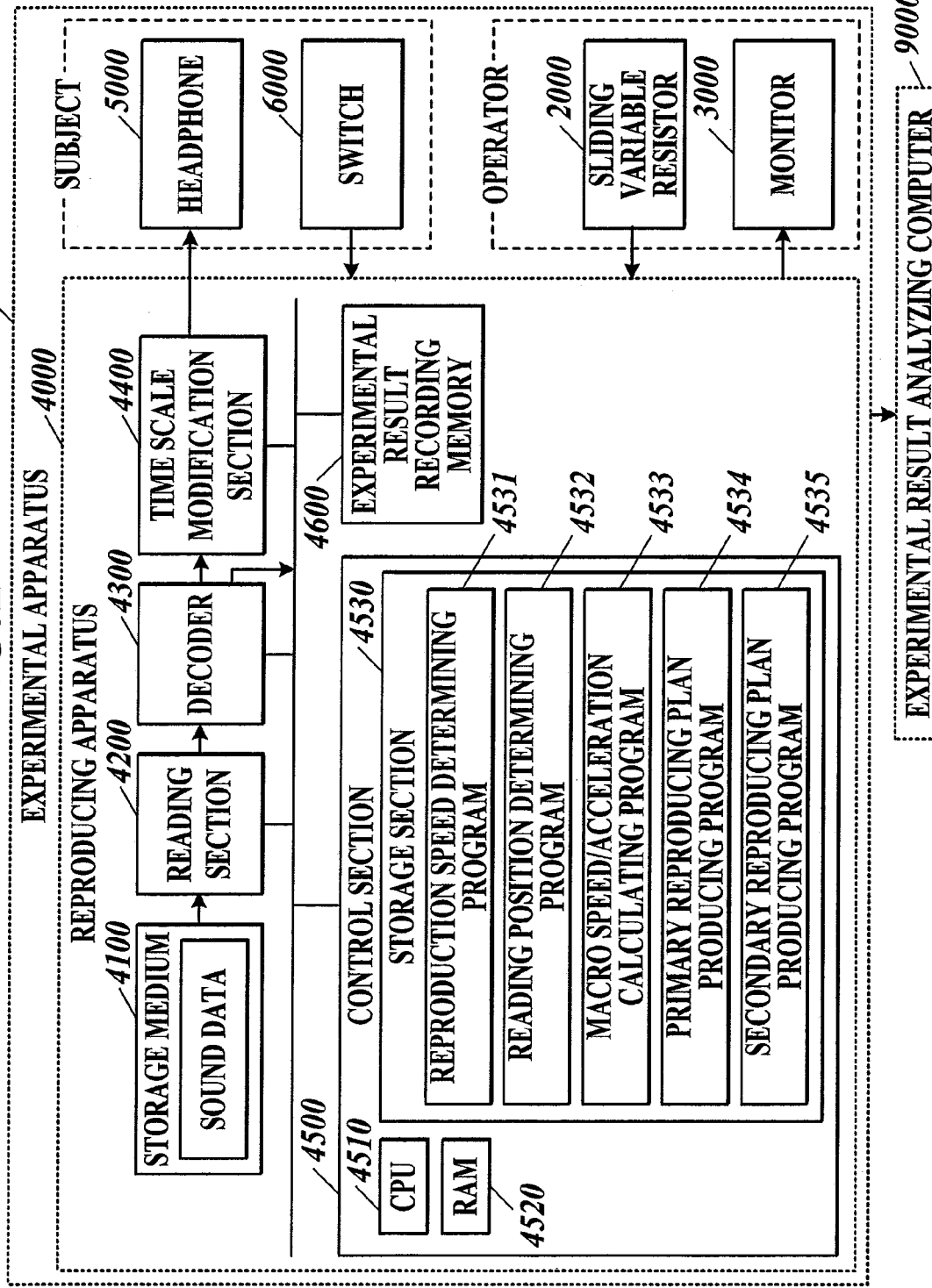
FIG. 1 is a diagram showing the functional configuration of an experimental apparatus for performing fundamental experiments.

The experimental apparatus 1000 was composed of, for example, a sliding variable resistor 2000, a monitor 3000, a digital signal processing apparatus 4000, a headphone 5000, and a switch 6000, as shown in FIG. 1.

For example, as shown in FIG. 1, the experimental apparatus 1000 was configured so that an operator looked at the screen of the monitor 3000 while the operator operated the sliding variable resistor 2000, and so that a subject listened to the sound output from the headphone 5000 while the subject operated the switch 6000.

Moreover, the experimental apparatus 1000 was connected to, for example, an experimental result analyzing computer 9000 as shown in FIG. 1, and was configured so that the experimental results obtained by the experimental apparatus 1000 were analyzed by the experimental result analyzing computer 9000.

The operator, for example, operated the sliding variable resistor 2000 to change the reproduction speed of sound data stored in a storage medium 4100 on occasion.

To put it concretely, the operator looked at, for example, a macro speed-acceleration plane diagram displayed on the monitor 3000 while the operator operated the sliding variable resistor 2000 so that the loci of a reproduction plan of sound data thoroughly filled up a macro speed-acceleration plane (described below).

The digital signal processing apparatus 4000, for example, reproduced the sound data stored in the storage medium 4100, such as a secure digital (SD) memory card, at the reproduction speeds according to the positions of the sliding variable resistor 2000, and recoded the experimental results.

To put it concretely, the digital signal processing apparatus 4000 was composed of, for example, the storage medium 4100, a reading section 4200, a decoder 4300, a time scale modification section 4400, a control section 4500, and an experimental result recording memory 4600, as shown in FIG. 1.

The control section 4500 was composed of, for example, a central processing unit (CPU) 4510, a random access memory (RAM) 4520, and a storage section 4530, as shown in FIG. 1.

The storage section 4530 stored, for example, a reproduction speed determining program 4531, a reading position determining program 4532, a macro speed/acceleration calculating program 4533, a macro speed/acceleration graphing program 4534, and a sound intensity calculating program 4535, as shown in FIG. 1.

The CPU 4510 executed, for example, the reproduction speed determining program 4531 to determine a reproduction speed V(t) according to a position of the sliding variable resistor 2000.

Next, the CPU 4510 executed, for example, the reading position determining program 4532, and determined a reading position of sound data stored in the storage medium 4100 on the basis of the determined reproduction speed V(t).

Next, the reading section 4200 obtained, for example, the sound data situated at the determined reading position among the sound data stored in the storage medium 4100 to output the obtained sound data to the decoder 4300 in accordance with a control signal input from the control section 4500.

Next, the decoder 4300 performed, for example, predetermined processing such as decoding to the sound data input from the reading section 4200 to output the decoded sound data to the time scale modification section 4400 and the control section 4500 in accordance with a control signal input from the control section 4500.

Next, the time scale modification section 4400 modified the time scale of the sound data input from the decoder 4300 by the use of, for example, the existing time scale modification technique (such as the TSM), which changed only the speech speed of the sound data without changing the pitch thereof not to generate abnormal noises, and output the sound data to the headphone 5000 through a not-shown amplifier in accordance with a control signal input from the control section 4500.

Hereby, the sound based on the sound data was led to be output from the headphone 5000.

Moreover, the CPU 4510 executed, for example, the macro speed/acceleration calculating program 4533 to calculate a macro speed (described below) and macro acceleration (described below) on the basis of the determined reproduction speed V(t).

Next, the CPU 4510 executed, for example, the macro speed/acceleration graphing program 4534 to graph the calculated macro speed and the calculated macro acceleration, and produced a macro speed-acceleration plane diagram drawing the loci of the reproduction plan (reproduction speed changes) instructed by the operator to make the monitor 3000 display the macro speed-acceleration plane diagram.

Moreover, the CPU 4510 executed, for example, the sound intensity calculating program 4535 to calculate sound intensity P(t) on the basis of the sound data input from the decoder 4300.

The subject heard, for example, the sound the reproduction speed of which was adjusted by an operation of the sliding variable resistor 2000 by the operator, and judged whether the subject could hear the words and the phrases of the sound or not.

To put it concretely, the subject heard, for example, the sound output from the headphone 5000. Then, the subject turned on the switch 6000 during the time interval when the subject heard no words and phrases, and turned off the switch 6000 during the time interval when the subject heard the words and the phrases.

Then, the CPU 4510 recorded, for example, the reproduction speed V(t) determined by the CPU 4510, which had executed the reproduction speed determining program 4531, and the state Z(t) of the switch 6000 in a time series into the experimental result recording memory 4600. The CPU 4510 simultaneously recorded, for example, the sound intensity P(t) calculated by the CPU 4510, which had executed the sound intensity calculating program 4535, into the experimental result recording memory 4600 in order to record whether the reproduced sound was the one in a silent interval or not.

To put it concretely, the expression method of the reproduction speed V(t) was determined, for example, as follows: V(t)=1.0 in the case of a normal speed at time t, V(t)=2.0 in the case of 2×-speed at the time t, and the like.

Moreover, the expression method of the state Z(t) of the switch 6000 was determined, for example, as follows: Z(t)=1 in the case of the "on" of the switch 6000 at the time t, and Z(t)=0 in the case of the "off" of the switch 6000 at the time t.

Then, the reproduction speed V(t), the state Z(t), and the sound intensity P(t) that were recorded in the experimental result recording memory 4600 were transferred to the experimental result analyzing computer 9000, and were analyzed by the experimental result analyzing computer 9000. Thereby, it was analyzed what a condition the reproduction speed V(t) should satisfy in order that a human being could hear words and phrases.

It was clear that the condition for a human being to hear words and phrases was not simple.

For example, if the condition was a simple one such as "if a reproduction speed is slower than 2.2×-speed, the sound reproduced at the reproduction speed can be heard," then the desired condition was V(t)<2.2.

However, for example, if the speed was raised from V(t)=1.0 to V(t)=2.2 over time, words and phrases could be frequently sufficiently heard. On the other hand, if the speed was raised from V(t)=1.0 to V(t)=2.2 in a moment, a human brain could not sufficiently cope with the speed change, and the failure to hear words and phrases frequently occurred for several seconds just after the change.

Furthermore, for example, if V(t)=10 was kept for 0.02 seconds and was returned to V(t)=1.0 just after the elapse of the period, the period of the high-speed reproduction was a fraction of a second, and consequently no problems occurred in the hearing of words and phrases frequently.

In view of the above facts, it was clear that the condition for a human being to hear words and phrases was not the simple one that could be written as "V(t)< constant."

Accordingly, it was regarded that the condition for a human being to hear words and phrases was essentially composed of a condition pertaining to two indices.

A first index was an average reproduction speed (hereinafter referred to as "macro speed $V_M(t)$") in a constant width time interval.

The reason why the first index was not set to an instantaneous reproduction speed but was set to the macro speed $V_M(t)$ was that a sound waveform having a certain determined length was necessary for identifying a phoneme, and that it was seemed that, when a sound was identified as words and phrases, the number of the words and phrases that could be processed per unit time was limited because the processing speed of a brain was limited.

Figure 2:
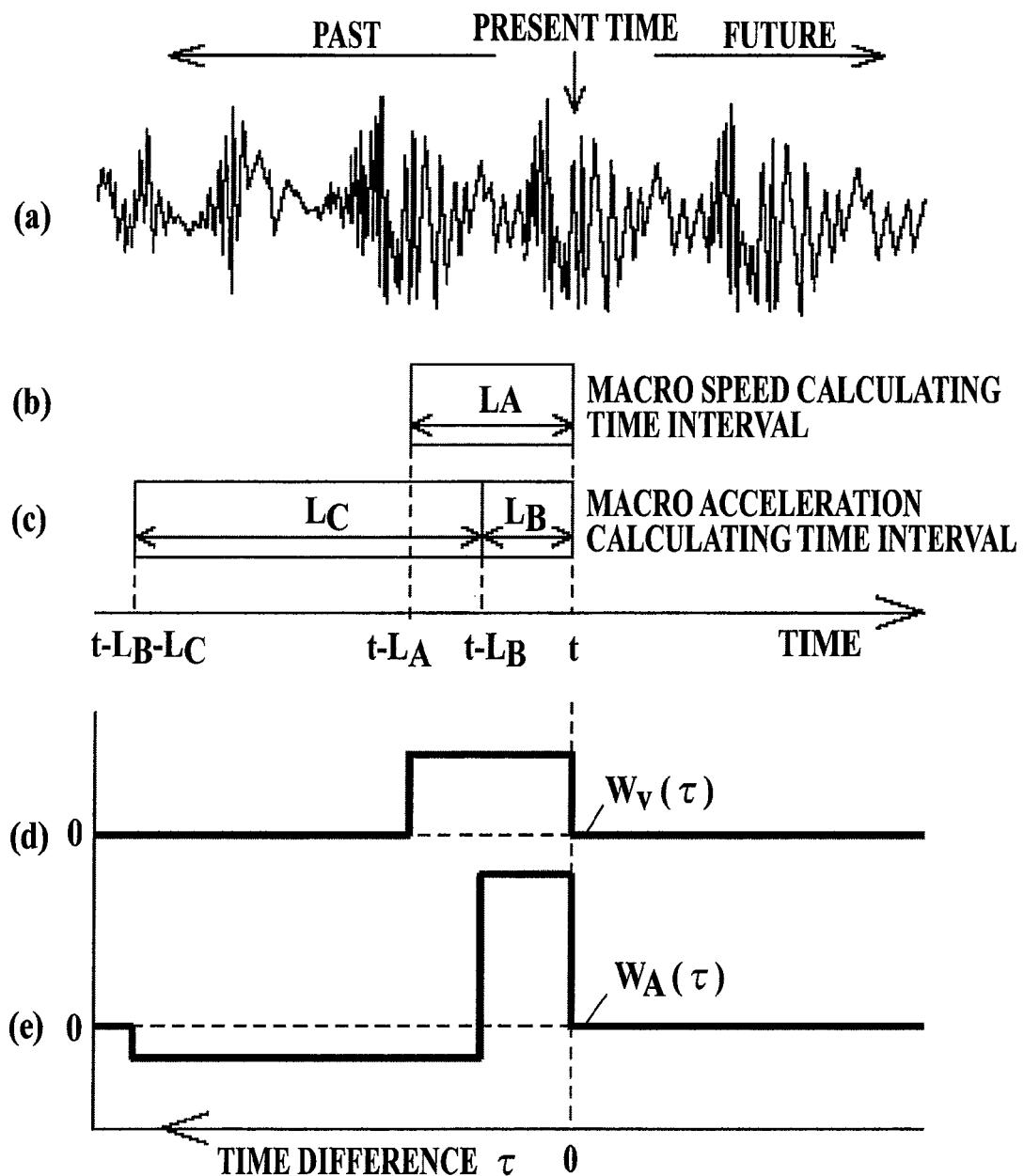
FIG. 2 is a diagram for illustrating a macro speed and macro acceleration.

For example, if the sound data (sound waveform data) to be reproduced was that shown in FIG. 2(a), then the macro speed $V_M(t)$ was defined, for example, as an average reproduction speed in a time interval $L_A$ ranging from the present time to $L_A$ seconds in past as shown in FIG. 2(b), that is, as the following formula (1).

$$V_M(t) = \frac{1}{L_A} \int_{t-L_A}^{t} V(t) dt \qquad (1)$$

Incidentally, the macro speed $V_M(t)$ could be also defined as the following formula (3) by weighting the average reproduction speed by a weighting function $W_V$ satisfying the condition of the following formula (2) as a more general form. FIG. 2(d) showed an example of the weighting function $W_V$ for realizing FIG. 2(b). At this time, $W_V(\tau)=1/L_A$.

$$\int_0^{L_A} W_V d\tau = 1 \qquad (2)$$

$$V_M(t) = \int_0^{L_A} W_V(\tau) V(t-\tau) d\tau \qquad (3)$$

The second index was reproduction acceleration (hereinafter referred to as "macro acceleration $A_M(t)$" in a constant width time interval.

The reason why the macro acceleration $A_M(t)$ was adopted as the second index was that it was considered that an index concerning acceleration was necessary because there was a difference in hearing of words and phrases between the case of changing a speech speed slowly and the case of changing the speech speed in a moment even though the speech speed was the same, as described above.

If the sound data (sound waveform data) to be reproduce was, for example, that as shown in FIG. 2(a), then the macro acceleration $A_M(t)$ was, for example, defined as the result of the following operations. That is, as shown in FIG. 2(c), two time intervals (for example, a time interval ranging from the present time to $L_B$ seconds in the past and a time interval ranging from the $L_B$ seconds in the past to the $L_B+L_C$ seconds in the past) for evaluating acceleration were determined, and a difference between the average reproduction speed in the time interval ranging from the present time to the $L_B$ seconds in the past and the average reproduction speed ranging from the $L_B$ seconds in the past to the $L_B+L_C$ seconds in the past was divided by the time difference between the centers of both the time intervals (that is, the time ranging from the center of the time interval ranging from the present time to the $L_B$ seconds in the past to the center of the time interval ranging from the $L_B$ seconds in the past to the $L_B+L_C$ seconds in the past). That is, the macro acceleration $A_M(t)$ was defined as the following formula (4).

$$A_M(t) = \frac{2}{L_B+L_C} \left( \frac{1}{L_B} \int_{t-L_B}^{t} V(t)dt - \frac{1}{L_C} \int_{t-L_B-L_C}^{t-L_B} V(t)dt \right) \qquad (4)$$

Incidentally, the macro acceleration $A_M(t)$ could be also defined as the following formula (6) by weighting the average reproduction speed by a weighting function $W_A$ satisfying the condition of the following formula (5) to perform the weighted averaging of the speed over a time length $L_E$, as a more general form.

$$\int_0^{L_E} W_A d\tau = 0 \qquad (5)$$

$$A_M(t) = \int_0^{L_E} W_A(\tau) V(t-\tau) d\tau \qquad (6)$$

Incidentally, in order to express the macro acceleration of the formula (4) by the formula (6), which was a general definition of macro acceleration, it was sufficient that the weighting function $W_A$ was adapted to be the following formulae (7)-(9) and the time length $L_E$ was adapted to be the following formula (10). If a concrete example was shown, for example, the macro acceleration of FIG. 2(c) could be expressed by the weighting function $W_A$ shown in FIG. 2(e).

$$W_A(\tau) = \frac{2}{(L_B+L_C)L_B} (0 \leq \tau < L_B) \qquad (7)$$

$$W_A(\tau) = \frac{-2}{(L_B+L_C)L_C} (L_B \leq \tau < L_B+L_C) \qquad (8)$$

$$W_A(\tau) = 0 \ (0 > \tau, \tau \geq L_B+L_C) \qquad (9)$$

$$L_E = L_B + L_C \qquad (10)$$

Now, the macro speed $V_M(t)$ and the macro acceleration $A_M(t)$ were those quantifying the human load pertaining to the hearing of words and phrases, and were originally different ones from each other. However, it was considered that the overall human load to hear words and phrases was determined by the combination of both of them.

Accordingly, the macro speed-acceleration plane was considered as a two-dimensional plane having an abscissa axis indicating macro speeds $V_M(t)$ and an ordinate axis indicating macro acceleration $A_M(t)$, and the condition (identifiable condition) for a human being to be able to hear words and phrases was considered to be the inside of a specific region in the macro speed-acceleration plane.

An operator could fill up the macro speed-acceleration plane with the loci of a reproduction plan by operating the sliding variable resistor 2000 while the operator looked at the loci of a vector having the elements of the macro speed $V_M(t)$ and the macro acceleration $A_M(t)$ (the loci of the reproduction plan) that were drawn in the macro speed-acceleration plane displayed on the monitor 3000. At this time, if parameters $L_A$, $L_B$, and $L_C$ capable of separating the region satisfying the identifiable condition in the macro speed-acceleration plane (the region in which the loci corresponding to $Z(t)=0$ were located) and the region not satisfying the identifiable condition (the region in which the loci corresponding to $Z(t)=1$ were located) at a higher degree of separation could be selected, the identifiable condition could be described as that nearer to the human property than the simple condition only composed of speeds.

Accordingly, the experiments were performed in order to search a set of the parameters $L_A$, $L_B$, and $L_C$ capable of separating the region satisfying the identifiable condition in the macro speed-acceleration plane and the region not satisfying the identifiable condition at a higher degree of separation.

Figure 3A:
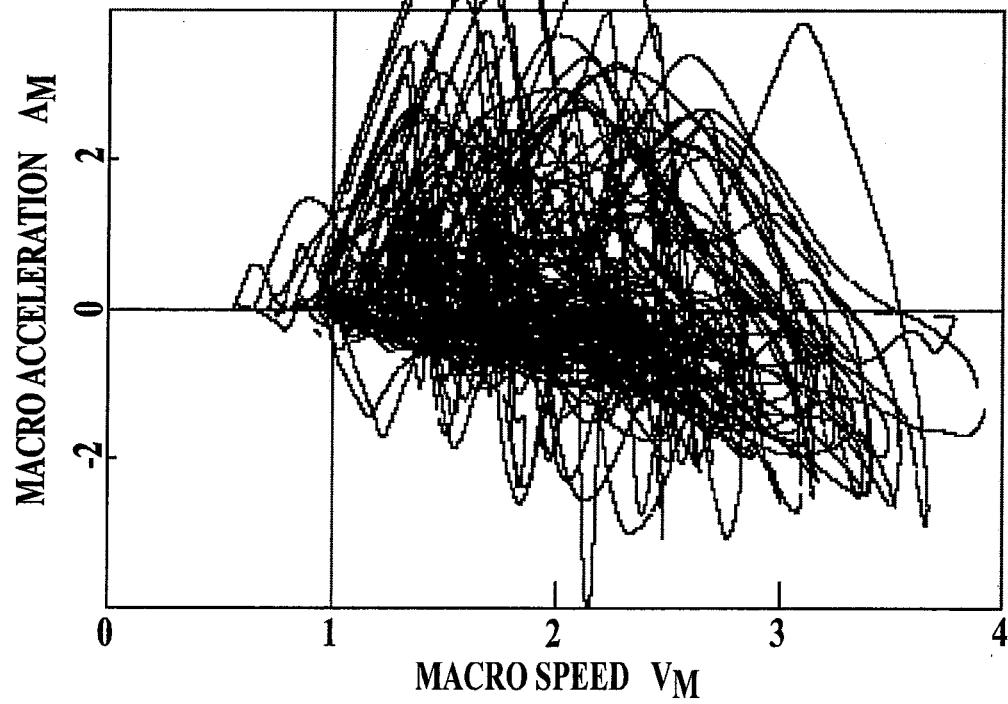
FIGS. 3A and 3B are diagrams showing the loci of a primary reproducing plan in a macro speed-acceleration plane in the case of $L_A$=2.0 seconds, $L_B$=0.5 seconds, and $L_C$=0.5 seconds.
Figure 3B:
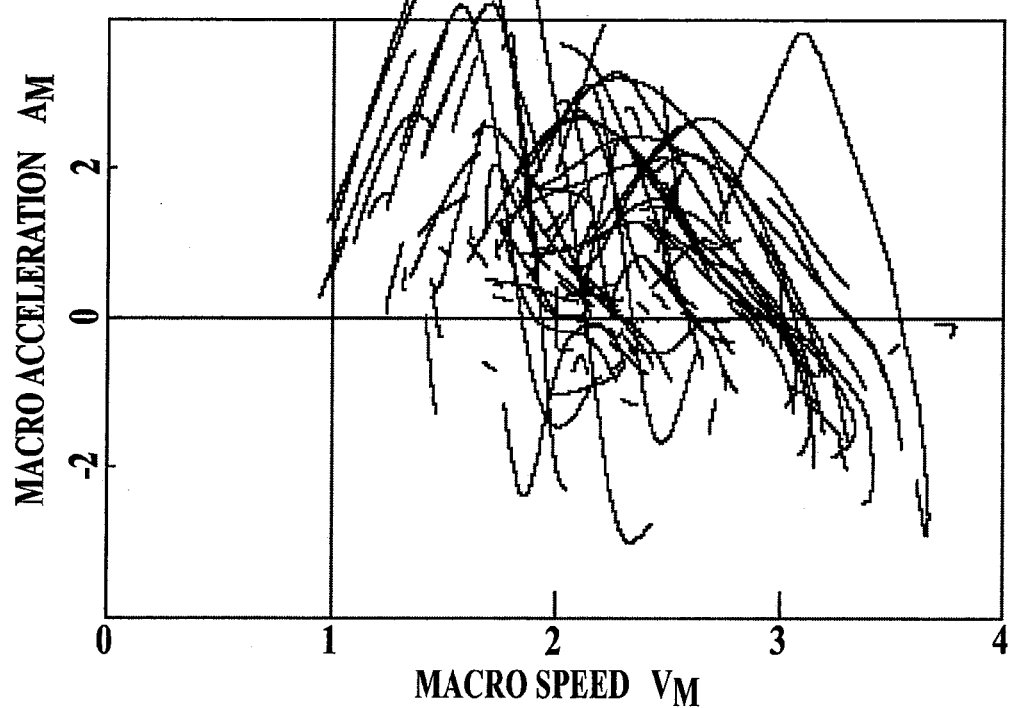
Figure 4A:
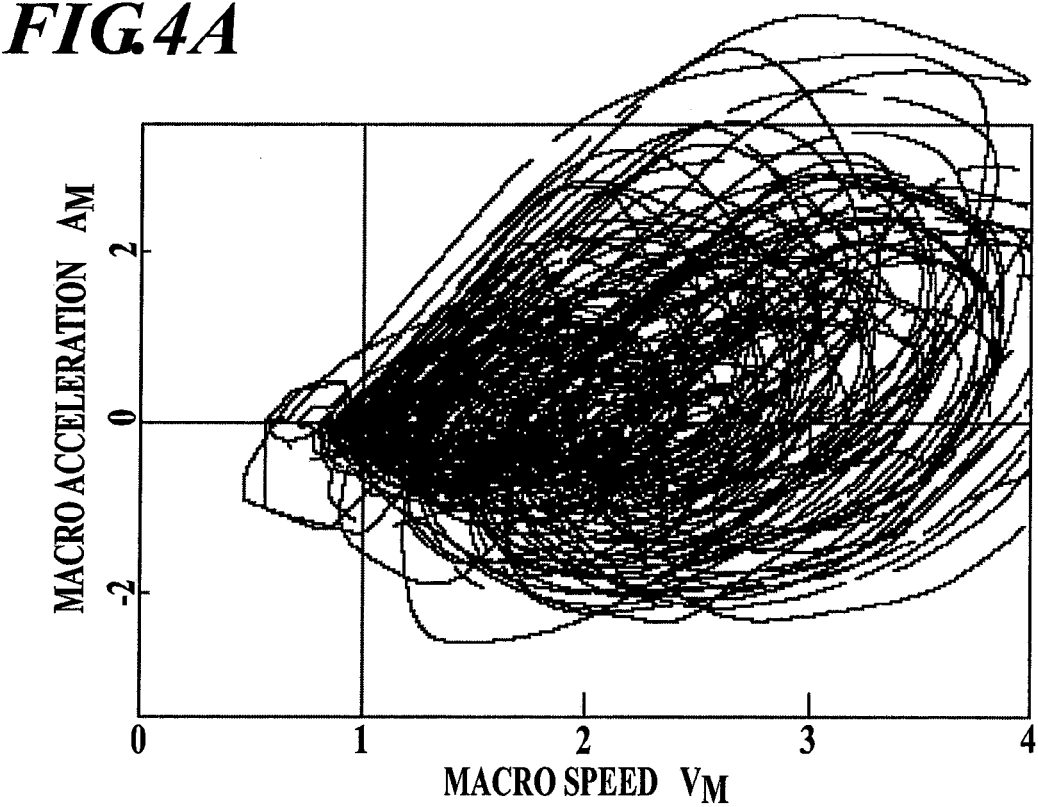
FIGS. 4A and 4B are diagrams showing the loci of the primary reproducing plan in the macro speed-acceleration plane in the case of $L_A$=0.5 seconds, $L_B$=0.25 seconds, and $L_C$=1.08 seconds.
Figure 4B:
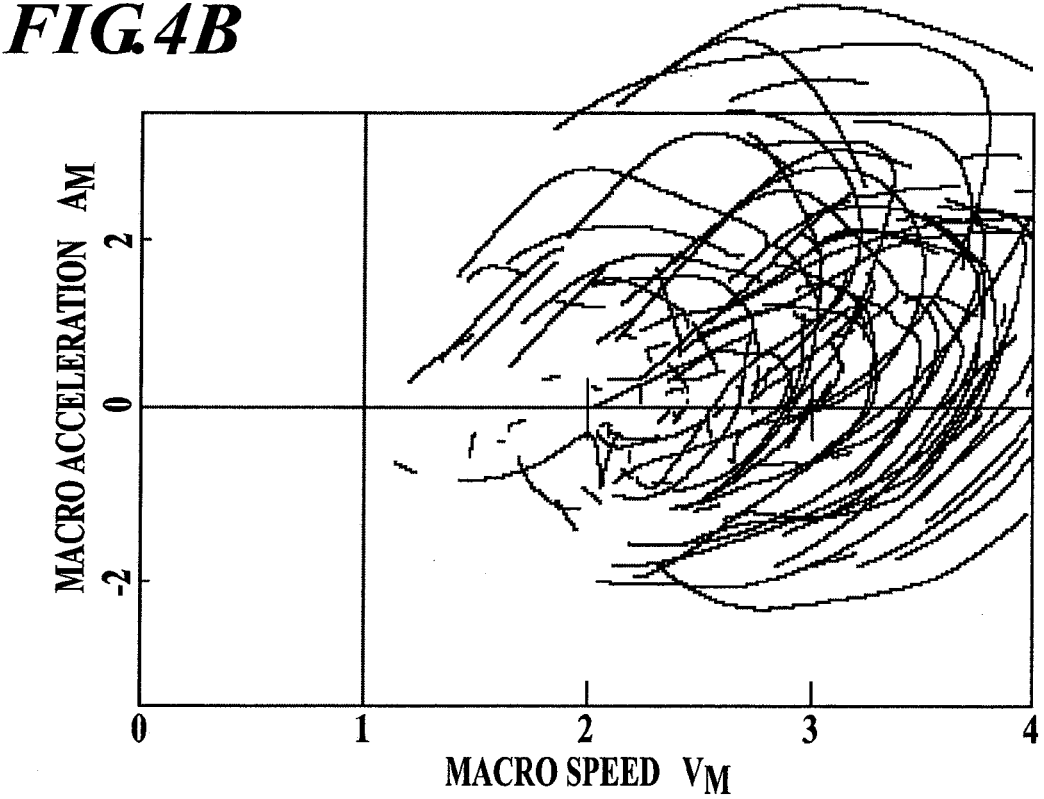

FIGS. 3A, 3B, 4A, and 4B were examples of the experimental results when a subject heard a sound based on certain sound data. FIGS. 3A and 3B showed the example of the selection of a not so much appropriate set of the parameters $L_A$, $L_B$, and $L_C$ (to put it concretely, $L_A$=2.0 seconds, $L_B$=0.5 seconds, and $L_C$=0.5 seconds), and FIGS. 4A and 4B showed an appropriate set of the parameters $L_A$, $L_B$, and $L_C$ (to put it concretely, $L_A$=0.5 seconds, $L_B$=0.25 seconds, $L_C$=1.08 seconds.

FIGS. 3A and 4A showed all loci of the reproduction plan for the reproducing time of 8 minutes and 40 seconds, and FIGS. 3B and 4B showed only the loci (the loci corresponding to $Z(t)=1$) in the time intervals during which the subject did not hear the words and the phrases among all the loci of the reproducing plan for the reproducing time of 8 minutes and 40 seconds by picking out them.

It was found by FIGS. 3A, 3B, 4A, and 4B that it was possible to separate the region satisfying the identifiable condition and the region not satisfying the identifiable condition at a higher degree of separation in the case shown in FIGS. 4A and 4B in comparison with the case shown in FIGS. 3A and 3B. That is, it was found by FIGS. 3A, 3B, 4A, and 4B that the different sets of the parameters $L_A$, $L_B$, and $L_C$ caused a difference in the separation of the region satisfying the identifiable condition and the region not satisfying the identifiable condition.

Figure 5:
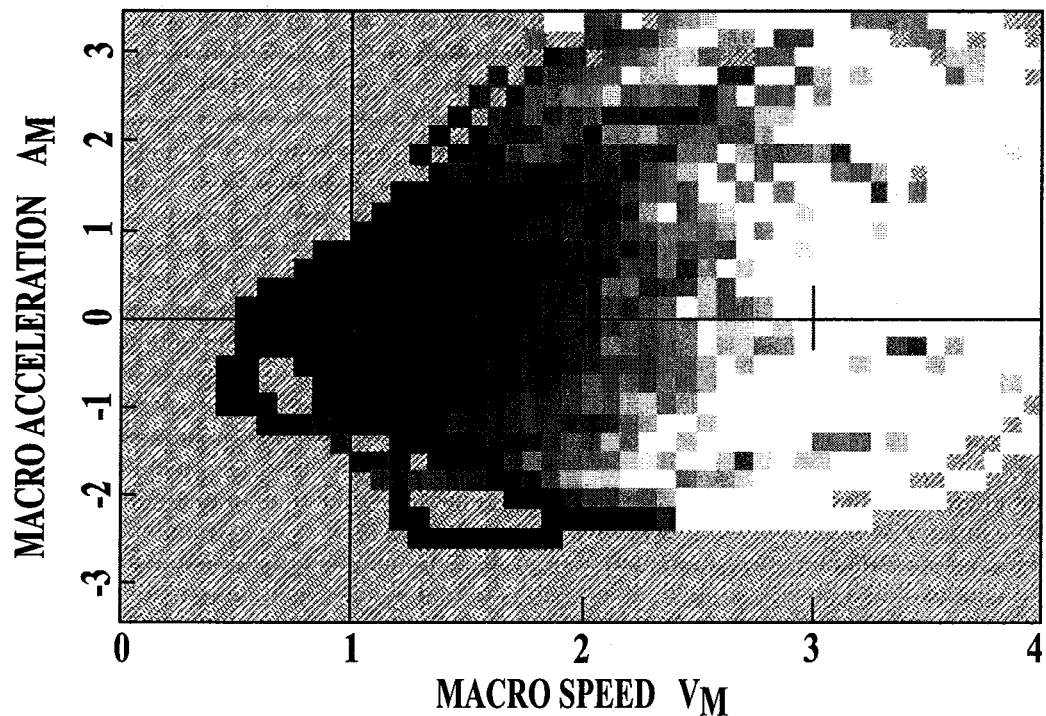
FIG. 5 is a diagram showing hearable rates obtained by summing up the results of a total of seven subjects in a macro speed-acceleration plane in the case of $L_A$=0.5 seconds, $L_B$=0.25 seconds, and $L_C$=1.08 seconds.

The experiments for searching the set of the parameters $L_A$, $L_B$, and $L_C$ ware performed to a total of 7 subjects and the summed-up results was shown in FIG. 5.

To put it concretely, FIG. 5 diagrammatized the hearable rates (the rates between $Z(t)=1$ and $Z(t)=0$) in a macro speed-acceleration plane in the case of selecting a set of an appropriate parameters $L_A$, $L_B$, and $L_C$ (concretely, $L_A$=0.5 seconds, $L_B$=0.25 seconds, and $L_C$=1.08 seconds). A deeper depth of gray showed a higher hearable rate, and a lighted depth of the gray showed a lower hearable rate. The white showed that nobody could hear. Incidentally, the oblique line region in the background was the region in which no loci of the reproduction plan passed.

It was found by FIG. 5 that the selection of the set of the appropriate parameters $L_A$, $L_B$, and $L_C$ would enable the separation of the region satisfying the identifiable condition in the macro speed-acceleration plane and the region not satisfying the identifiable condition at a higher degree of separation (that is, the judgment whether words and phrases could be heard or not could be performed at a higher accuracy). Moreover, it was also found that the case of using both of the macro speed $V_M(t)$ and the macro acceleration $A_M(t)$ would enable better division in comparison with the case of using any one of them at the time of the division of the region satisfying the identifiable condition and the region not satisfying the identifiable condition.

Figure 6:
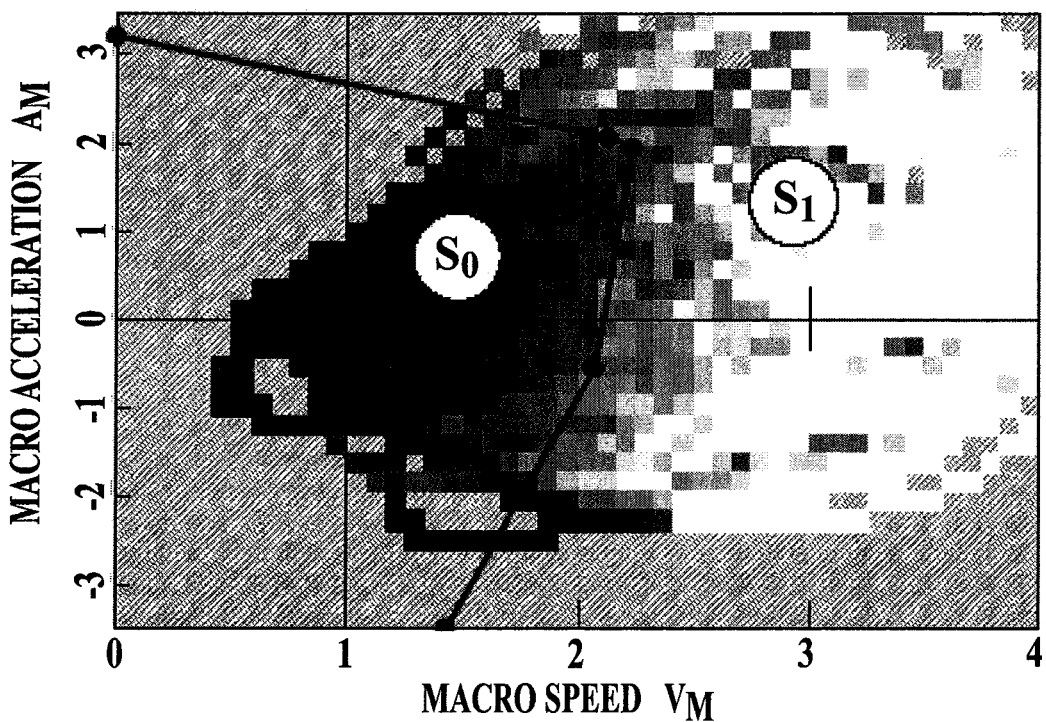
FIG. 6 is a diagram showing the case of dividing the macro speed-acceleration plane of FIG. 5 into a region in which an identifiable condition is satisfied and a region in which hearing is impossible.

The division of the macro speed-acceleration plane shown in FIG. 5 into a region ($S_0$) satisfying the identifiable condition and a region ($S_1$) not satisfying the identifiable condition was simply performed by producing a polygonal line by the use of several straight lines to separate the regions by the polygonal line as shown in FIG. 6.

To put it concretely, for example, the polygonal line shown in FIG. 6 was obtained by producing a program for searching a combination of four straight lines constituting the polygonal line that optimally divided the regions. The criterion of the optimality was to minimize the evaluation function $E_D$ of division expressed by the following formula (11).

$$E_D = W(\text{time length of } Z(t)=1 \text{ in } S_0)/(\text{whole time length}) + (\text{time length of } Z(t)=0 \text{ in } S_1)/(\text{whole time length}) \quad (11)$$

As shown in the formula (11), the evaluation function $E_D$ of division was the weighted sum of "the rate of the length of time during which hearing was impossible in spite of being in the region $S_0$ satisfying the identifiable condition to the length of the whole reproducing time" and "the rate of the length of time during which hearing was possible in spite of being the region $S_1$ not satisfying the identifiable condition to the length of the whole producing time." The weight W was a coefficient for imposing a large penalty on the former. If the weight W was set to, for example, about 6.0, then a good result could be obtained.

Incidentally, the number of the straight lines constituting the polygonal line was arbitrary, and the straight lines might be composed of, for example, two straight lines: one being parallel to the ordinate axis of the macro speed-acceleration plane, and the other being parallel to the abscissa axis thereof. In order to form the polygonal line in this manner, it was sufficient to linearly transform the macro speed $V_M(t)$ and the macro acceleration $A_M(t)$ to define a new macro speed and new macro acceleration. The region $S_0$ satisfying the identifiable condition could be defined only by the different upper limits given to the new macro speed and the new macro acceleration, and it was unnecessary to consider the straight lines being not parallel to the ordinate axis and the abscissa axis of the macro speed-acceleration plane. Consequently, the configuration of the polygonal line composed of the two parallel straight lines was useful for the simplification of the processing after that.

In any event, if the evaluation function $E_D$ of the division to the set of the certain parameters $L_A$, $L_B$, and $L_C$ was denoted by $E_D(L_A, L_B, L_C)$, the set of specific parameters $L_A$, $L_B$, and $L_C$ giving the minimum value to the evaluation function $E_D(L_A, L_B, L_C)$ could be found by using a program to determine the polygonal line to minimize the evaluation function $E_D$ of division (that is, the program to search the combination of the straight lines constituting the polygonal line which combination optimally divided the regions).

Accordingly, the experiments to examine the changes of the evaluation function $E_D$ of division were performed by changing the combination of the sets of the parameters $L_A$, $L_B$, and $L_C$.

Figure 7:
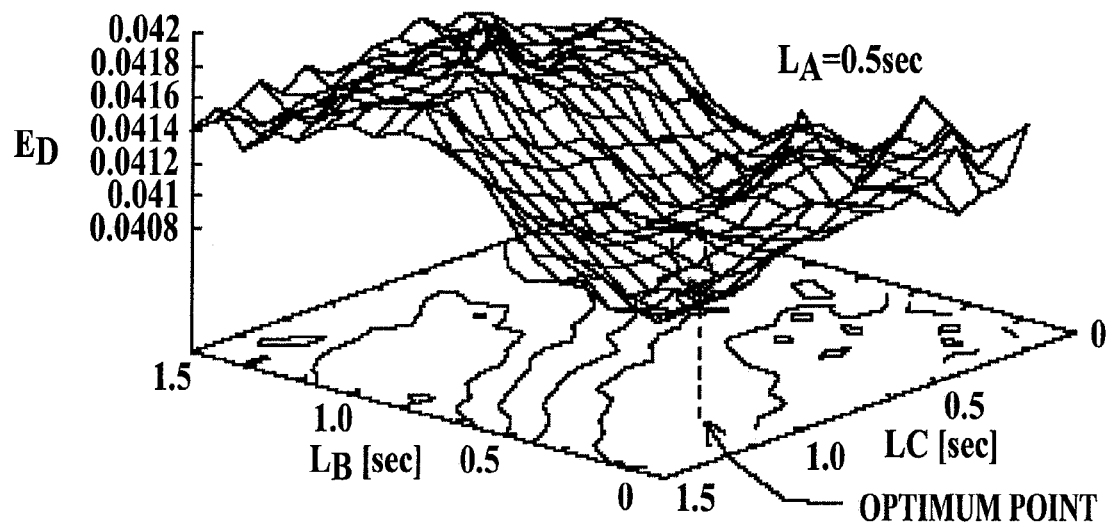
FIG. 7 is a diagram showing three-dimensionally plotted changes of an evaluation function $E_D$ of division in the case where $L_A$ is fixed to be 0.5 seconds and $L_B$ and $L_C$ are changed.

FIG. 7 is a graph obtained by three-dimensionally plotting the changes of the evaluation function $E_D$ of division when the parameter $L_A$ was fixed to 0.5 seconds and the parameters $L_B$ and $L_C$ were changed. The horizontal flat surface of FIG. 7 indicates an $L_B$-$L_C$ plane, and the vertical coordinates indicate the values of the evaluation function $E_D$ of division. That is, because the height direction indicates the magnitude of the evaluation function $E_D$ of division, the evaluation of a point becomes better as the point has a lower three-dimensionally plotted height. From this result, it was found that $L_B=0.25$ seconds and $L_C=1.08$ seconds were optimal in the case of $L_A=0.5$ seconds.

Figure 8:
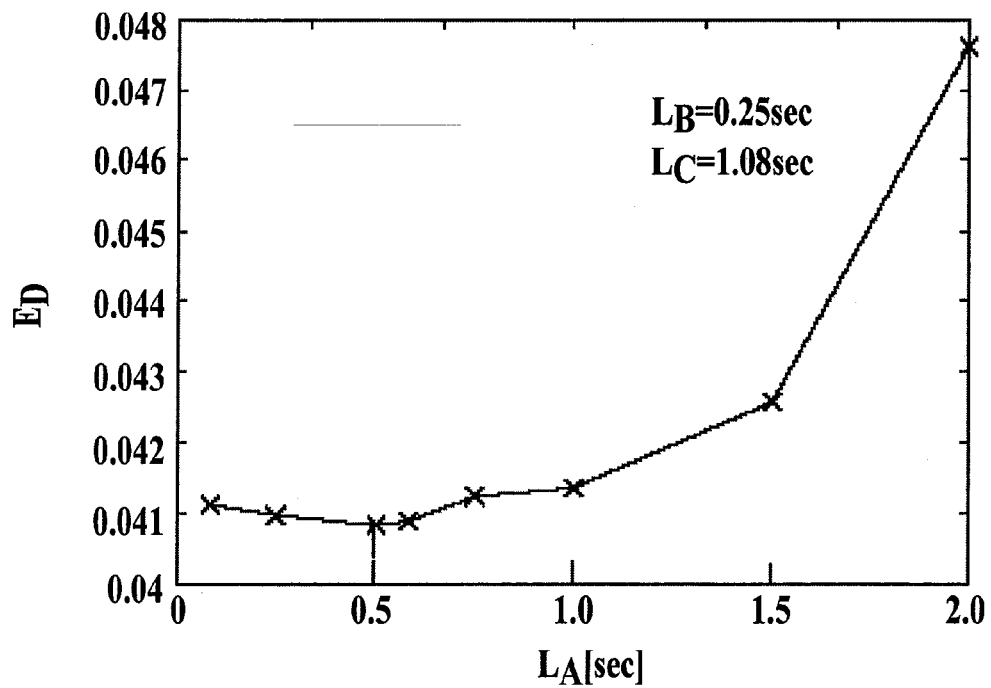
FIG. 8 is a diagram showing two-dimensionally plotted changes of the evaluation function $E_D$ of division in the case where the $L_A$ is changed and $L_B$ and $L_C$ are fixed to be 0.25 seconds and 1.08 seconds, respectively.

FIG. 8 shows the two-dimensionally plotted changes of the evaluation function $E_D$ of division when the parameters $L_B$ and $L_C$ were fixed to be 0.25 seconds and 1.08 seconds, respectively, and the parameter $L_A$ was changed. The abscissa axis of FIG. 8 indicates $L_A$, and the ordinate axis thereof indicates the evaluation function $E_D$ of division. From this result, it was found that the optimal value existed in the neighborhood of $L_A=0.5$ seconds in the case of $L_B=0.25$ seconds and $L_C=1.08$ seconds.

That is, from FIGS. 7 and 8, it was found that the set of $L_A=0.5$ seconds, $L_B=0.25$ seconds, and $L_C=1.08$ seconds was the optimal set of the parameters $L_A$, $L_B$, and $L_C$, though it was a provisional conclusion at that time.

Incidentally, because a time interval during which the energy of sounds was little was considered to be a silent interval, this sort of time interval was excluded from the analysis of the results of the present fundamental experiments. To put it concretely, for example, sound intensity P(t) recoded in the experimental result recording memory 4600 was used. The average sound intensity that was an average of the sound intensity P(t) for one second in total in a period before and after the sound intensity P(t) was calculated. If the average sound intensity was lower than a threshold value, the time interval was presumed to be a silent interval, and the average sound intensity was removed from the analysis. A value adjusted so that the rate of the silent intervals to the whole time interval might be about 10% was adopted as the threshold value.

Moreover, the reaction time of a subject for turning on/off the switch 6000 was also corrected by a predetermined method.

The experimental results of the present fundamental experiments were able to be concluded as follows. If an appropriate macro speed $V_M(t)$ and appropriate macro acceleration $A_M(t)$ are defined, whether a human being can hear words and phrases or not can be presumed from whether or not the locus of a vector composed of the elements of the macro speed $V_M(t)$ and the macro acceleration $A_M(t)$ (the locus of a reproduction plan) is within the region $S_0$ satisfying an identifiable condition among the regions demarcated by the division of a macro speed-acceleration plane with a polygonal line. Accordingly, in order to enable a user to hear words and phrases, it is sufficient to design a reproduction plan that is always within the region $S_0$ satisfying the identifiable condition.

Incidentally, because the values of $L_A=0.5$ seconds, $L_B=0.25$ seconds, and $L_C=1.08$ seconds and the inclinations and values of the polygonal lines shown in FIG. 6 were provisional conclusions at that time, these pieces of data do not limit the implementation of the present invention.

However, the following respect is universal, and this is the essence of the present invention. The respect is the following. The reproduction speeds in a certain constant width time interval are averaged by being weighted by the formula (3) or (6) (by obtaining linear sum) to produce two or more macro indices (for example, the macro speed $V_M(t)$ and the macro acceleration $A_M(t)$), and the possibility of hearing is judged on the basis of an inequality to the macro indices (for example, the inside of the polygonal line shown in the macro speed-acceleration plane of FIG. 6). That is, two or more linear combinations of the reproduction speeds in a constant time interval are produced, and the possibility of hearing is judged on the basis of whether or not the vector composed of the elements of these linear combinations falls in the previously set region $S_0$ indicating the identifiable condition of being in a plane including the vector geometrically (for example, the macro speed-acceleration plane).

<Formulation of Macro Speed and Macro Acceleration>

Next, a technique of formulating the macro speed and the macro acceleration that have been defined in the outline of the fundamental experiments is described.

The time marching at a reproduction speed specified by a user is defined to be a primary reproducing plan $P_1$, and a reproduction position by the primary reproducing plan $P_1$ at a time t is dented by $P_1(t)$. This means that a part of the reproduction data at a time coordinate $P_1(t)$ is reproduced at the time t in the world of the user.

On the other hand, the time marching that is produced by modifying the primary reproducing plan $P_1$ according to a human property is defined to be a secondary reproducing plan $P_2$, and the reproduction position by the secondary reproducing plan $P_2$ at the time t is denoted by $P_2(t)$.

Although the time t is essentially a continuous quantity expressed by "second" as a unit, it is convenient here to discretize the time t in the case of performing digital signal processing. Accordingly, it is supposed that the time scale is discretized at a sampling frequency $F_P$, and that the time t expresses a sampling number in discrete time. That is, it is supposed that t=0 indicates 0 second in user time, and that t=1 indicates $1/F_P$ second in the user time. Moreover, in the following, it is also supposed that the parameters $L_A$, $L_B$, and $L_C$, each indicating a time interval, are expressed by sample numbers at the sampling frequency $F_P$.

Incidentally, the value of the sampling frequency $F_P$ is arbitrary (preferably, about several Hz to about 100 Hz). If the sampling frequency $F_P$ is accorded with the frame frequency of an image (for example, 30 Hz or 60 Hz) when reproduction data is composed of sound data and image data, then mounting becomes easy.

Moreover, the time coordinates of reproduction data are also originally expressed by "seconds" as a unit. If the time coordinates are expressed by the sample numbers of the sound data constituting reproduction data at a sampling frequency $F_S$, the expression is convenient. For example, if the sampling frequency $F_S$ is 44.1 kHz, $P_1(t)=0$ indicates a starting point of the reproduction data, and $P_1(t)=1$ indicates a position at which time has elapsed by 1/44100 seconds from the starting point of the reproduction data.

If the expressions are settled as above, the macro speed $V_M(t)$ defined by the formula (1) can be written as the following formula (12) to a reproduction position $P_2(t)$ by the secondary reproducing plan $P_2$.

$$V_M(t) = \frac{F_P}{F_S L_A}(P_2(t) - P_2(t - L_A)) \quad (12)$$

The more general macro speed $V_M(t)$ defined by the formula (3) becomes a linear combination of the reproduction positions $P_2(t)$ at different time points similarly to the formula (12). That is, the more general macro speed $V_M(t)$ can be written as the following formula (14) by using a reproduction speed $V_2(t)$ by the secondary reproducing plan $P_2$, the reproduction speed $V_2(t)$ having a relation with the reproduction position $P_2(t)$ that can be expressed by the following formula (13). The formula (14) can be rewritten then as the following formula (15) or the following formula (16) by using the relation of the formula (13).

$$V_2(t) = \frac{F_P}{F_S}(P_2(t) - P_2(t-1)) \quad (13)$$

$$V_M(t) = \frac{1}{F_P}\sum_{\tau=0}^{L_A-1} W_V(\tau)V_2(t-\tau) \quad (14)$$

$$= \frac{1}{F_S}\sum_{\tau=0}^{L_A-1} W_V(\tau)(P_2(t-\tau) - P_2(t-\tau-1)) \quad (15)$$

$$= \frac{1}{F_S}W_V(0)P_2(t) + \frac{1}{F_S}\sum_{\tau=1}^{L_A-1}(W_V(\tau) - W_V(\tau-1))$$

$$P_2(t-\tau) - \frac{1}{F_S}W_V(L_A-1)P_2(t-L_A) \quad (16)$$

The macro acceleration $A_M(t)$ defined by the formula (4) can be written as the following formula (17) or the following formula (18) to the reproduction position $P_2(t)$ by the secondary reproducing plan $P_2$, and the macro acceleration $A_M(t)$ is also a linear combination of the reproduction positions $P_2(t)$ at different time points similarly to the macro speed $V_M(t)$.

$$A_M(t) = \frac{2F_P}{L_B+L_C}\left(\frac{F_P}{F_S L_B}(P_2(t) - P_2(t-L_B)) - \frac{F_P}{F_S L_C}(P_2(t-L_B) - P_2(t-L_B-L_C))\right) \quad (17)$$

$$= \frac{F_P^2}{F_S L_B(L_B+L_C)}P_2(t) - \frac{2F_P^2}{F_S L_B L_C}P_2(t-L_B) + \frac{F_P}{F_S L_C}P_2(t-L_B-L_C) \quad (18)$$

The more general macro acceleration $A_M(t)$ defined by the formula (6) can be written as the following formula (19) by the use of the result of the formula (16) as it is by utilizing the fact that the formula (6) has a similar form to that of the formula (3).

$$A_M(t) = \frac{1}{F_S}W_A(0)P_2(t) + \frac{1}{F_S}\sum_{\tau=1}^{L_E-1}(W_A(\tau) - W_A(\tau-1))P_2(t-\tau) - \frac{1}{F_S}W_A(L_E-1)P_2(t-L_E) \quad (19)$$

It is found that both the macro speed $V_M(t)$ and the macro acceleration $A_M(t)$ can be written by linear combinations of the reproduction positions $P_2(t)$ at different time points by synthesizing the formulae (12), (16), (18), and (19). Accordingly, if a linear weight to the reproduction position $P_2(t)$ in the past by a time $\tau$ is newly denoted by $M_V(\tau)$ or $M_A(\tau)$, then the formulae (12) and (16) can be severally rewritten as the following formula (20), and the formulae (18) and (19) can be severally rewritten as the following formula (21).

$$V_M(t) = \sum_{\tau=0}^{L_M} M_V(\tau)P_2(t-\tau) \quad (20)$$

$$A_M(t) = \sum_{\tau=0}^{L_M} M_A(\tau)P_2(t-\tau) \quad (21)$$

The parameter $L_M$ in the formulae (20) and (21) is a larger one between the parameter $L_A$ and the sum of the parameters $L_B+L_C$ here in the definition of the formulae (12) and (18), and a larger one between the parameters $L_A$ and $L_E$ ($=L_B+L_C$) in the definition of the formulae (16) and (19).

The formulae (20) and (21) can be written as the following formulae (22) and (23), respectively, by using a difference $d(t)$ ($=P_1(t)-P_2(t)$) between a reproduction position $P_1(t)$ by the primary reproducing plan $P_1$ and a reproduction position $P_2(t)$ by the secondary reproducing plan $P_2$. Incidentally, it is supposed that $d(t-\tau)$ to a negative $\tau$ is "0" in the formulae (22) and (23).

$$V_M(t) = \sum_{\tau=0}^{L_M} M_V(\tau)(P_1(t-\tau) - d(t-\tau)) \quad (22)$$

$$A_M(t) = \sum_{\tau=0}^{L_M} M_A(\tau)(P_1(t-\tau) - d(t-\tau)) \quad (23)$$

Incidentally, although the macro speed $V_M(t)$ and the macro acceleration $A_M(t)$ have been written by the reproduction position ($P_1(t)$ or $P_2(t)$), that is, although the macro speed $V_M(t)$ and the macro acceleration $A_M(t)$ have been discussed as the functions of the reproduction positions, the reproduction speed $V_2(t)$ by the secondary reproducing plan $P_2$ are connected with the reproduction positions by $V_2(t)=(F_P/F_S)(P_2(t)-P_2(t-1))$, and the reproduction acceleration $A_2(t)$ by the secondary reproducing plan $P_2$ is connected with the reproduction speeds by $A_2(t)=F_P(V_2(t)-V_2(t-1))$. Consequently, even if the macro speed $V_M(t)$ and the macro acceleration $A_M(t)$ are expressed as the functions of the reproduction speeds and the reproduction acceleration in stead of being expressed as the function of the reproduction positions, the expressions are essentially the same ones.

<Conclusion to Linear Programming>

Next, a technique to conclude the formulated macro speed $V_M(t)$ and the formulated macro acceleration $A_M(t)$ to linear programming is described.

The polygonal line shown in FIG. 6 is first formulated.

The region $S_0$ satisfying the identifiable condition is supposed to be a convex region enclosed by the polygonal line, and the polygonal line is supposed to be composed of K straight lines. In this case, the condition in order that the reproduction plan having the macro speed $V_M(t)$ and the macro acceleration $A_M(t)$ at the moment of a time t may be included in the region $S_0$ can be written by K inequalities as the following formula (24) as a linear condition pertaining to the macro speed $V_M(t)$ and the macro acceleration $A_M(t)$. $C_{Vk}$, $C_{Ak}$, and $C_{Ck}$ in the formula (24) are parameters determined by the positions and the inclinations of the respective straight lines constituting the polygonal line here.

$$C_{Vk}V_M(t)+C_{Ak}A_M(t) \leq C_{Ck} (k=0,1,\ldots,K-1) \quad (24)$$

It is supposed that the present time is time $t_0$. If simply considered, it seems that the secondary reproducing plan $P_2$ may be determined by solving the problem of minimizing the difference $|d(t_0)|=|P_1(t_0)-P_2(t_0)|$ between the reproduction position $P_1(t_0)$ by the primary reproducing plan $P_1$ and the reproduction position $P_2(t_0)$ by the secondary reproducing plan $P_2$ under the restriction of satisfying the formula (24) at $t=t_0$. However, because the macro speed $V_M(t)$ and the macro acceleration $A_M(t)$ constituting the formula (24) are defined by the reproduction position $P_2(t_0)$ at a time point in past, there is the possibility that the formula (24) will not be satisfied at $t>t_0$ even if the formula (24) was satisfied at $t=t_0$.

In order to prevent the occurrence of such an impediment, it is necessary to restrict the macro speed $V_M(t)$ and the macro acceleration $A_M(t)$ at the time point of the time to in the determination of the secondary reproducing plan $P_2$ at the time $t_0$ of the present time so that the formula (24) may be effected for several seconds in future (for example, a time interval for $L_J$ samples).

The primary reproducing plan $P_1$ in future should be expected first for that.

To put it concretely, the primary reproducing plan $P_1(t)$ is determined in $t_0 < t < t_0 + L_J$ by expecting the reproduction speed to be instructed by an operator.

The method of expecting the reproduction speed to be instructed by the operator is arbitrary. For example, the present operation by the operator may be supposed to be continued (for example, if "fast-forward button" is pushed, then the button may be being pushed). If an operating device capable of freely setting a reproduction speed like the sliding variable resistor 2000 is operated, the reproduction speed may be determined on the supposition that the speed change of the set reproduction speed is constant (for example, if acceleration is continued, the acceleration is performed at the same acceleration). Moreover, if the operator intermittently pushes the "fast-forward button," the reproduction speed may be determined on the supposition that the pushing-down time of the "fast-forward button" at this time may be almost the same as that of the "fast-forward button" at the last time. Moreover, if an operating device provided with, for example, a "five-second skipping button" for instructing five-second skipping at 10x-speed and a "fifteen-second skipping button" for instructing fifteen-second skipping at 10x-speed besides the "fast-forward button" is being operated, then it can be expected that, if the "five-second skipping button" is pushed, then the reproduction speed will become 10x-speed for immediate 0.5 seconds and will return to the normal speed after that, and that, if the "fifteen-second skipping button" is pushed, then the reproduction speed will become 10x-speed for immediate 1.5 seconds and will return to the normal speed after that.

Now, if the present time is the time $t_0$, then the reproduction position $P_2(t)$ has been already settled to $t < t_0$, and it is necessary to adjust the difference $d(t)$ between the reproduction positions $P_1(t)$ and $P_2(t)$ to $t \geq t_0$. Consequently, the reproduction position $P_2(t)$ can be written as the following formula (25).

$$P_2(t) = \begin{cases} P_2(t) & (t < t_0) \\ P_1(t) - d(t) & (t \geq t_0) \end{cases} \quad (25)$$

The macro speed $V_M(t)$ and the macro acceleration $A_M(t)$ are supposed to be defined by the formulae (20) and (21), respectively, and the formula (25) is substituted for the formulae (20) and (21). Then, the formulae (20) and (21) are changed to the following formulae (26) and (27), respectively.

$$V_M(t) = \sum_{\tau=0}^{t-t_0} M_V(\tau)(P_1(t-\tau) - d(t-\tau)) + \sum_{\tau=t-t_0+1}^{L_M} M_V(\tau)P_2(t-\tau) \quad (26)$$

$$A_M(t) = \sum_{\tau=0}^{t-t_0} M_A(\tau)(P_1(t-\tau) - d(t-\tau)) + \sum_{\tau=t-t_0+1}^{L_M} M_A(\tau)P_2(t-\tau) \quad (27)$$

If it is here considered that $L_J$ times t from $t=t_0$ to $t=t_0+L_{J-1}$ are used as the time t in the formulae (26) and (27) at the present time, it is convenient to express the time t as $t=t_0+j$ using j (j=0, 1, ..., $L_J-1$). Moreover, the difference ($t_0+j$) between the reproduction position $P_1(t_0+j)$ by the primary reproducing plan $P_1$ and the reproduction position $P_2(t_0+j)$ by the secondary reproducing plan $P_2$ is supposed to be expressed as $d(t_0+j)=d_j$.

Under such settlements, the formulae (26) and (27) can be rewritten as the following formulae (28) and (29), respectively.

$$V_M(t_o + j) = \sum_{\tau=0}^{j} M_V(\tau)(P_1(t_0+j-\tau) - d_{j-\tau}) + \sum_{\tau=j+1}^{L_M} M_V(\tau)P_2(t_0+j-\tau) \quad (28)$$

$$A_M(t_o + j) = \sum_{\tau=0}^{j} M_A(\tau)(P_1(t_0+j-\tau) - d_{j-\tau}) + \sum_{\tau=j+1}^{L_M} M_A(\tau)P_2(t_0+j-\tau) \quad (29)$$

On the other hand, the restriction formula by the polygonal line can be written as the following formula (30) as $KL_J$ inequalities if the number of the straight lines constituting the polygonal line is supposed to be K.

$$C_{Vk}V_M(t_0+j)+C_{Ak}A_M(t_0+j) \leq C_{Ck} (j=0, 1, \ldots, L_J-1) (k=0, 1, \ldots, K-1) \quad (30)$$

Then, if the formulae (28) and (29) are substituted for formula (30), then the following formula (31) is obtained. Here, $Q_k(\tau)$ in the formula (31) is the following formula (32), and $P_{jk}$ in the formula (31) is the following formula (33).

$$P_{jk} \geq \sum_{\tau=0}^{j} Q_k(\tau)d_{j-\tau} \quad (j = 0, 1, \ldots, L_J - 1) \quad (31)$$

$$(k = 0, 1, \ldots, K - 1)$$

$$Q_k(\tau) = -C_{Vk}M_V(\tau) - C_{Ak}M_A(\tau) \quad (32)$$

$$P_{jk} = C_{Ck} + \sum_{\tau=0}^{j} Q_k(\tau)P_1(t_0+j-\tau) + \sum_{\tau=j+1}^{L_M} Q_k(\tau)P_2(t_0+j-\tau) \quad (33)$$

Next, an objective function is determined. The objective function is a value to be minimized in linear programming. The objective function is here defined as, for example, the following formula (34) as the cumulation of a difference $d_j$ between the reproduction position $P_1(t_0+j)$ by the primary reproducing plan $P_1$ and the reproduction position $P_2(t_0+j)$ by the secondary reproducing plan $P_2$.

$$O_F = \sum_{j=0}^{L_J-1} d_j \quad (34)$$

By concluding the above, the following linear programming problem LP1($t_0$, $L_J$) is led.
Linear Programming Problem LP1($t_0$, $L_J$)
Nonnegative Variable: $d_0, \ldots, d_{L_J-1}$
Objective Function:

$$O_F = \sum_{j=0}^{L_j-1} d_j$$

Constraint Condition:

$$P_{jk} \geq \sum_{\tau=0}^{j} Q_k(\tau) d_{j-\tau}$$

$(j = 0, 1, \ldots, L_{J-1})$, $(k = 0, 1, \ldots, K-1)$

The linear programming problem LP1($t_0$, $L_J$) is to be solved by the use of the linear programming so that a vector composed of the element of the linear combination of the reproduction position $P_2(t_0+j)$ by the secondary reproducing plan $P_2$ may fall in the previously set region (the region $S_0$ satisfying the identifiable condition) expressing the identifiable condition on the plane (macro speed-acceleration plane) geometrically including the vector as a constraint condition in order to minimize the difference $d_j$ between the reproduction position $P_1(t_0+j)$ by the primary reproducing plan $P_1$ and the reproduction position $P_2(t_0+j)$ by the secondary reproducing plan $P_2$ as the objective function.

Incidentally, although the constraint condition is written by the reproduction position ($P_1(t)$ or $P_2(t)$), the reproduction speed $V_2(t)$ by the secondary reproducing plan $P_2$ is connected with the reproduction positions by $V_2(t)=(F_P/F_S)(P_2(t)-P_2(t-1))$, and the reproduction acceleration $A_2(t)$ by the secondary reproducing plan $P_2$ is connected with the reproduction speeds by $A_2(t)=F_P(V_2(t)-V_2(t-1))$. Consequently, if the constraint condition is written by the reproduction speeds and the reproduction acceleration in place of the reproduction positions, it is essentially the same. Therefore, the constraint condition is arbitrary as long as the condition is that a vector composed of a linear combination of at least one of the reproduction position $P_2(t_0+j)$ by the secondary reproducing plan $P_2$, the reproduction speed $V_2(t_0+j)$, and the reproduction acceleration $A_2(t_0+j)$ as the element thereof may fall in the previously set region expressing the identifiable condition in a plane or a space geometrically including the vector therein.

Here, it is described to limit the difference $d_j$ ($j=0, 1, \ldots, L_J-1$) to be nonnegative in the linear programming problem LP1($t_0$, $L_J$). Generally, the secondary reproducing plan $P_2$ is the one moderating the reproduction speed of the primary reproducing plan $P_1$, and it is not necessary to be $d(t)<0$. Consequently, if the condition of $d(t)>0$ exist, the condition is not a hindrance. Furthermore, the condition of $d(t)>0$ is convenient to avoid an overshoot problem, which may be produced in some condition setting. Moreover, because the operation of an absolute value becomes unnecessary for defining the objective function by the condition, it becomes easy to throw the linear programming problem LP1($t_0$, $L_J$) into the framework of the existing linear programming.

Incidentally, although the objective function defined by the formula (34) is defined as a mere total sum of the delay times of the secondary reproducing plan $P_2$ to the primary reproducing plan $P_1$, the objective function may be defined as a weighted total sum in some cases.

<Improvement of Linear Programming>

Next, the technique for improving the linear programming problem LP1($t_0$, $L_J$) is described.

Although the linear programming problem LP1($t_0$, $L_J$) can find a solution to minimize the cumulation of the difference $d_j$ between the reproduction position $P_1(t_0+j)$ by the primary reproducing plan $P_1$ and the reproduction position $P_2(t_0+j)$ by the secondary reproducing plan $P_2$ in the range of the constraint condition, it may happen that the secondary reproducing plan $P_2$ obtained as a result becomes the one the speed variation of which is violent because the linear programming problem LP1($t_0$, $L_J$) pursues the optimality to the limit.

Accordingly, the magnitude of the reproduction acceleration by the secondary reproducing plan $P_2$, that is, the degrees of the acceleration and the deceleration of speed, is added to the objective function.

In order to add the degrees of the acceleration and the deceleration of speed to the objective function, variables expressing the acceleration and the deceleration are decided to be introduced. Because the acceleration and the deceleration can be written by the difference $d_j$ (hereinafter referred to as "amount of correction $d_j$") between the reproduction position $P_1(t_0+j)$ by the primary reproducing plan $P_1$ and the reproduction position $P_2(t_0+j)$ by the secondary reproducing plan $P_2$, it seems that the introduction of the new variables is not necessary. However, because the operations of the absolute values cannot be treated in the framework of the linear programming as it is, the introduction of the new variables is effective.

To put it concretely, for example, the acceleration and the deceleration are described as different positive variables, and the variations of the acceleration and the deceleration are written by the sum of them.

In line with the above scheme, nonnegative variables $a_j$, and $b_j$ ($j=0, 1, \ldots, L_J-1$) are introduced. Then, it is supposed that the acceleration at time $t_0+j$ (in discrete time) is $a_j-b_j$. It is necessary to express the relation between the acceleration $a_j-b_j$ and the amount of correction $d_j$ with an equality in order to make the variables fall in the framework of the linear programming. For this purpose, if the reproduction speed at the time t (in the discrete time) is described as V(t), the variables can be calculated as the following formula (35) or the following formula (36) as the difference of the acceleration expressed by the sample number at the sampling frequency $F_S$ as the unit thereof.

$$a_j - b_j = F_S F_P[V(t_0 + j) - V(t_0 + j - 1)] \quad (35)$$

$$= F_P^2[P_2(t_0 + j) - P_2(t_0 + j - 1) - \quad (36)$$
$$P_2(t_0 + j - 1) + P_2(t_0 + j - 2)]$$

If the formula (36) is transformed by the use of the formula (25), then the transformed formula (36) becomes the following formulae (37), (38), and (39) in the three cases of $j=0$, $j=1$, and $j>2$, respectively.

$$a_0 - b_0 = F_P^2[-d_0 + P_2(t_0-2) - 2P_2(t_0-1) + P_1(t_0)](j=0) \quad (37)$$

$$a_1 - b_1 = F_P^2[2d_0 - d_1 + P_2(t_0-1) - 2P_1(t_0) + P_1(t_0+1)](j=1) \quad (38)$$

$$a_j - b_j = F_P^2[-d_{j-2} + 2d_{j-1} - d_j + P_1(t_0+j-2) - 2P_1(t_0+j-1) + P_1(t_0+j)](j \geq 2) \quad (39)$$

Furthermore, if the variables (the amounts to be adjusted in the optimization problem) of the formulae (37), (38), and (39)

are put together on the left side, then the formulae (37), (38), and (39) become the following formulae (40), (41), and (42), respectively.

$$a_0 - b_0 + F_P^2 d_0 = F_P^2 [P_2(t_0-2) - 2P_2(t_0-1) + P_1(t_0)] \quad (40)$$

$$a_1 - b_1 + F_P^2 [-2d_0 + d_1] = F_P^2 [P_1(t_0-1) - 2P_1(t_0) + P_1(t_0+1)] \quad (41)$$

$$a_j - b_j + F_P^2 [d_{j-2} - 2d_{j-1} + d_j] = F_P^2 [P_1(t_0+j-2) - 2P_1(t_0+j-1) + P_1(t_0+j)] \quad (42)$$

Then, if the right sides of the formulae (40)-(42) are supposed to be collectively expressed as $R_j$, then the equality relation between the acceleration $a_j - b_j$ and the amount of the correction $d_j$ can be collected as the following formula (43).

$$R_j = a_j - b_j + F_P^2 (d_{j-2} - 2d_{j-1} + d_j) \ (j=0,1,\ldots,L_J-1) \quad (43)$$

Here, because the variables $d_{-2}$ and $d_{-1}$, which appear in form in the case of setting j to be 0 and 1 in the formula (43), are the amount of correction $d_j$ to the already elapsed past, the variables $d_{-2}$ and $d_{-1}$ are previously defined as "0."

Next, the objective function is modified. It is sufficient to define the objective function as the following formula (44) for preventing the undue occurrence of acceleration and deceleration. Here, $\alpha$ is the weight of the penalty of acceleration, and $\beta$ is the weight of the penalty of deceleration. The weight of the penalty is supposed to be described as a relative relation with shifts. That is, to put it concretely, the time of a shift considerable to be equal to, for example, the acceleration of 1 s/s$^2$ (i.e. the acceleration to shift from the normal speed to a 2×-speed for one second) is $\alpha$ in the case of acceleration and $\beta$ in the case of deceleration.

$$O_F = \sum_{j=0}^{L_J-1} d_j + \alpha \sum_{j=0}^{L_J-1} a_j + \beta \sum_{j=0}^{L_J-1} b_j \quad (44)$$

The conclusion of the above leads to the following improved type linear programming problem LP2($t_0$, $L_J$).

Improved type Linear Programming Problem LP2($t_0$, $L_J$)

Nonnegative Variable: $d_0, \ldots, d_{L_J-1}$; $a_0, \ldots, a_{L_J-1}$; $b_0, \ldots, b_{L_J-1}$ Objective Function:

$$O_F = \sum_{j=0}^{L_J-1} d_j + \alpha \sum_{j=0}^{L_J-1} a_j + \beta \sum_{j=0}^{L_J-1} b_j$$

Constraint Condition:

$$P_{jk} \geq \sum_{\tau=0}^{j} Q_k(\tau) d_{j-\tau}$$

$(j = 0, 1, \ldots, L_{J-1})$, $(k = 0, 1, \ldots, K - 1)$ $R_j = a_j - b_j + F_P^2 (d_{j-2} - 2d_{j-1} + d_j)$ (on the supposition of $d_{-2} = d_{-1} = 0$)($j = 1, 1, \ldots, L_{J-1}$)

The improved type linear programming problem LP2($t_0$, $L_J$) is to be solved by the use of the linear programming so that a vector composed of the element of a linear combination of the reproduction position $P_2(t_0+j)$ by the secondary reproducing plan $P_2$ may fall in the previously set region (the region $S_0$ satisfying the identifiable condition) expressing the identifiable condition on the plane (macro speed-acceleration plane) geometrically including the vector as a constraint condition in order to minimize the sum of the difference $d_j$ between the reproduction position $P_1(t_0+j)$ by the primary reproducing plan $P_1$ and the reproduction position $P_2(t_0+j)$ by the secondary reproducing plan $P_2$ and the magnitude $a_j + b_j$ of the reproduction acceleration by the secondary reproducing plan $P_2$ as the objective function.

Incidentally, although the constraint condition is written by the reproduction position ($P_1(t)$ or $P_2(t)$), the reproduction speed $V_2(t)$ by the secondary reproducing plan $P_2$ is connected with the reproduction positions by $V_2(t) = (F_F/F_S)(P_2(t) - P_2(t-1))$, and the reproduction acceleration $A_2(t)$ by the secondary reproducing plan $P_2$ is connected with the reproduction speeds by $A_2(t) = F_F(V_2(t) - V_2(t-1))$. Consequently, if the constraint condition is written by the reproduction speeds and the reproduction acceleration in place of the reproduction positions, it is essentially the same. Therefore, the constraint condition is arbitrary as long as the condition is that a vector composed of a linear combination of at least one of the reproduction position $P_2(t_0+j)$ by the secondary reproducing plan $P_2$, the reproduction speed $V_2(t_0+j)$, and the reproduction acceleration $A_2(t_0+j)$ as the element thereof may fall in the previously set region expressing the identifiable condition in a plane or a space geometrically including the vector therein.

As described above, the problem pertaining to the determination of the secondary reproducing plan $P_2$ in a time interval ranging from the present time to the future can be concluded to the linear programming problem LP1($t_0$, $L_J$) or the improved type linear programming problem LP2($t_0$, $L_J$). Because the linear programming is an algorithm used in a wide field, the software can be installed by the use of the existing subroutine or the like.

Incidentally, the linear programming problem LP1($t_0$, $L_J$) and the improved type linear programming problem LP2($t_0$, $L_J$) are only the methods for finding the secondary reproducing plan $P_2$ in a time interval ranging from the present time to the future (the time interval for $L_J$ samples starting from the time $t_0$). It is necessary to repeatedly apply the methods in order to reproduce the whole reproduction data.

Embodiment

Configuration of Reproducing Apparatus

The reproducing apparatus 1 of the present invention is, for example, a compact disc (CD) player, a digital versatile disc (DVD) player, a hard disk player, a personal computer, or the like, which reproduces reproduction data composed of sound data at a speed different from that at the time of the recording of the reproduction data at the time of the reproduction of the reproduction data.

To put it concretely, the reproducing apparatus 1 Expects the reproduction speed in the future on the basis of, for example, a reproduction speed $V_1$ instructed by an operation of an operation section 15 by a user, and produces the primary reproducing plan $P_1$ ranging from the present time to the future.

Then, the reproducing apparatus 1 solves the optimization problem by the use of the linear programming as a linear programming problem (linear programming problem LP1($t_0$, $L_J$) or improved type linear programming problem LP2($t_0$, $L_J$)) on the basis of the produced primary reproducing plan $P_1$ and a previously determined parameter pertaining to the human property, and thereby the reproducing apparatus 1 produces the secondary reproducing plan $P_2$ ranging from the present time to the future.

Then, the reproducing apparatus 1 is adapted to sequentially obtain the reproduction data stored in a storage medium 11 in accordance with the produced secondary reproducing plan $P_2$, and smoothly connects the fragments of the reproduction data by the time scale modification technique to output the connected fragments from a sound output apparatus 3.

Figure 9:
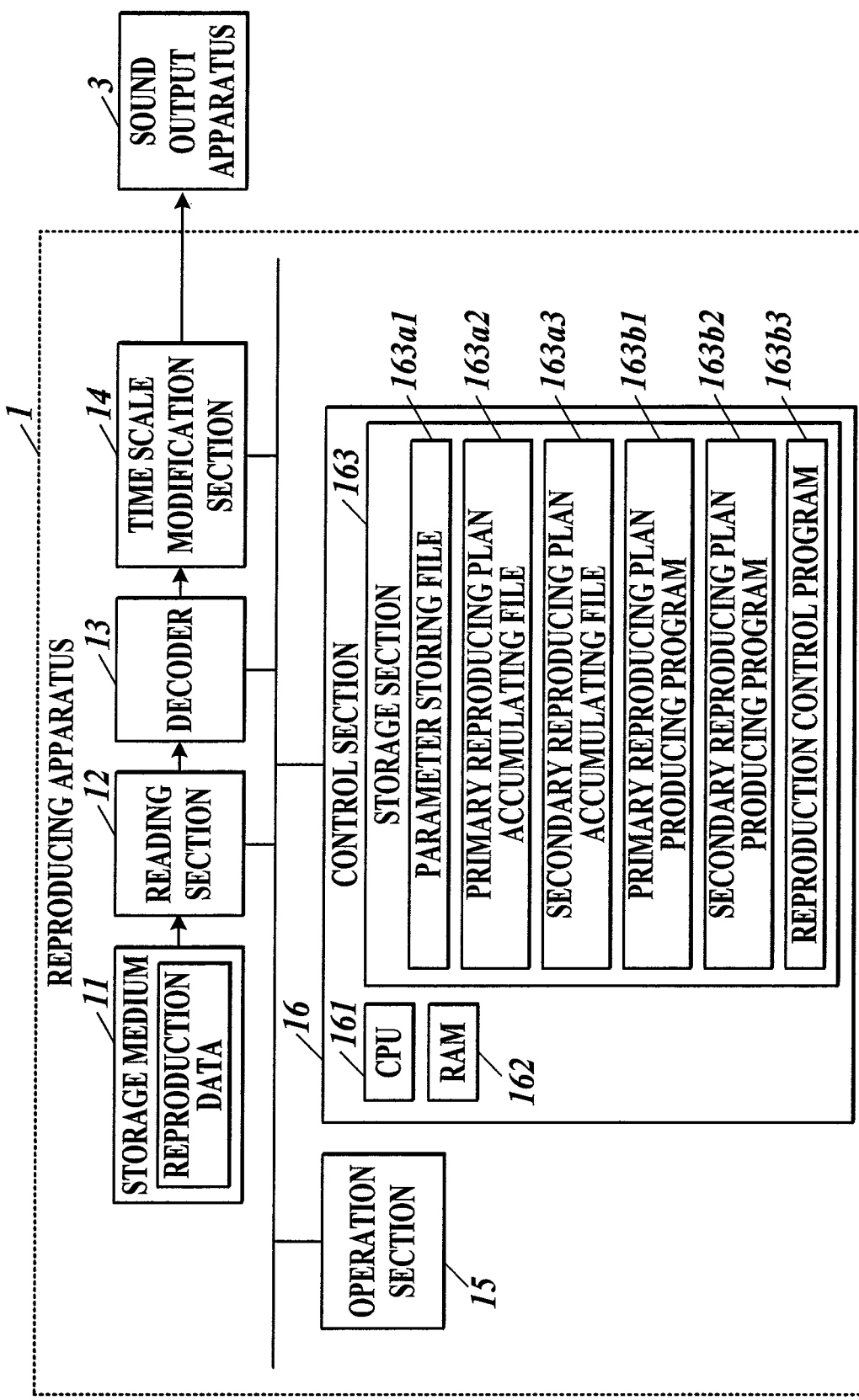
FIG. 9 is a diagram showing the functional configuration of a reproducing apparatus of the present invention.

To put it more concretely, the reproducing apparatus 1 is composed of, for example, the storage medium 11, a reading section 12, a decoder 13, a time scale modification section 14, the operation section 15, and a control section 16, as shown in FIG. 9.

Moreover, the reproducing apparatus 1 is connected to, for example, the sound output apparatus 3 as a predetermined output apparatus through the time scale modification section 14 as shown in FIG. 9.

The storage medium 11 previously stores, for example, reproduction data composed of sound data as a storage section.

Incidentally, the storage medium 11 is arbitrary as long as the storage medium 11 is the one capable of reading data, such as a CD, a DVD, a hard disk drive (HDD), a semiconductor memory, and a memory card.

The reading section 12 obtains reproduction data from the storage medium 11 to output the obtained reproduction data to the decoder 13, for example, as an obtainment section, in accordance with the secondary reproducing plan $P_2$ produced by a CPU 161, which has executed a secondary reproducing plan producing program 163$b$2, under the control of a control signal input from the control section 16.

The decoder 13 performs the predetermined processing, such as decoding, to, for example, the reproduction data input from the reading section 12 in accordance with a control signal input from the control section 16, and outputs the processed reproduction data to the time scale modification section 14.

The time scale modification section 14 transforms the time scale of the reproduction data input from the decoder 13 by the use of, for example, the existing time scale modification technique (such as TSM) in consideration of the coincidence factor of the waveform of the reproduction data in accordance with a control signal input from the control section 16 as a time scale modification section, and outputs the reproduction data to the sound output apparatus 3 through a not-shown amplifier.

The sound output apparatus 3 is, for example, a speaker device, and outputs, for example, the sound based on the reproduction data (sound data) input from the time scale modification section 14.

The operation section 15 is composed of, for example, operation buttons (not shown), such as a "fast-forward button," and a "rewind button," which are provided on the outer surface of the reproducing apparatus 1; a remote control (not shown) for the reproducing apparatus 1, which includes operation buttons, such as a "fast-forward button" and a "rewind button"; and a remote control reception section (not shown) capable of communicating with the remote control. When the operation section 15 is operated by, for example, a user, the operation section 15 outputs various signals corresponding to the operate to the control section 16.

To put it concretely, the operation section 15 is operated, for example, as an instruction section, when the user instructs the reproduction speed $V_1$ of the reproduction data stored in the storage medium 11.

The control section 16 is composed of, for example, the CPU 161, a RAM 162, and a storage section 163, as shown in FIG. 9.

The CPU 161 performs various control operations in accordance with, for example, various processing programs for the reproducing apparatus 1, which processing programs are stored in the storage section 163.

The RAM 162 includes, for example, a program storing region for expanding a processing program to be executed by the CPU 161, and a data storing region for storing input data and the processing results to be generated at the time of the execution of the processing program.

The storage section 163 stores, for example, a system program executable in the reproducing apparatus 1, various processing programs executable on the system program, the data to be used at the time of the execution of these various processing programs, and the data of the processing results of the operation processing by the CPU 161. Incidentally, the programs are stored in the storage section 163 in the form of program codes readable by a computer.

To put it concretely, the storage section 163 stores, for example, a parameter storing file 163$a$1, a primary reproducing plan accumulating file 163$a$2, a secondary reproducing plan accumulating file 163$a$3, a primary reproducing plan producing program 163$b$1, the secondary reproducing plan producing program 163$b$2, and a reproduction control program 163$b$3, as shown in FIG. 9.

The parameter storing file 163$a$1 stores, for example, $M_V(\tau), M_A(\tau), C_{Vk}, C_{Ak},$ and $C_{Ck}$ as the previously determined parameters pertaining to the human property.

The primary reproducing plan accumulating file 163$a$2 accumulates, for example, the reproduction position $P_1(t)$ by the primary reproducing plan $P_1$ produced by the CPU 161, which has executed the primary reproducing plan producing program 163$b$1.

The secondary reproducing plan accumulating file 163$a$3 accumulates, for example, the reproduction position $P_2(t)$ by the secondary reproducing plan $P_2$ produced by the CPU 161, which has executed the secondary reproducing plan producing program 163$b$2.

The primary reproducing plan producing program 163$b$1 enables the CPU 161 to realize, for example, the function of producing the primary reproducing plan $P_1$ ranging from the present time to the future according to the reproduction speed $V_1$ instructed by a user's operation of the operation section 15.

The CPU 161 functions as the primary reproducing plan producing section by executing this primary reproducing plan producing program 163$b$1.

The secondary reproducing plan producing program 163$b$2 enables the CPU 161 to realize, for example, the function of producing the secondary reproducing plan $P_2$ ranging from the present time to the future, which secondary reproducing plan $P_2$ is the plan modifying the primary reproducing plan $P_1$ by solving the optimization problem as a linear programming problem (linear programming problem LP1($t_0, L_J$) or improved type linear programming problem LP2(to $L_J$)) by the use of the linear programming on the basis of the primary reproducing plan $P_1$ produced by the CPU 161, which has executed the primary reproducing plan producing program 163$b$1, and the parameters $M_V(\tau), M_A(\tau), C_{Vk}, C_{Ak}, C_{Ck}$, and the like, stored in the parameter storing file 163$a$1.

Moreover, the secondary reproducing plan producing program 163$b$2 enables the CPU 161 to realize, for example, the function of judging whether the difference between the primary reproducing plan $P_1$ produced by the CPU 161, which has executed the primary reproducing plan producing program 163b1, and the produced secondary reproducing plan $P_2$ is within a previously set regulated range or not, and of replacing the produced secondary reproducing plan $P_2$ with the primary reproducing plan $P_1$ produced by the CPU 161, which has executed the primary reproducing plan producing program 163b1 if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and a judgment section by executing this secondary reproducing plan producing program 163b2.

The reproduction control program 163b3 enables the CPU 161 to realize, for example, the function of reproducing the reproduction data stored in the storage medium 11 in accordance with the secondary reproducing plan $P_2$ ranging from the preset time to the future, which secondary reproducing plan $P_2$ has been produced by the CPU 161, which has executed the secondary reproducing plan producing program 163b2.

To put it concretely, the CPU 161, for example, inputs a control signal into the reading section 12 to make the reading section 12 obtain the reproduction data from the storage medium 11 in accordance with the secondary reproducing plan $P_2$ produced by the CPU 161, which has executed the secondary reproducing plan producing program 163b2, and inputs control signals into the decoder 13 and the time scale modification section 14 to make them output the reproduction data obtained by the reading section 12 to the sound output apparatus 3.

The CPU 161 functions as the output control section by executing this reproduction control program 163b3.

[Reproducing Processing]

Next, the processing pertaining to the reproduction of the reproduction data stored in the storage medium 11 by the reproducing apparatus 1 is described with reference to the flow chart of FIG. 10.

When a user operates the operation section 15 to instruct the reproduction of the reproduction data stored in the storage medium 11 (step S1), the CPU 161 sets "0" in the "present time of time $t_0$" storage region in the RAM 162 (step S2).

Next, the CPU 161 reads the reproduction speed $V_1$ at the time of reproducing the reproduction data stored in the storage medium 11 which reproduction data has been instructed by the user's operation of the operation section 15 (step S3).

Next, the CPU 161 judges whether the reproduction position $P_1(t_0)$ is accumulated in the primary reproducing plan accumulating file 163a2 or not, that is, whether the previously expected reproduction position $P_1(t_0)$ by the primary reproducing plan $P_1$ at the time to exists or not (step S4).

When the CPU 161 judges that the previously expected reproduction position $P_1(t_0)$ does not exist at the step S4 (step S4; No), the CPU 161 executes the primary reproducing plan producing program 163b1 to produce the primary reproducing plan $P_1$ ranging from the present time to the future (step S5).

To put it concretely, the CPU 161 produces the reproduction position $P_1(t_0)$ (=$P_1(t_0-1)+(F_S/F_P)V_1$) by the primary reproducing plan $P_1$ at the present time on the basis of, for example, the reproduction speed $V_1$ read at the step S3 and the reproduction position $P_1(t_0-1)$ accumulated in the primary reproducing plan accumulating file 163a2 (step S5a), and stores the produced reproduction position $P_1(t_0)$ into the primary reproducing plan accumulating file 163a2

Next, the CPU 161 produces the reproduction position $P_1(t_0+j)$ (j=1, 2, . . . , $L_J-1$) by the primary reproducing plan $P_1$ in the future by expecting the future primary reproducing plan $P_1$ (step S5b), and stores the produced reproduction position $P_1(t_0+j)$ into the primary reproducing plan accumulating file 163a2.

Next, the CPU 161 executes the secondary reproducing plan producing program 163b2 to produce the secondary reproducing plan $P_2$ ranging from the present time to the future (step S6), and shifts the processing thereof to the processing at step S9.

To put it concretely, the CPU 161 finds the amount of correction $d_j$ (j=0, 1, . . . , $L_J-1$) by solving, for example, the linear programming problem $LP1(t_0, L_J)$ or the improved type linear programming problem $LP2(t_0, L_J)$ (step S6a).

Next, the CPU 161 produces the reproduction position $P_2(t_0+j)$ (j=0, 1, . . . , $L_S-1$) by the secondary reproducing plan $P_2$ ranging from the present time to the future on the basis of the reproduction position $P_1(t_0+j)$ (j=0, 1, . . . , $L_S-1$) by the primary reproducing plan $P_1$ ranging from the present time to the future, which reproduction position $P_1(t_0+j)$ is accumulated in the primary reproducing plan accumulating file 163a2, and the amount of correction $d_j$ (j=0, 1, . . . , $L_S-1$) found at the step S6a (step S6b), and stores the produced reproduction position $P_2(t_0+j)$ into the secondary reproducing plan accumulating file 163a3. Then the CPU 161 shifts the processing thereof to that at the step S9.

Moreover, when the CPU 161 judges that the previously expected reproduction position $P_1(t_0)$ exists at the step S4 (step S4; Yes), the CPU 161 judges whether the reproduction position $P_1(t_0-1)+(F_S/F_P)V_1$ by the primary reproducing plan $P_1$ at the present time, which reproduction position $P_1(t_0-1)+(F_S/F_P)V_1$ has been produced on the basis of the reproduction speed $V_1$ read at the step S3 and the reproduction position $P_1(t_0-1)$ accumulated in the primary reproducing plan accumulating file 163a2, is almost equal to the previously expected reproduction position $P_1(t_0)$ or not (step S7).

When the CPU 161 judges that the reproduction position $P_1(t_0-1)+(F_S/F_P)V_1$ is not almost equal to the previously expected reproduction position $P_1(t_0)$ at the step S7 (step S7; No), the CPU 161 shifts the processing thereof to that at the step S5.

On the other hand, if the CPU 161 judges that the reproduction position $P_1(t_0-1)+(F_S/F_P)V_1$ is almost equal to the previously expected reproduction position $P_1(t_0)$ at step S7 (step S7; Yes), the CPU 161 judges whether the reproduction position $P_2(t_0)$ is accumulated in the secondary reproducing plan accumulating file 163a3 or not, that is, whether the reproduction position $P_2(t_0)$ by the secondary reproducing plan $P_2$ at the time $t_0$ is produced or not (step S8).

When the CPU 161 judges that the reproduction position $P_2(t_0)$ is not produced at the step S8 (step S8; No), the CPU 161 shifts the processing thereof to that at the step S5.

On the other hand, if the CPU 161 judges that the reproduction position $P_2(t_0)$ is produced at the step S8 (step S8; Yes), then the CPU 161 judges whether the reproduction position $P_1(t_0)-P_2(t_0)$ is within the previously set regulated range or not (step S9).

If the CPU 161 judges that the reproduction position $P_1(t_0)-P_2(t_0)$ is not within the regulated range at the step S9 (step S9; No), then the CPU 161 replaces the reproduction position $P_2(t_0)$ with the reproduction position $P_1(t_0)$ (step S10)

Next, the CPU 161 sets "1" in the region of j=0 in a "hearing possibility $U(t_0+j)$" storing region in the RAM 162, that is, a "hearing possibility $U(t_0)$" storing region (step S11), and then the CPU 161 records the effect of not falling in the region $S_0$ satisfying the identifiable condition at the time $t_0+j$ (j=0). Then, the CPU 161 shifts the processing thereof to that at a step S13.

On the other hand, if the CPU 161 judges that the reproduction position $P_1(t_0)-P_2(t_0)$ is within the regulated range at the step S9 (step S9; Yes), then the CPU 161 sets "0" in the region of j=0 in the "hearing possibility $U(t_0+j)$" storing region in the RAM 162, that is, the CPU 161 sets "0" in the "hearing possibility $U(t_0)$" storing region (step S12), and the CPU 161 records the effect of falling in the region $S_0$ satisfying the identifiable condition at the time $t_0+j$ (j=0).

Next, the CPU 161 executes the reproduction control program 163b3 to reproduce the reproduction data stored in the storage medium 11 at the reproduction position $P_2(t_0)$ (step S13).

To put it concretely, the CPU 161 makes the reading section 12 obtain the part at the time coordinate $P_2(t_0)$ in the reproduction data stored in the storage medium 11, and outputs the obtained reproduction data to the sound output apparatus 3 through the decoder 13 and the time scale modification section 14. Hereby, the sound based on the reproduction data is output from the sound output apparatus 3.

Next, the CPU 161 sets "$t_0+1$" in a "present time of time to" storing region in the RAM 162 (step S14), and repeatedly performs the processing on and after the step S3.

Then, the CPU 161 repeatedly performs the processing from the step S3 to the step S14 until, for example, a user operates the operation section 15 to instruct the end of the reproduction of the reproduction data, or until the whole reproduction data stored in the storage medium 11 has been fully reproduced.

Figure 10:
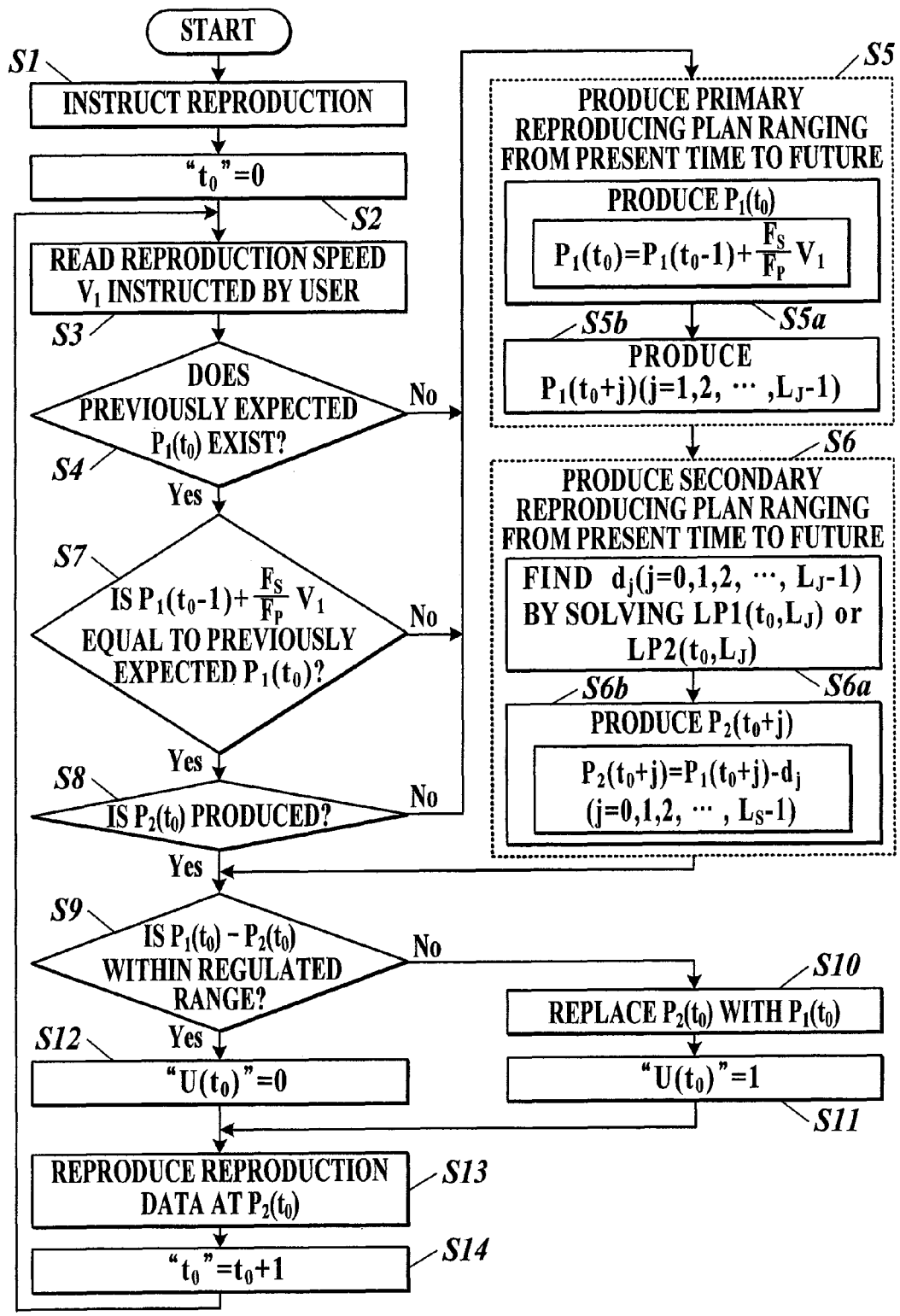
FIG. 10 is a flow chart for illustrating the processing pertaining to the reproduction of reproduction data stored in a storage medium by the reproducing apparatus of the present invention.
Figure 11:
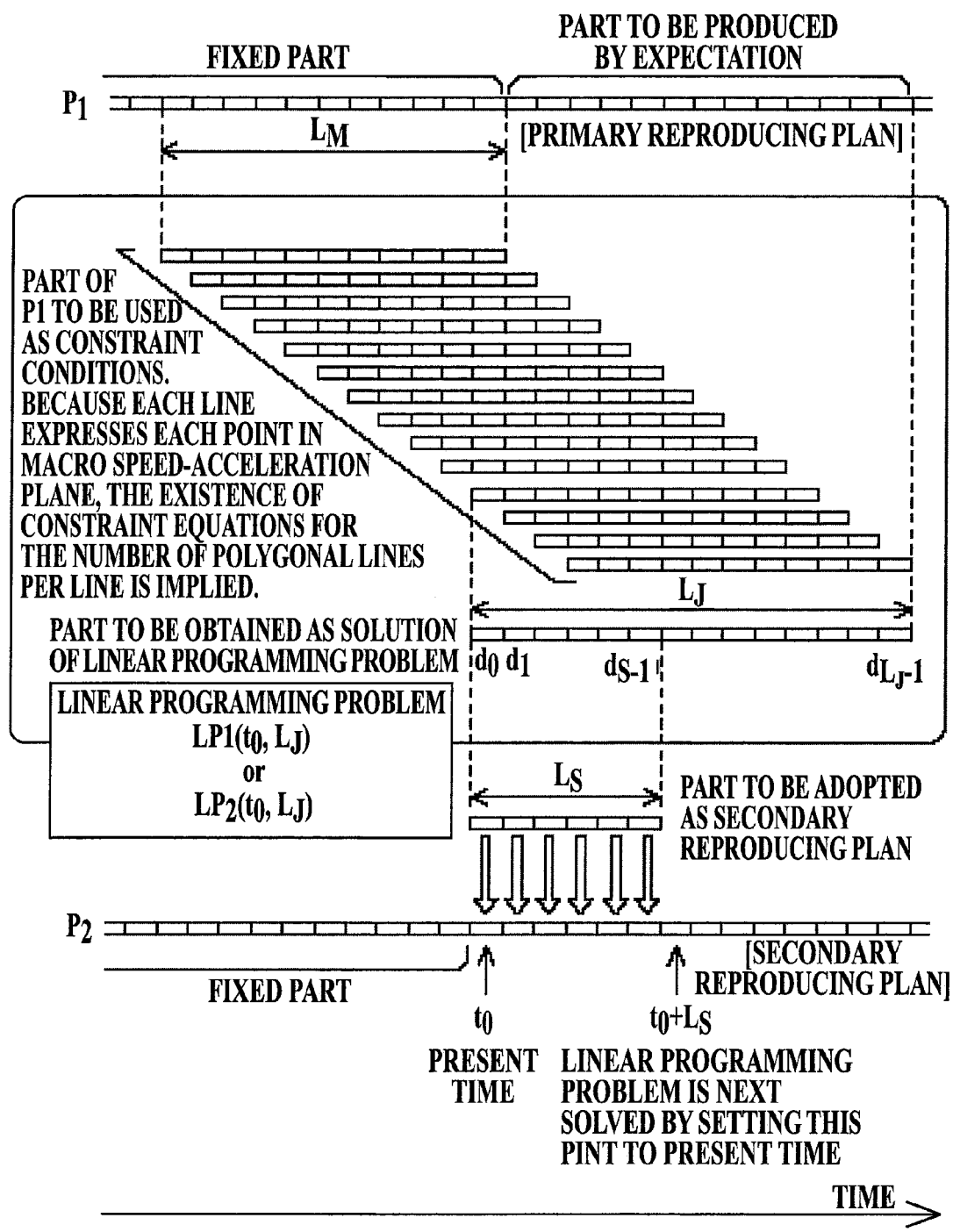
FIG. 11 is a diagram showing a situation in which each variable is being updated by reproducing processing of the reproducing apparatus of the present invention.

Next, the situation of the update of each variable by the reproduction processing (FIG. 10) of the reproducing apparatus 1 is shown in, for example, FIG. 11. The abscissa axis of FIG. 11 is a time scale.

At the time $t=t_0$, the reproducing apparatus 1 produces a reproduction position $P_1(t_0+j)$ (j=0, 1, ..., $L_J-1$) by the primary reproducing plan $P_1$ for $L_J$ samples starting from time to by expecting the reproduction position $P_1(t_0+j)$ before solving the linear programming problem, and stores the reproduction position $P_1(t_0+j)$ into the primary reproducing plan accumulating file 163a2.

Then, the reproducing apparatus 1 solves the linear programming problem $LP1(t_0, L_J)$ or the improved type linear programming problem $LP2(t_0, L_J)$ for the $L_J$ samples starting from the time to by the linear programming by the use of the reproduction positions for $L_M$ samples in the past and reproduction positions for $L_J$ samples in the future among the reproduction positions $P_1(t)$ by the primary reproducing plan $P_1$ accumulated in the primary reproducing plan accumulating file 163a2, and there by the reproducing apparatus 1 obtains the $L_J$ amounts of corrections $d_j$ (j=0, 1, ..., $L_J-1$).

Then, the reproducing apparatus 1 produces a reproduction position $P_2(t_0+j)$ (j=0, 1, ..., $L_S-1$) by the secondary reproducing plan $P_2$ by the use of the first $L_S$ amounts of corrections $d_j$ among the obtained amounts of corrections $d_j$ (j=0, 1, ..., $L_J-1$), and stores the reproduction position $P_2(t_0+j)$ into the secondary reproducing plan accumulating file 163a3. That is, the linear programming problem is set to be solved every time interval for $L_S$ samples of the sampling frequency FP.

After that, if the change instruction of the reproduction speed by a user's operation of the operation section 15 is not performed, that is, if the result of the step S7 of the reproducing processing (FIG. 10) of the reproducing apparatus 1 is yes, then the reproduction of reproduction data is performed in the time interval for the $L_S$ samples in accordance with the secondary reproducing plan $P_2$ accumulated in the secondary reproducing plan accumulating file 163a3.

Then, when it becomes the time $t=t_0+L_S$, a new linear programming problem is generated, and it is solved.

Here, the time interval for $L_J$ samples is the time interval, for example, for about one second to about two seconds, and the time interval for $L_S$ samples is shorter than the time interval for $L_J$ samples, and, for example, is the time interval for about 0.5 seconds to about one second.

Incidentally, if the change instruction of the reproduction speed is performed by the user's operation of the operation section 15, then it is necessary to solve the linear programming problem again.

Moreover, if the difference $(P_1(t_0)-P_2(t_0))$ between the reproduction position $P_1(t_0)$ by the primary reproducing plan $P_1$ and the reproduction position $P_2(t_0)$ by the secondary reproducing plan $P_2$ does not fall in a previously set regulated range, then the reproduction position $P_2(t_0)$ is replaced by the reproduction position $P_1(t_0)$ because the difference between the reproduction position according to the reproduction speed instructed by the user and the actual reproduction position is too large if the "hearing of words and phrases" is being secured to the user, and the difference is made to be recovered at a sitting (to put it concretely, see, for example, step S10 in FIG. 10). However, the recovery is not limited to this manner. For example, the difference may be shortened by performing high-speed reproduction at a predetermined speed (for example, 8×-speed).

Next, the primary reproducing plan $P_1$ and the secondary reproducing plan $P_2$ produced by sequentially solving the improved type linear programming problem $LP2(t_0, L_J)$ by executing the reproducing processing (FIG. 10) of the reproducing apparatus 1 are mutually compared by the use of, for example, the macro speed-acceleration plane shown in FIGS. 12A, 12B, 13A, and 13B.

FIGS. 12A, 12B, 13A, and 13B show the results of the execution of the reproducing processing (FIG. 10) of the reproducing apparatus 1 to the improved type linear programming problem $LP2(t_0, L_J)$ in the region $S_0$ satisfying different two kinds of identifiable conditions. The parameters were set as follows: $L_J=90$ (corresponding to 1.5 seconds), $L_S=30$ (corresponding to 0.5 seconds), and $\alpha=\beta=0.011$.

Figure 12A:
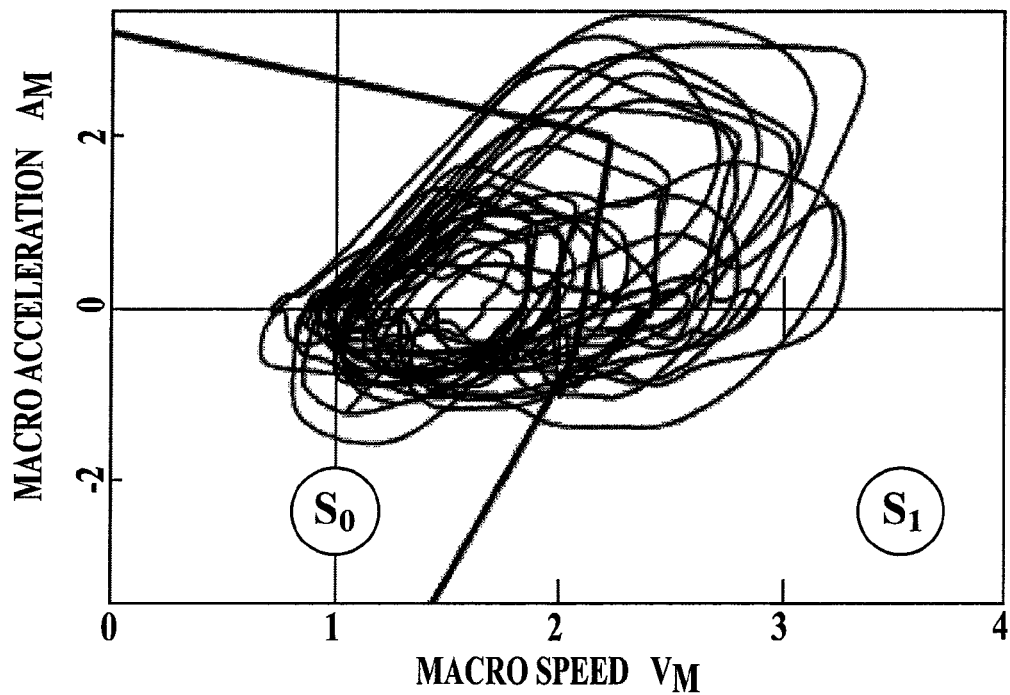
FIGS. 12A and 12B are diagrams showing the loci of a primary reproducing plan and a secondary reproducing plan, respectively, in a macro speed-acceleration plane.
Figure 12B:
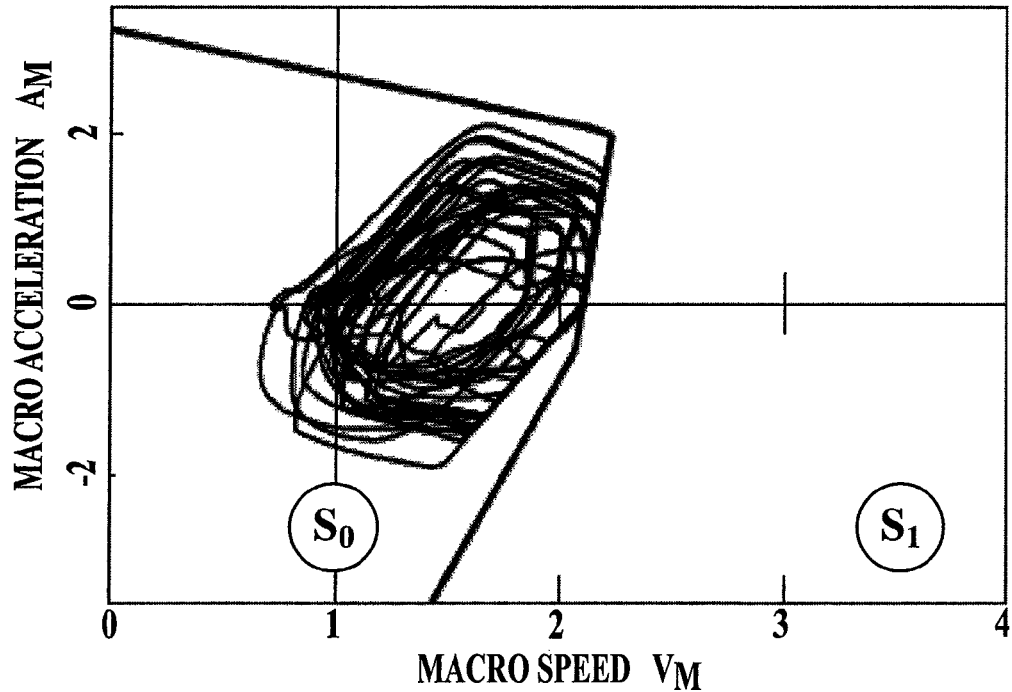

FIGS. 12A and 12B show the case of using the polygonal line obtained in FIG. 6.

FIG. 12A shows the loci of the primary reproducing plan $P_1$ for three minutes including speed changes from 1×-speed to 4×-speed, and FIG. 12B shows the loci of the secondary reproducing plan $P_2$ produced by sequentially applying the improved type linear programming problem $LP2(t_0, L_J)$ so as to fall in the region $S_0$ satisfying the identifiable condition on the basis of the primary reproducing plan $P_1$ of FIG. 12A.

According to FIG. 12A, because many loci deviating from the region $S_0$ satisfying the identifiable condition are included, it is presumed that failure of hearing will be frequently generated.

On the other hand, according to FIG. 12B, because the entire loci fall in the region $S_0$ satisfying the identifiable condition, it can be expected that almost no failure of hearing occurs.

Figure 13A:
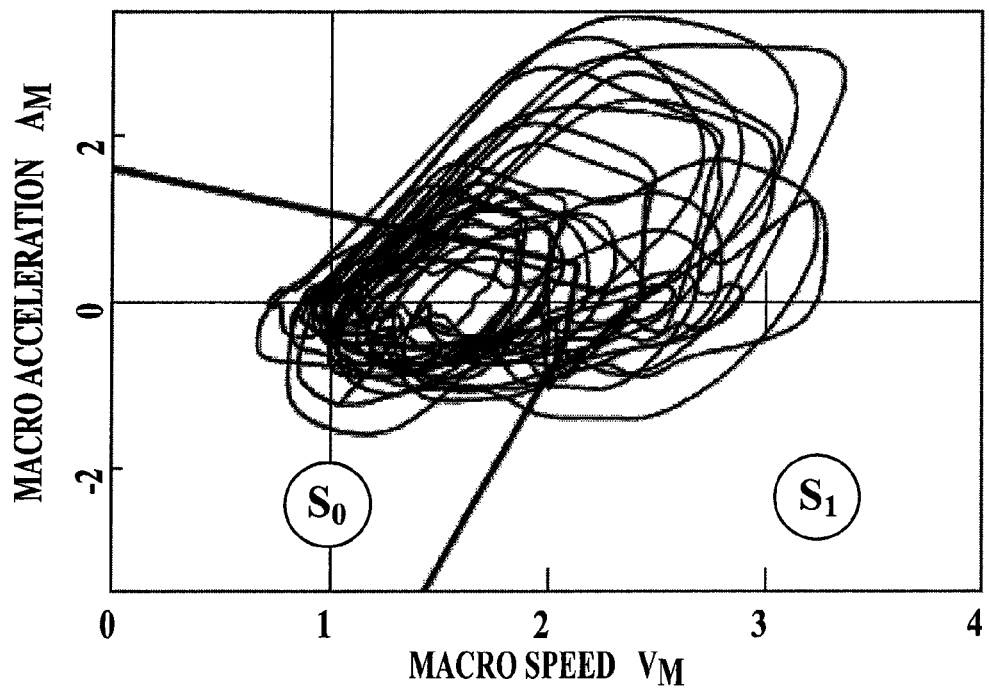
FIGS. 13A and 13B are diagrams showing the loci of the primary reproducing plan and the secondary reproducing plan, respectively, in the case of using a polygonal line for which the condition of the macro acceleration is made to be stricter than that in FIGS. 12A and 12B.
Figure 13B:
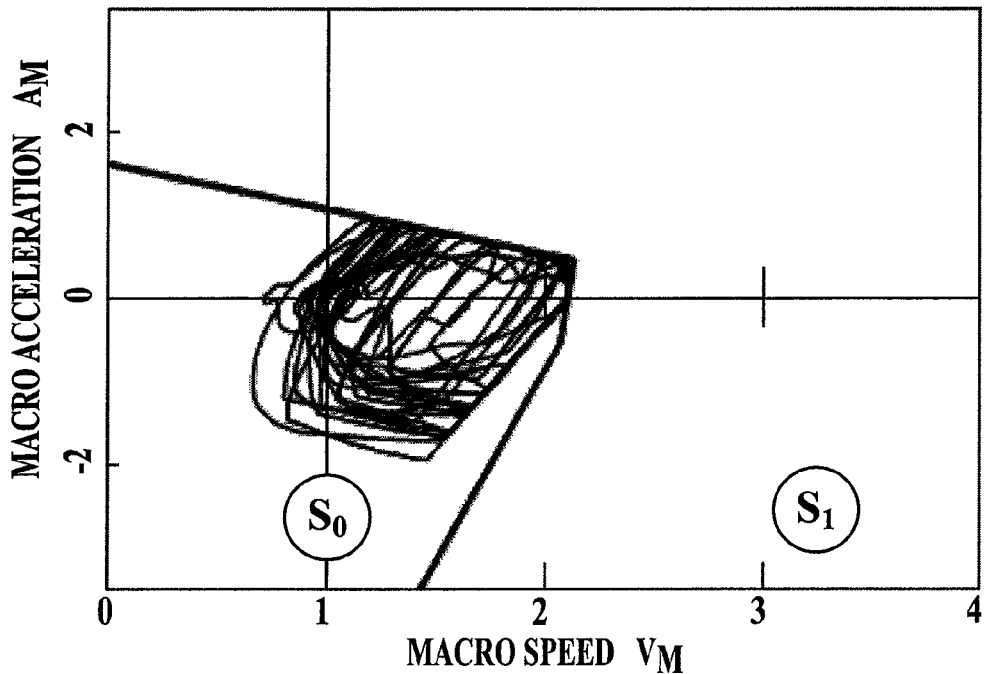

FIGS. 13A and 13B show the cases using a polygonal line having stricter condition of the macro acceleration $A_M(t)$ than that of the polygonal line obtained in FIG. 6.

FIG. 13A shows the same loci as those of FIG. 12A, and FIG. 13B shows the loci of the secondary reproducing plan $P_2$ produced by sequentially applying the improved type linear programming problem $LP2(t_0, L_J)$ so as to fall in the region $S_0$ satisfying the identifiable condition on the basis of the primary reproducing plan $P_1$ of FIG. 13A.

According to FIG. 13A, because many loci deviating from the region $S_0$ satisfying the identifiable condition are included similarly to FIG. 12A, it is presumed that the failure of hearing will be frequently generated.

On the other hand, according to FIG. 13B, because the entire loci fall in the region $S_0$ satisfying the identifiable condition similarly to FIG. 12B, it can be expected that almost no failure of hearing occurs.

According to FIGS. 12A, 12B, 13A, and 13B, it was found that the loci of the primary reproducing plan $P_1$ included many loci deviating from the region $S_0$ satisfying the identifiable condition in the macro speed-acceleration plane, but that the loci of the secondary reproducing plan $P_2$ fully fell in the region $S_0$ satisfying the identifiable condition.

Moreover, it was found that the loci of the secondary reproducing plan $P_2$ fully fell in the region $S_0$ satisfying the identifiable condition even if the form of the region $S_0$ satisfying the identifiable condition defined by the polygonal line was changed.

Figure 14A:
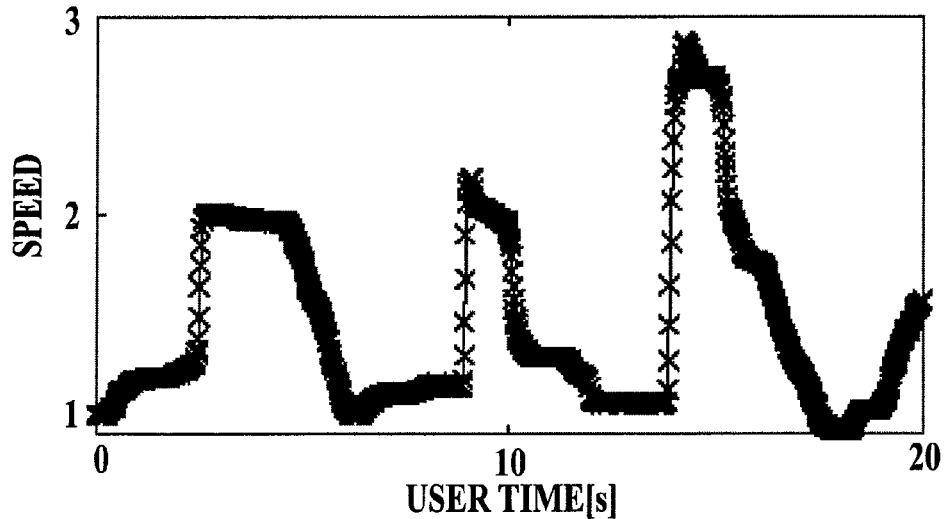
FIGS. 14A, 14B, and 14C are diagrams showing the changes of the reproduction speeds of the primary reproducing plan shown in FIGS. 12A and 13A, the secondary reproducing plan shown in FIG. 12B, and the secondary reproducing plan shown in FIG. 13B, respectively.
Figure 14B:
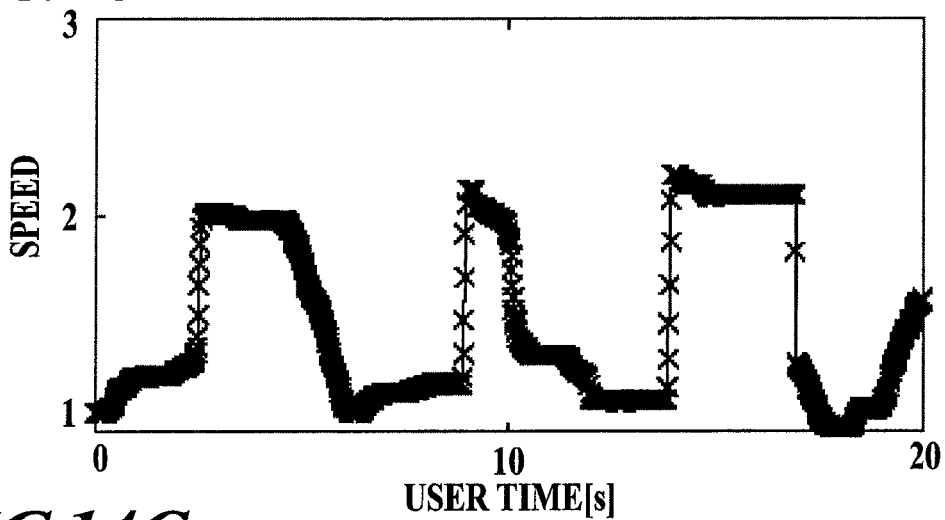
Figure 14C:
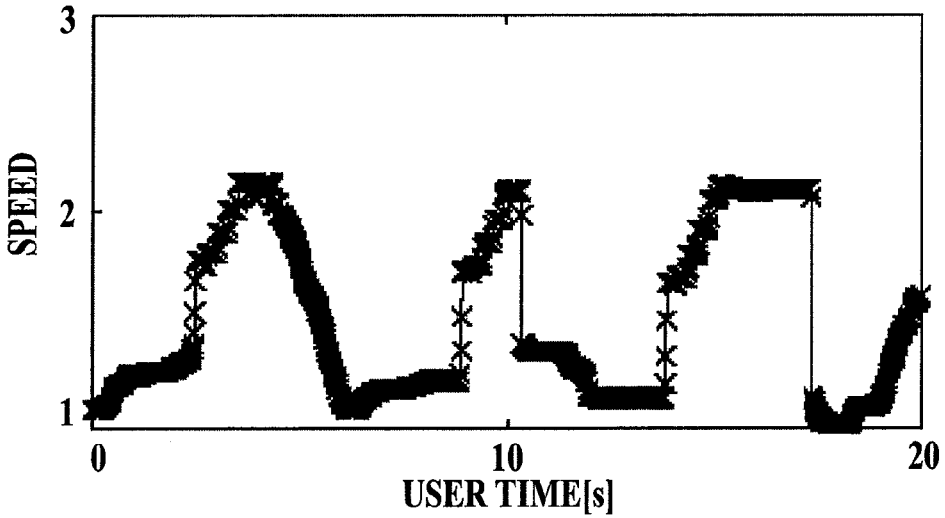

Next, the primary reproducing plan $P_1$ and the secondary reproducing plan $P_2$ produced by sequentially solving the improved type linear programming problem $LP2(t_0, L_J)$ by executing the reproducing processing (FIG. 10) of the reproducing apparatus 1 were mutually compared by the use of, for example, the drawings showing the changes of the reproduction speed shown in FIGS. 14A-14C. The abscissa axes of FIGS. 14A-14C indicate time, and the ordinate axis indicates reproduction speeds.

FIG. 14A shows the changes of the reproduction speed for the first 20 seconds of the primary reproducing plan $P_1$ shown in FIG. 12A (FIG. 13A); FIG. 14B shows the changes of the reproduction speed for the first 20 seconds of the secondary reproducing plan $P_2$ shown in FIG. 12B; and FIG. 14C shows the changes of the reproduction speed for the first 20 seconds of the secondary reproducing plan $P_2$ shown in FIG. 13B.

According to FIGS. 14A-14C, it was found that high-speed reproduction was started in the vicinities of 2.5 seconds, 9 seconds, and 14 seconds from the ways of the changes of the reproduction speeds.

According to FIG. 14A, it was found that the reproduction speed rapidly changed at the starts of high-speed reproduction.

On the other hand, according to FIG. 14B, it was found that the drastic changes of the reproduction speed at the starts of high-speed reproduction (especially in the vicinity of 14 seconds) were suppressed as compared with the changes in FIG. 14A, and that the changes of the reproduction speed of the secondary reproducing plan $P_2$ were more gentle as compared with those of the primary reproducing plan $P_1$.

Moreover, according to FIG. 14C, it was found that the rapid changes of the reproduction speed at the start of high-speed reproduction were furthermore suppressed as compared with those of FIG. 14B because the condition of the macro acceleration $A_M(t)$ was severer, and that the changes of the reproduction speed of the secondary reproducing plan $P_2$ of FIG. 14C were more gentle as compared with those of the secondary reproducing plan $P_2$ in FIG. 14B.

That is, according to FIGS. 14B and 14C, it was found that the property of the produced secondary reproducing plan $P_2$ was changed by controlling the form of the polygonal line.

According to the reproducing apparatus 1 of the present invention described above, a user can instruct the reproduction speed of the reproduction data stored in the storage medium 11 with the operation section 15; the CPU 161, which has executed the primary reproducing plan producing program $163b1$, can produce the primary reproducing plan $P_1$ ranging from the present time to the future according to the reproduction speed $V_1$ instructed with the operation section 15; the CPU 161, which has executed the secondary reproducing plan producing program $163b2$, produces the secondary reproducing plan $P_2$ ranging from the present time to the future, which secondary reproducing plan $P_2$ is the one modifying the primary reproducing plan $P_1$, by solving the optimization problem by the use of the linear programming as the linear programming problem (linear programming problem $LP1(t_0, L_J)$ or the improved type linear programming problem $LP2(t_0, L_J)$) on the basis of the primary reproducing plan $P_1$ produced by the CPU 161, which has executed the primary reproducing plan producing program $163b1$; the reading section 12 can obtain reproduction data from the storage medium 11 in accordance with the secondary reproducing plan $P_2$ produced by the CPU 161, which has executed the secondary reproducing plan producing program $163b2$; and the CPU 161, which has executed the reproduction control program $163b3$, can output the reproduction data obtained by the reading section 12 to the predetermined sound output apparatus 3.

Consequently, because the changes of the reproduction speed of the reproduction data can be adjusted so as to minimize the difference with the reproduction speed $V_1$ instructed by the user, and to satisfy the constraint condition of falling in the identifiable condition, the secondary reproducing plan $P_2$ becomes the one matched to the human property, and the variable speed reproduction of the reproduction data can be performed in the state of being easy for a user to perform looking and listening.

Incidentally, the present invention is not limited to the embodiment described above, but the embodiment can be suitably changed without departing from the subject matter of the invention.

<Modification 1>

The development of the secondary reproducing plan $P_2$ becomes easy by taking in the problem pertaining to the determination of the secondary reproducing plan $P_2$ in the time interval ranging from the present time to the future like the embodiment, but the basic concept of the present invention is not limited to the linear programming, and may be deviated from the linear programming to be expanded.

Figure 15:
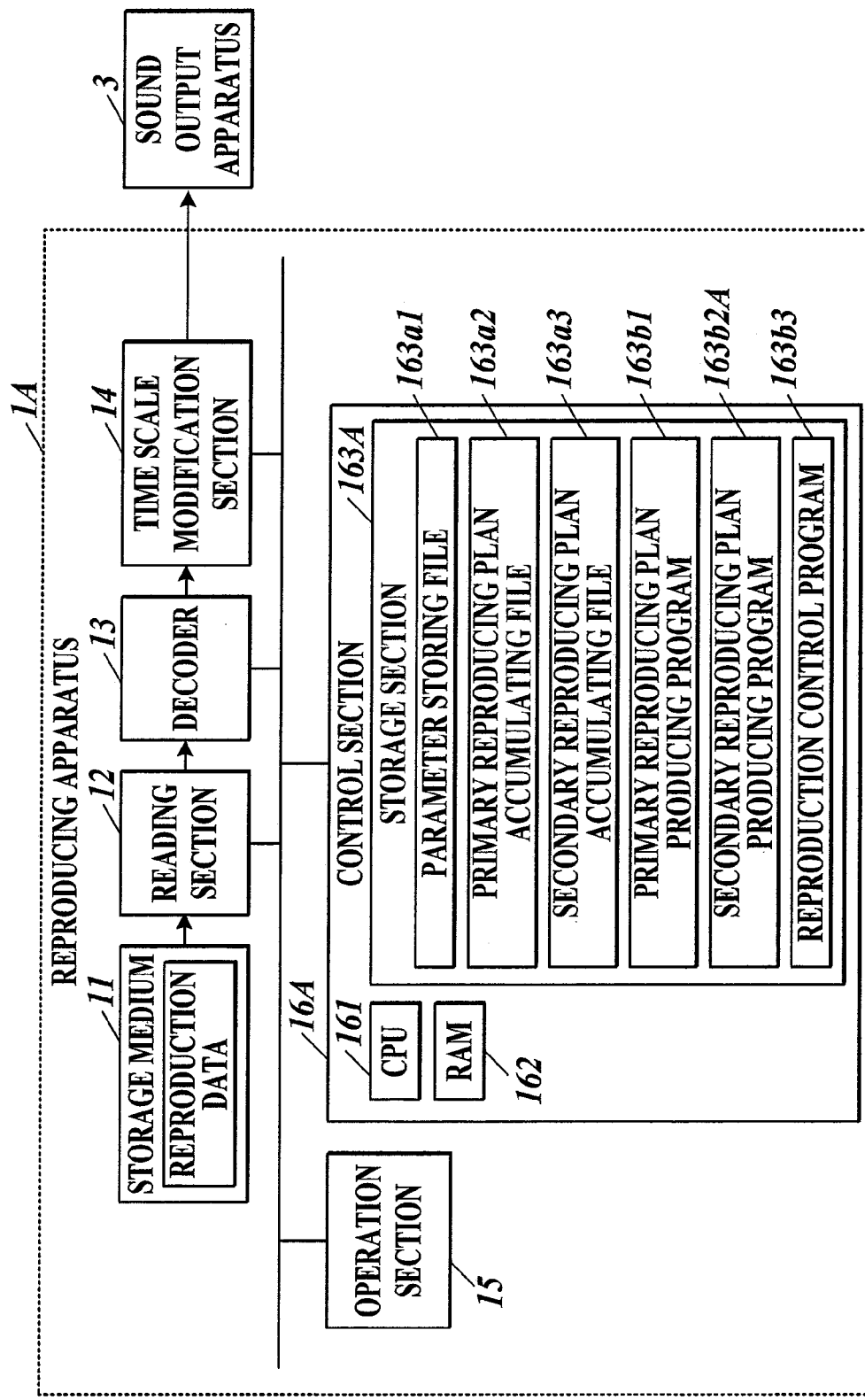
FIG. 15 is a diagram showing the functional configuration of a reproducing apparatus of a modification 1.

To put it concretely, for example, as a reproducing apparatus 1A shown in FIG. 15, the optimization problem may be solved by the use of a nonlinear programming method as a nonlinear programming problem.

Here, although the linear programming problem is an optimization problem in which the objective function and the constraint condition are linear, the nonlinear programming problem is an optimization problem in which the objective function and/or the constraint condition is nonlinear.

As the nonlinear modeling of an objective function, for example, it is considerable to define the objective function as $O_F = \Sigma d(t)^2$ or the like. Moreover, for example, if reproduction data is composed of sound data and image data, then it is also considerable to prevent the separation by extremely enlarging an objective function $O_F$ to a time difference by which the shift between the image and the sound exert stress. All of them generate a nonlinear objective function.

As the nonlinear modeling of a constraint condition, for example, it is considerable not to define the macro speed $V_M(t)$ and the macro acceleration $A_M(t)$ as the linear combination of the reproduction position $P_2(t)$ of the secondary reproducing plan $P_2$, but to define as a nonlinear function according to the human property. Moreover, it is also considerable not to define the region $S_0$ satisfying the identifiable condition with the polygonal line, but to define it with a curved line. All of them generate nonlinear constraint conditions.

Incidentally, the reproducing apparatus 1A different from the reproducing apparatus 1 of the embodiment (FIG. 9) in only a part of the configuration of the control section 16, for example. Accordingly, only the different parts are described, and the other common parts are described by means of the same reference marks.

To put it concretely, a control section 16A of the reproducing apparatus 1A is composed of, for example, the CPU 161, the RAM 162, and a storage section 163A, as shown in FIG. 15.

The storage section 163A stores, for example, the parameter storing file 163a1, the primary reproducing plan accumulating file 163a2, the secondary reproducing plan accumulating file 163a3, the primary reproducing plan producing program 163b1, a secondary reproducing plan producing program 163b2A, the reproduction control program 163b3, as shown in FIG. 15.

The secondary reproducing plan producing program 163b2A enables the CPU 161 to realize, for example, the function of producing the secondary reproducing plan $P_2$ ranging from the present time to the future which secondary reproducing plan $P_2$ is the one modifying the primary reproducing plan $P_1$ by solving the optimization problem as a nonlinear programming problem by the use of the nonlinear programming method on the basis of the primary reproducing plan $P_1$ produced by the CPU 161, which has executed the primary reproducing plan producing program 163b1, and parameters (such as $M_V(\tau)$, $M_A(\tau)$, $C_{Vk}$, $C_{Ak}$, and $C_{Ck}$) pertaining to the human property stored in the parameter storing file 163a1.

To put it concretely, the optimization problem is solved by using a nonlinear programming method as a nonlinear programming problem so that a vector may fall in a previously set region indicating an identifiable condition, which region is located in a plane or a space in which the vector is geometrically included, as a constraint condition, in order to minimize a linear function or a nonlinear function based on a difference $d_j$ between a reproduction position $P_1(t_0+j)$ by the primary reproducing plan $P_1$ and a reproduction position $P_2(t_0+j)$ by the secondary reproducing plan $P_2$ (or a sum of the linear function or the nonlinear function based on the difference $d_j$ between the reproduction position $P_1(t_0+j)$ by the primary reproducing plan $P_1$ and the reproduction position $P_2(t_0+j)$ by the secondary reproducing plan $P_2$ and the magnitude $a_j+b_j$ of the reproduction acceleration by the secondary reproducing plan $P_2$), as an objective function. The vector is composed of the element of a linear function or a nonlinear function based on at least one of a reproduction position $P_2(t_0+j)$ by the secondary reproducing plan $P_2$, a reproduction speed $V_2(t_0+j)$, and a reproduction acceleration $A_2(t_0+j)$.

Moreover, the secondary reproducing plan producing program 163b2A enables the CPU 161 to realize, for example, the function of judging whether the difference between the primary reproducing plan $P_1$ produced by the CPU 161, which has executed the primary reproducing plan producing program 163b1, and the produced secondary reproducing plan $P_2$ is within a previously set regulated range or not, and of replacing the produced secondary reproducing plan $P_2$ with the primary reproducing plan $P_1$ produced by the CPU 161, which has executed the primary reproducing plan producing program 163b1, if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and the judgment section by executing this secondary reproducing plan producing program 163b2A.

According to the reproducing apparatus 1A of the modification 1, it is possible to produce the secondary reproducing plan $P_2$ ranging from the present time to the future, which secondary reproducing plan $P_2$ is the one modifying the primary reproducing plan $P_1$, by solving the optimization problem by the use of the nonlinear programming method as a nonlinear programming problem by the CPU 161, which has executed the secondary reproducing plan producing program 163b2A, on the basis of the primary reproducing plan $P_1$ produced by the CPU 161, which has executed the primary reproducing plan producing program 163b1.

Consequently, the secondary reproducing plan $P_2$ becomes more matched one to the human property, and the variable speed reproduction of reproduction data can be performed in the state of being more easy for a user to perform looking and listening.

<Modification 2>

If the number of samples $L_J$ is set to be large by enlarging the sampling frequency $F_P$, the linear programming problem of the embodiment becomes a huge problem, and the computation load of the CPU 161 built in the reproducing apparatus 1 becomes too large.

On the other hand, because the region $S_0$ satisfying the identifiable condition in the macro speed-acceleration plane was found by averaging those of many people, the region $S_0$ is frequently not required to be strictly realized so much.

In such cases, the linear programming problem may not be solved by the use of the linear programming routine, but may be approximately solved.

Figure 16:
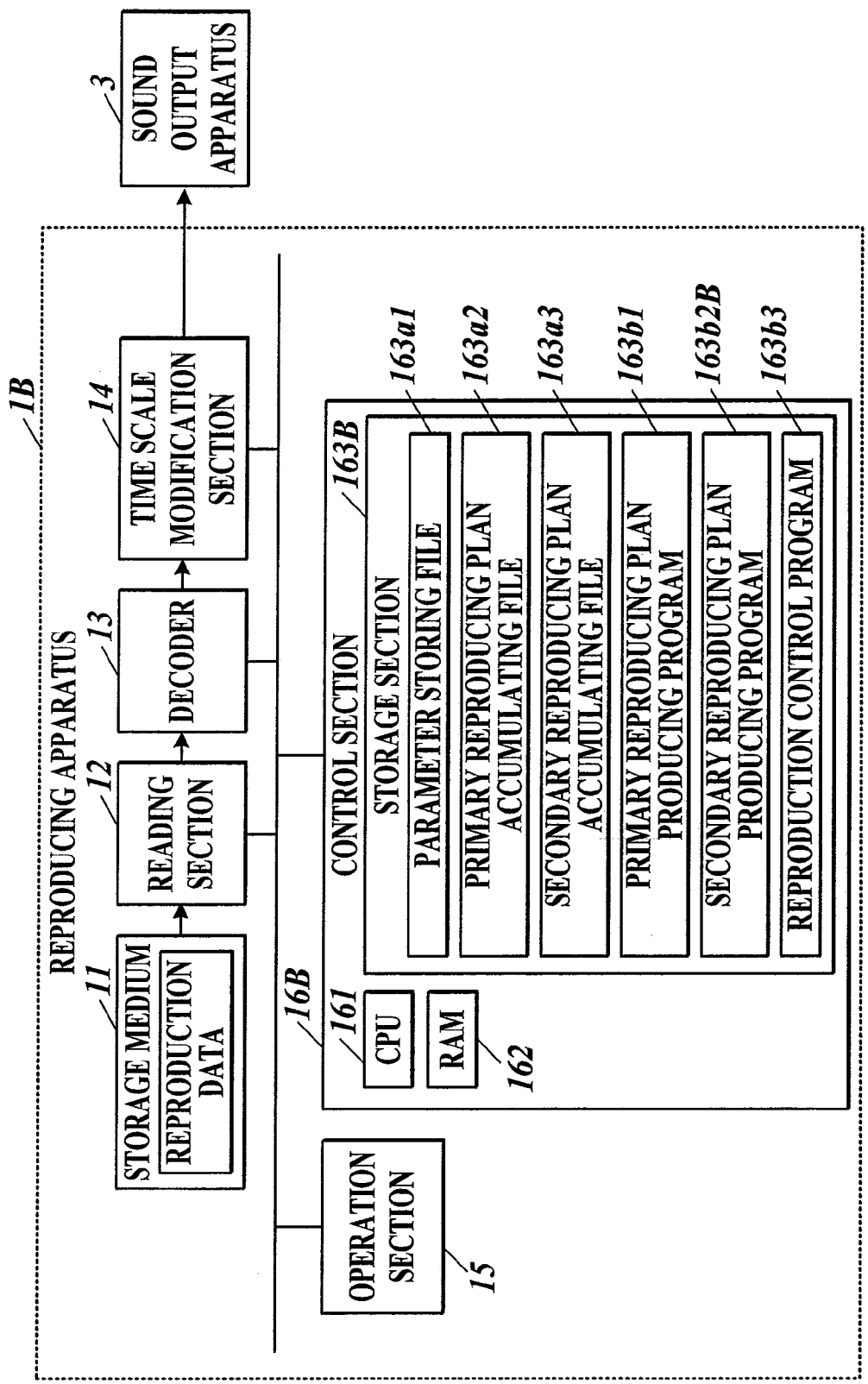
FIG. 16 is a diagram showing the functional configuration of a reproducing apparatus of a modification 2.

To put it concretely, for example, as a reproducing apparatus 1B shown in FIG. 16, the linear programming problem may be solved by the use of the approximate method. In the following, the approximate method is written as $QLP(t_0, L_J)$.

Incidentally, the reproducing apparatus 1B different from the reproducing apparatus 1 of the embodiment (FIG. 9) in only a part of the configuration of the control section 16, for example. Accordingly, only the different parts are described, and the other common parts are described by means of the same reference marks.

To put it more concretely, the control section 16B of the reproducing apparatus 1B is composed of the CPU 161, the RAM 162, and a storage section 163B, as shown in FIG. 16.

The storage section 163 stores, for example, the parameter storing file 163a1, the primary reproducing plan accumulating file 163a2, the secondary reproducing plan accumulating file 163a3, the primary reproducing plan producing program 163b1, a secondary reproducing plan producing program 163b2B, and the reproduction control program 163b3, as shown in FIG. 16.

The secondary reproducing plan producing program 163b2B enables the CPU 161 to realize, for example, the function of producing the secondary reproducing plan $P_2$ ranging from the present time to the future, which secondary reproducing plan $P_2$ is the plan modifying the primary reproducing plan $P_1$ by the use of the approximate method $QLP(t_0, L_J)$ on the basis of the primary reproducing plan $P_1$ produced by the CPU 161, which has executed the primary reproducing plan producing program 163b1.

To put it concretely, the CPU 161 produces, for example, the secondary reproducing plan $P_2$, in which a vector composed of the element of at least one linear combination of the reproduction position $P_2(t_0+j)$ by the secondary reproducing plan $P_2$, the reproduction speed $V_2(t_0+j)$, and the reproduction acceleration $A_2(t_0+j)$ satisfies the constraint condition that the vector falls in a previously set region expressing the identifiable condition which region is located in a plane or a space geometrically including the vector therein. Moreover, the secondary reproducing plan $P_2$ minimizes the difference $d_j$ between the reproduction position $P_1(t_0+j)$ by the primary reproducing plan $P_1$ and the reproduction position $P_2(t_0+j)$ by the secondary reproducing plan $P_2$ (or the sum of the difference $d_j$ between the reproduction position $P_1(t_0+j)$ by the primary reproducing plan $P_1$ and the reproduction position $P_2(t_0+j)$ by the secondary reproducing plan $P_2$ and a magnitude $a_j+b_j$ of the reproduction acceleration by the secondary reproducing plan $P_2$). Furthermore, by the secondary reproducing plan $P_2$, the reproduction acceleration $A_2(t_0+j)$ is located in a predetermined range (within an $a_{MAX}$ range from an $a_{MIN}$), and the reproduction acceleration $A_2(t_0+j)$ is a constant (reproduction acceleration a) in a previously set time interval ($L_J$).

Moreover, the secondary reproducing plan producing program 163b2B enables the CPU 161 to realize, for example, the function of judging whether the difference between the primary reproducing plan $P_1$ produced by the CPU 161, which has executed the primary reproducing plan producing program 163b1, and the produced secondary reproducing plan $P_2$ is within a previously set regulated range or not, and of replacing the produced secondary reproducing plan $P_2$ with the primary reproducing plan $P_1$ produced by the CPU 161, which has executed the primary reproducing plan producing program 163b1 if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and the judgment section by executing this secondary reproducing plan producing program 163b2B.

[Reproducing Processing]

Figure 17:
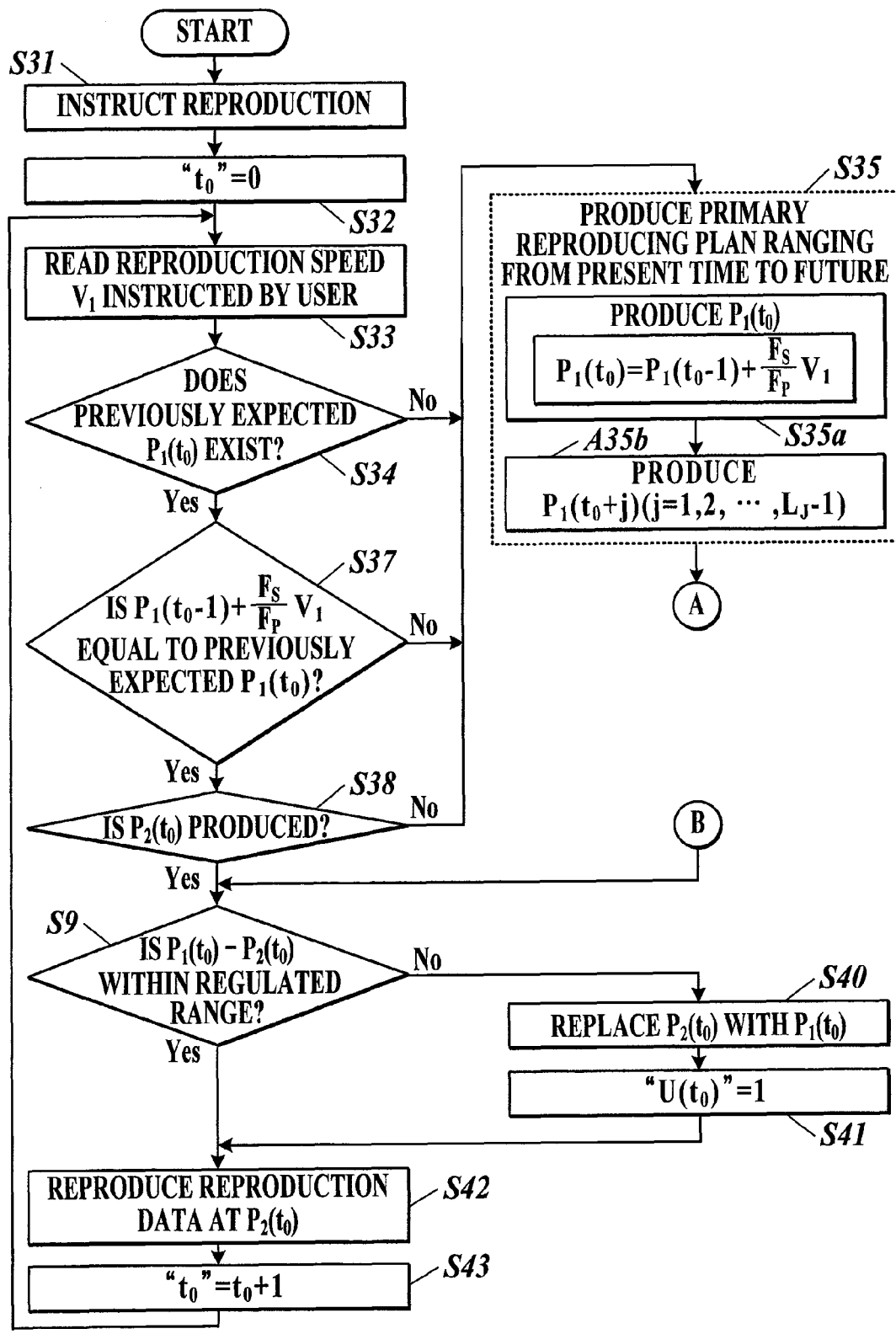
FIG. 17 is a first flow chart for illustrating the processing pertaining to the reproduction of reproduction data stored in a storage medium by the reproduction apparatus of the modification 2.
Figure 18:
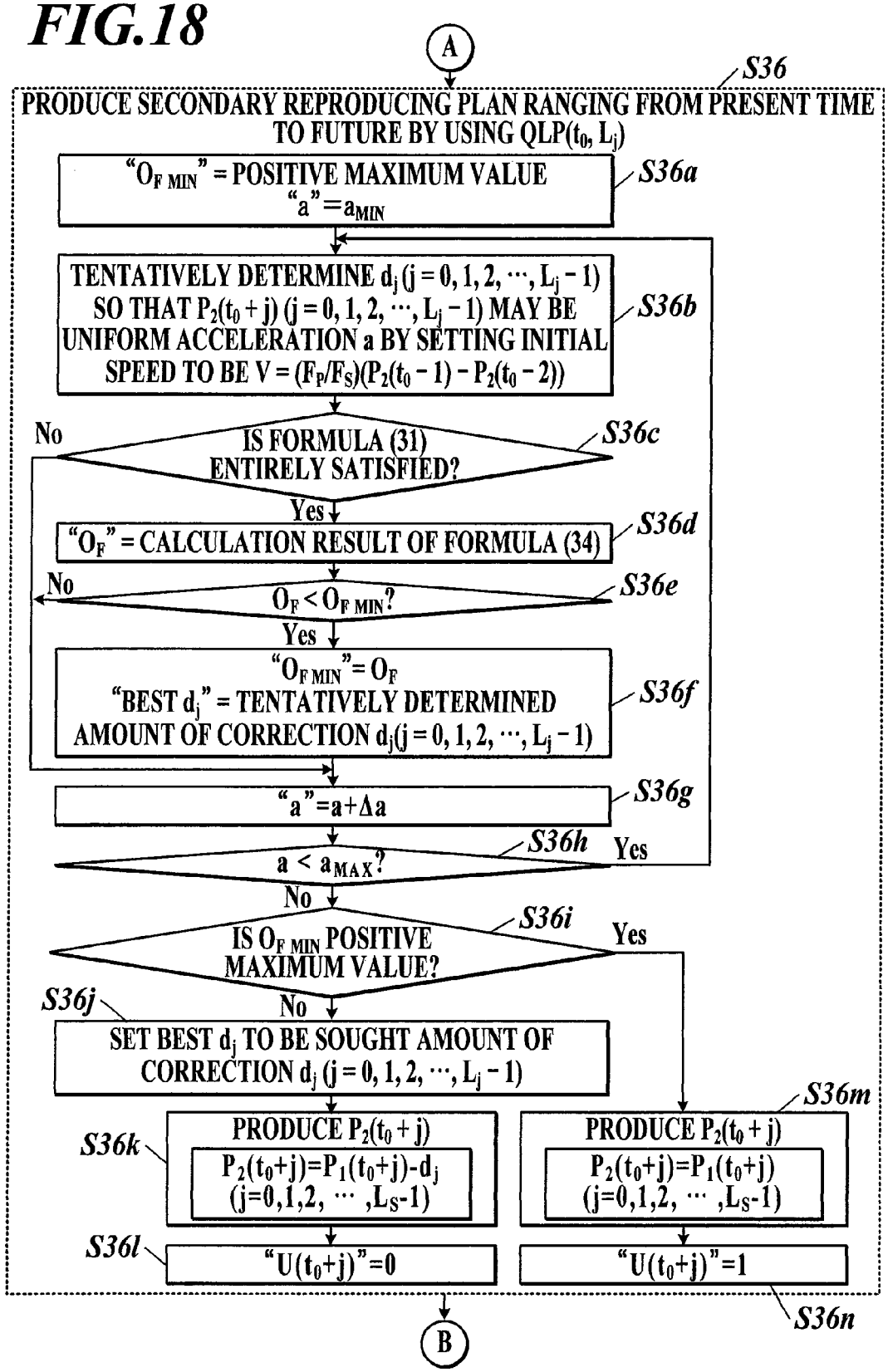
FIG. 18 is a second flow chart for illustrating the processing pertaining to the reproduction of the reproduction data stored in the storage medium by the reproduction apparatus of the modification 2.

Next, the processing pertaining to the reproduction of the reproduction data stored in the storage medium 11 by the reproducing apparatus 1B is described with reference to the flow chart of FIGS. 17 and 18.

When a user operates the operation section 15 to instruct the reproduction of the reproduction data stored in the storage medium 11 (step S31), the CPU 161 sets "0" in the "present time of time $t_0$" storing region in the RAM 162 (step S32).

Next, the CPU 161 reads the reproduction speed $V_1$ at the time of reproducing the reproduction data stored in the storage medium 11 which reproduction data has been instructed by the user's operation of the operation section 15 (step S33).

Next, the CPU 161 judges whether the reproduction position $P_1(t_0)$ is accumulated in the primary reproducing plan accumulating file 163a2 or not, that is, whether the previously expected reproduction position $P_1(t_0)$ by the primary reproducing plan $P_1$ at the time $t_0$ exists or not (step S34).

When the CPU 161 judges that the previously expected reproduction position $P_1(t_0)$ does not exist at the step S34 (step S34; No), the CPU 161 executes the primary reproducing plan producing program 163b1 to produce the primary reproducing plan $P_1$ ranging from the present time to the future (step S35).

To put it concretely, the CPU 161 produces the reproduction position $P_1(t_0)$ $(=P_1(t_2-1)+(F_S/F_P)V_1)$ by the primary reproducing plan $P_1$ at the present time on the basis of, for example, the reproduction speed $V_1$ read at the step S33 and the reproduction position $P_1(t_0-1)$ accumulated in the primary reproducing plan accumulating file 163a2 (step S35a), and stores the produced reproduction position $P_1(t_0)$ into the primary reproducing plan accumulating file 163a2

Next, the CPU 161 produces the reproduction position $P_1(t_0+j)$ (j=1, 2, ..., $L_J-1$) by the primary reproducing plan $P_1$ in the future by expecting the future primary reproducing plan $P_1$ (step S35b), and stores the produced reproduction position $P_1(t_0+j)$ into the primary reproducing plan accumulating file 163a2.

Next, the CPU 161 executes the secondary reproducing plan producing program 163b2B to produce the secondary reproducing plan $P_2$ ranging from the present time to the future by the use of the approximate method QLP($t_0$, $L_J$) (step S36), and shifts the processing thereof to the processing at step S39.

To put it concretely, the CPU 161 sets a "positive maximum value" in a "$O_{F\ MIN}$" storing region in the RAM 162, and sets a predetermined "$a_{MIN}$" in a "reproduction acceleration a" storing region in the RAM 162 (step S36a).

Next, the CPU 161 sets an initial speed V to V=$(F_P/F_S)(P_2(t_0-1)-P_2(t_0-2))$, and tentatively determines the amount of correction $d_j$ (j=0, 1, ..., $L_J-1$) so that the reproduction position $P_2(t_0+j)$ (j=0, 1, ..., $L_J-1$) by the secondary reproducing plan $P_2$ ranging from the present time to the future may be the equal reproduction acceleration a (step S36b).

Next, the CPU 161 judges whether the constraint condition is satisfied to the amount of correction $d_j$ (j=0, 1, ..., $L_J-1$) determined tentatively at the step S36b or not, that is, whether the formula (31) is entirely satisfied or not (step S36c).

If the CPU 161 judges that the formula (31) is not entirely satisfied to the amount of correction $d_j$ (j=0, 1, ..., $L_J-1$) determined tentatively at the step S36b at the step S36c (step S36c; No), the CPU 161 shifts the processing thereof to that at step S36g.

On the other hand, if the CPU 161 judges that the formula (31) is entirely satisfied to the amount of correction $d_j$ (j=0, 1, ..., $L_J-1$) determined tentatively at the step S36b at the step S36c (step S36c; Yes), the CPU 161 calculates the formula (34), and sets the "calculation result of the formula (34)," which is the result of the calculation, into an "$O_F$" storing region in the RAM 162 (step S36d).

Next, the CPU 161 judges whether the value set in the "$O_F$" storing region in the RAM 162 is smaller than the value set in the "$O_{F\ MIN}$" storing region in the RAM 162 or not (step S36e).

If the CPU 161 judges that the value set in the "$O_F$" storing region in the RAM 162 is not smaller than the value set in the "$O_{F\ MIN}$" storing region in the RAM 162 at step S36e (step S36e; No), then the CPU 161 shifts the processing thereof to that at step S36g.

On the other hand, if the CPU 161 judges that the value set in the "$O_F$" storing region in the RAM 162 is smaller than the value set in the "$O_{F\ MIN}$" storing region in the RAM 162 at step S36e (step S36e; Yes), then the CPU 161 sets the value "$O_F$" set in the "$O_F$" storing region in the RAM 162 into the "$O_{F\ MIN}$" storing region in the RAM 162, and sets the amount of correction $d_j$ (j=0, 1, ..., $L_J-1$) determined tentatively at the step S36b into a "best $d_j$" storing region in the RAM 162 (step S36f).

Next, the CPU 161 sets "a+Δa" into a "reproduction acceleration a" storing region in the RAM 162 (step S36g).

Next, the CPU 161 judges whether the value set in the "reproduction acceleration a" storing region in the RAM 162 is smaller than the predetermined $a_{MAX}$ or not (step S36*h*).

If the CPU 161 judges that the value set in the "reproduction acceleration a" storing region in the RAM 162 is smaller than the predetermined $a_{MAX}$ at the step S36*h* (step S36*h*; Yes), the CPU 161 repeatedly performs the processing on and after the step S36*b*.

On the other hand, if the CPU 161 judges that the value set in the "reproduction acceleration a" storing region in the RAM 162 not smaller than the predetermined $a_{MAX}$ at the step S36*h* (step S36*h*; No), the CPU 161 judges whether the value set in the "$O_{F\_MIN}$" storing region in the RAM 162 is a positive maximum value or not (step S36*i*).

If the CPU 161 judges that the value set in the "$O_{F\_MIN}$" storing region in the RAM 162 is not the positive maximum value at the step S36*i* (step S36*i*; No), then the CPU 161 judges that the amount of correction $d_j$, which has been being sought, is found, and exchanges the amount of correction $d_j$ ($j=0, 1, \ldots, L_J-1$) set in the "best $d_j$" storing region in the RAM 162 for the sought amount of correction $d_j$ ($j=0, 1, \ldots, L_J-1$) (step S36*j*).

Next, the CPU 161 produces a reproduction position $P_2(t_0+j)$ ($j=0, 1, \ldots, L_S-1$) by the secondary reproducing plan P2 ranging from the present time to the future on the basis of the amount of correction $d_j$ ($j=0, 1, \ldots, L_S-1$) among the sought amount of correction $d_j$ ($j=0, 1, \ldots, L_J-1$) and the reproduction position $P_1(t_0+j)$ ($j=0, 1, \ldots, L_S-1$) by the primary reproducing plan $P_1$ ranging from the present time to the future, which reproduction position $P_1(t_0+j)$ is accumulated in the primary reproducing plan accumulating file 163*a*2 (step S36*k*), and stores the produced reproduction position $P_2(t_0+j)$ into the secondary reproducing plan accumulating file 163*a*3.

Next, the CPU 161 sets "0" in the "hearing possibility $U(t_0+j)$" storing region in the RAM 162 (step S361), and thereby records the effect of falling in the region $S_0$ satisfying the identifiable condition at the time $t_0+j$ ($j=0, 1, \ldots, L_S-1$). Then the CPU 161 shifts the processing thereof to that at the step S39.

Moreover, if the CPU 161 judges that the value set in the "$O_{F\_MIN}$" storing region in the RAM 162 is the positive maximum value (step S36*i*; Yes), then the CPU 161 judges that the sought amount of correction $d_j$ has not been found, and produces the reproduction position $P_2(t_0+j)$ ($j=0, 1, \ldots, L_S-1$) by the secondary reproducing plan $P_2$ ranging from the present time to the future by setting the reproduction position $P_1(t_0+j)$ ($j=0, 1, \ldots, L_S-1$) by the primary reproducing plan $P_1$ ranging from the present time to the future, which reproduction position $P_1(t_0+j)$ is accumulated in the primary reproducing plan accumulating file 163*a*2 as the reproduction position $P_2(t_0+j)$ ($j=0, 1, \ldots, L_S-1$) (step S36*m*). Then, the CPU 161 stores the produced reproduction position $P_2(t_0+j)$ into the secondary reproducing plan accumulating file 163*a*3.

Next, the CPU 161 sets "1" in the "hearing possibility $U(t_0+j)$" in the RAM 162 (step S36*n*), and thereby records the effect of nor falling in the region $S_0$ satisfying the identifiable condition at the time $t_0+j$ ($j=0, 1, \ldots, L_S-1$). Then, the CPU 161 shifts the processing thereof to that at the step S39.

Next, the CPU 161 sets "0" in the "hearing possibility $U(t_0+j)$" storing region in the RAM 162 (step S361), and thereby records the effect of falling in the region $S_0$ satisfying the identifiable condition at the time $t_0+j$ ($j=0, 1, \ldots, L_S-1$). Then the CPU 161 shifts the processing thereof to that at the step S39.

Moreover, when the CPU 161 judges that the previously expected reproduction position $P_1(t_0)$ exists at the step S34 (step S34; Yes), the CPU 161 judges whether the reproduction position $P_1(t_0-1)+(F_S/F_P)V_1$ by the primary reproducing plan $P_1$ at the present time, which reproduction position $P_1(t_0-1)+(F_S/F_P)V_1$ has been produced on the basis of the reproduction speed $V_1$ read at the step S33 and the reproduction position $P_1(t_0-1)$ accumulated in the primary reproducing plan accumulating file 163*a*2, is almost equal to the previously expected reproduction position $P_1(t_0)$ or not (step S37).

When the CPU 161 judges that the reproduction position $P_1(t_0-1)+(F_S/F_P)V_1$ is not almost equal to the previously expected reproduction position $P_1(t_0)$ at the step S37 (step S37; No), the CPU 161 shifts the processing thereof to that at the step S35.

On the other hand, if the CPU 161 judges that the reproduction position $P_1(t_0-1)+(F_S/F_P)V_1$ is almost equal to the previously expected reproduction position $P_1(t_0)$ at step S37 (step S37; Yes), the CPU 161 judges whether the reproduction position $P_2(t_0)$ is accumulated in the secondary reproducing plan accumulating file 163*a*3 or not, that is, whether the reproduction position $P_2(t_0)$ by the secondary reproducing plan $P_2$ at the time to is produced or not (step S38).

When the CPU 161 judges that the reproduction position $P_2(t_0)$ is not produced at the step S38 (step S38; No), the CPU 161 shifts the processing thereof to that at the step S35.

On the other hand, if the CPU 161 judges that the reproduction position $P_2(t_0)$ is produced at the step S38 (step S38; Yes), then the CPU 161 judges whether the reproduction position $P_1(t_0)-P_2(t_0)$ is within the previously set regulated range or not (step S39).

If the CPU 161 judges that the reproduction position $P_1(t_0)-P_2(t_0)$ is not within the regulated range at the step S39 (step S39; No), then the CPU 161 replaces the reproduction position $P_2(t_0)$ with the reproduction position $P_1(t_0)$ (step S40).

Next, the CPU 161 sets "1" in the region of $j=0$ in the "hearing possibility $U(t_0+j)$" storing region in the RAM 162, that is, the "hearing possibility $U(t_0)$" storing region (step S41), and thereby the CPU 161 records the effect of not falling in the region $S_0$ satisfying the identifiable condition at the time $t_0+j$ ($j=0$). Then, the CPU 161 shifts the processing thereof to that at a step S42.

On the other hand, if the CPU 161 judges that the reproduction position $P_1(t_0)-P_2(t_0)$ is within the regulated range at the step S39 (step S39; Yes), then the CPU 161 executes the reproduction program 163*b*3 to reproduce the reproduction data stored in the storage medium 11 at the reproduction position $P_2(t_0)$.

To put it concretely, CPU 161 makes the reading section 12 obtain the part at the time coordinate $P_2(t_0)$ in the reproduction data stored in the storage medium 11, and outputs the obtained reproduction data to the sound output apparatus 3 through the decoder 13 and the time scale modification section 14. Hereby, the sound based on the reproduction data is output from the sound output apparatus 3.

Next, the CPU 161 sets "$t_0+1$" in a "present time of time $t_0$" storing region in the RAM 162 (step S43), and repeatedly performs the processing on and after the step S33.

Then, the CPU 161 repeatedly performs the processing from the step S33 to the step S43 until, for example, a user operates the operation section 15 to instruct the end of the reproduction of the reproduction data, or until the whole reproduction data stored in the storage medium 11 has been fully reproduced.

That is, the approximate method $QLP(t_0, L_J)$ has the feature of limiting the reproduction position $P_2(t_0+j)$ ($j=0, 1, \ldots, L_J-1$) for $L_J$ samples by the secondary reproducing plan P2 in such a way that the reproduction position $P_2(t_0+j)$ have the constant reproduction acceleration a for the time interval for the $L_J$ samples. Then, the approximate method $QLP(t_0, L_J)$ changes the reproduction acceleration a within the range of from $a_{MIN}$ to $a_{MAX}$ every predetermined $\Delta a$ while searching the best amount of correction $d_j$, and then the approximate method $QLP(t_0, L_J)$ produces the secondary reproducing plan $P_2$. That is, the approximate method QLP $(t_0, L_J)$ is the method of regarding the reproduction acceleration a as a quasi-optimal secondary reproducing plan $P_2$ which reproduction acceleration a minimizes the amount of correction $d_j$ defined by the formula (34) (or may be defined by the formula (44)) while the reproduction acceleration satisfies the constraint condition of the formula (31).

Figure 19A:
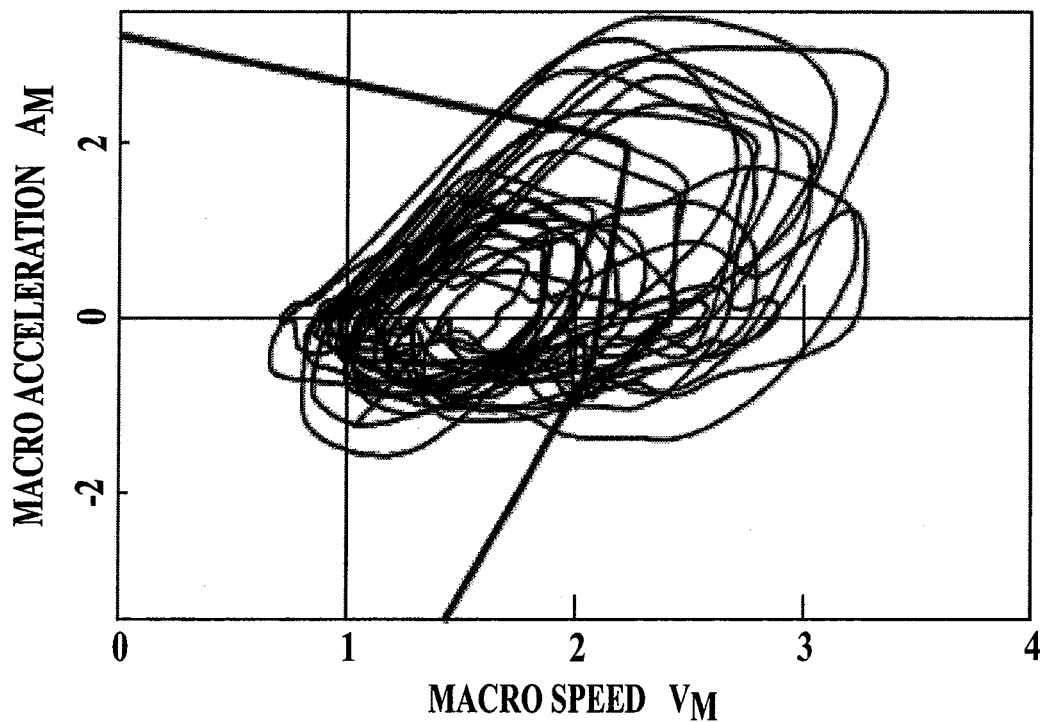
FIGS. 19A and 19B are diagrams showing a locus of the primary reproducing plan in a macro speed-acceleration plane and a locus in the secondary reproducing plan produced by an approximate method $QLP(t_0, L_J)$, respectively.
Figure 19B:
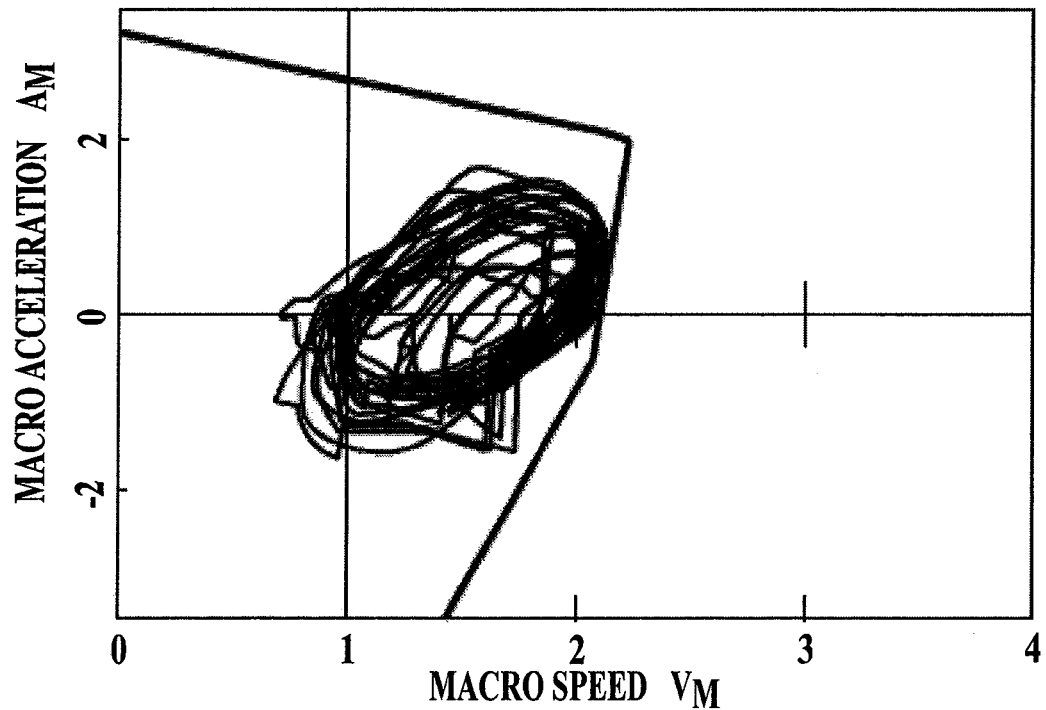

Next, the primary reproducing plan $P_1$ and the secondary reproducing plan $P_2$ produced by the use of the approximate method $QLP(t_0, L_J)$ by executing the reproducing processing (FIGS. 17 and 18) of the reproducing apparatus 1B are mutually compared by the user of, for example, the macro speed-acceleration plane shown in FIGS. 19A and 19B. The parameters are set as follows: $L_J$=90 (corresponding to 1.5 seconds), $L_S$=30 (corresponding to 0.5 seconds), $\alpha$=$\beta$=0.011.

FIGS. 19A and 19B show the case of using the polygonal line obtained in FIG. 6.

FIG. 19A shows the loci same as those of FIG. 12A. FIG. 19B shows the loci of the secondary reproducing plan $P_2$ produced by sequentially applying the approximate method $QLP(t_0, L_J)$ so as to fall in the region $S_0$ satisfying the identifiable condition on the basis of the primary reproducing plan $P_1$ of FIG. 19A.

According to FIG. 19B, although many loci distant from the polygonal line (the boundary line between the region $S_0$ satisfying the identifiable condition and the region $S_1$ not satisfying the identifiable condition) are included as compared with FIG. 12B, the entire loci fall in the region $S_0$ satisfying the identifiable condition, and consequently it can be expected that almost no failure of hearing occurs.

If it is taken into account that the entire loci have fallen in the region $S_0$ satisfying the identifiable condition even by the approximate method $QLP(t_0, L_J)$, the meaning of the solution by means of the linear programming problem $LP1(t_0, L_J)$ and the improved type linear programming problem $LP2(t_0, L_J)$ is expressed by the following three items.

The first item is that, if a processor having a high processing ability is used, then the linear programming problem $LP1(t_0, L_J)$ or the improved type linear programming problem $LP2(t_0, L_J)$ is realized as it is, and thereby the optimal reproduction can be performed.

The second item is that the meaning is for the sake of showing the existence of the theoretically optimal solution.

The third item is that, when an approximate technique, such as the approximate method $QLP(t_0, L_J)$, is developed, the linear programming problem $LP1(t_0, L_J)$ or the improved type linear programming problem $LP2(t_0, L_J)$ is useful as a tool for examining the degree of the approximation of the approximate technique.

According to the reproducing apparatus 1B of the modification 2, the CPU 161, which has executed the secondary reproducing plan producing program 163b2B, can produce the secondary reproducing plan $P_2$ that satisfies the constraint condition that a vector composed of at least one linear combination of the reproduction position $P_0(t_0+j)$ by the secondary reproducing plan $P_2$, the reproduction speed $V_2(t_0+j)$, and the reproduction acceleration $A_2(t_0+j)$ as an element may fall in a previously set region expressing the identifiable condition which region is located in a plane or a space geometrically including the vector. The secondary reproducing plan $P_2$ minimizes the difference $d_j$ between the reproduction position $P_1(t_0+j)$ by the primary reproducing plan $P_1$ and the reproduction position $P_2(t_0+j)$ by the secondary reproducing plan $P_2$ (or the sum of the difference $d_j$ between the reproduction position $P_1(t_0+j)$ by the primary reproducing plan $P_1$ and the reproduction position $P_2(t_0+j)$ by the secondary reproducing plan $P_2$ and the magnitude $a_j+b_j$ of the reproduction acceleration by the secondary reproducing plan $P_2$). The secondary reproducing plan $P_2$ makes the reproduction acceleration $A_2(t_0+j)$ be within a predetermined range (within a range of from $a_{MIN}$ to $a_{MAX}$), and makes the reproduction acceleration $A_2(t_0+j)$ constant (reproduction acceleration a) in a previously set time interval $(L_J)$.

That is, because the reproducing apparatus 1B approximately solves the linear programming problem (the linear programming problem $LP1(t_0, L_J)$ or the improved type linear programming problem $LP2(t_0, L_J)$) of the embodiment to produce the secondary reproducing plan $P_2$, it is possible to perform the variable speed reproduction of reproduction data in the state in which a user is easy to perform looking and listening, and it is possible to suppress the computation load of the CPU 161.

Incidentally, the reproducing apparatus 1B is not limited to approximately solve the linear programming problem of the embodiment to produce the secondary reproducing plan $P_2$, but may approximately solve the nonlinear programming problem of the modification 1 to produce the secondary reproducing plan $P_2$.

<Modification 3>

The technique shown in the embodiment makes a user hear sounds along the human property while the technique brings a reproduction speed at the time of reproducing reproduction data close to the reproduction speed instructed by the user as much as possible. However, the sound data constituting the reproduction data includes a time interval of a silent part and a time interval during which no sounds exist. It is meaningless to impose the constraint condition to such time intervals, and the imposition of the constraint condition makes the reproduction speed at the reproduction of reproduction data shift from the reproduction speed instructed by the user.

In such a case, it is better to moderate the constraint condition (such as formula (31)) to the time intervals judged to have no necessity of restriction, such as the time interval of a silent part and the time interval during which no sounds exist.

To put it concretely, for example, like a reproduction apparatus 1C shown in FIG. 20, it is better to moderate the constraint condition to the time intervals judged to have no necessity of restriction by judging the silent part and the existence of a sound.

Incidentally, the reproducing apparatus 1C different from, for example, the reproducing apparatus 1 of the embodiment (FIG. 9) in only a part of the configuration of the decoder 13 and a part of the configuration of the control section 16. Accordingly, only the different parts are described, and the other common parts are described by means of the same reference marks.

To put it concretely, the decoder 13 of the reproduction apparatus 1C performs predetermined processing, such as decoding, to, for example, the reproduction data input from the reading section 12 in accordance with a control signal input from the control section 16, and outputs the processed reproduction data to the time scale modification section 14 and a control section 16C.

Moreover, the control section 16 of the reproducing apparatus 1C is composed of, for example, the CPU 161, the RAM 162, and a storage section 163C, as shown in FIG. 20.

The storage section 163C stores, for example, the parameter storing file 163a1, the primary reproducing plan accumulating file 163a2, the secondary reproducing plan accumulating file 163a3, the primary reproducing plan producing program 163b1, a secondary reproducing plan producing program 163b2C, the reproduction control program 163b3, a silent interval judging program 163b4C, and a sound interval judging program 163b5C as shown in FIG. 20.

The silent interval judging program 163b4C enables the CPU 161 to realize, for example, the function of analyzing the reproduction data (sound data) input from the decoder 13C to judge whether the reproduction data obtained by the reading section 12 is the reproduction data in a silent interval or not.

To put it concretely, the CPU 161 integrates, for example, the sum of squares of reproduction data (sound data) to compare the sum with a predetermined threshold value, and thereby performs the judgment of the silent interval.

The CPU 161 functions as a silent interval judging section by executing this silent interval judging program 163b4C.

The sound interval judging program 163b5C enables the CPU 161 to realize, for example, the function of analyzing the reproduction data (sound data) input from the decoder 13C to judge whether the reproduction data obtained by the reading section 12 is the reproduction data in a sound interval or not.

To put it concretely, the CPU 161 judges the sound interval by the use of, for example, the spectrum form of the reproduction data (sound data) and the degree of energy changes (for example, a ratio between short time dispersion and long time dispersion). Incidentally, the CPU 161 is adapted to judge the interval between the time intervals that are indistinct in judging of whether they are sound intervals or not.

The CPU 161 functions as a sound interval judging section by executing this sound interval judging program 163b5C.

The secondary reproducing plan producing program 163b2C enables the CPU 161 to realize, for example, the function of producing the secondary reproducing plan $P_2$ that ranges from the present time to the future and is the one obtained by modifying the primary reproducing plan $P_1$ by solving the optimization problem by the use of the linear programming as the linear programming problem (the linear programming problem $LP1(t_0, L_J)$ or the improved type linear programming problem $LP2(t_0, L_J)$) on the basis of the primary reproducing plan $P_1$ produced by the CPU 161, which has executed the primary reproducing plan producing program 163b1, and the parameters $M_V(\tau)$, $M_A(\tau)$, $C_{Vk}$, $C_{Ak}$, $C_{Ck}$, and the like, which are stored in the parameter storing file 163a1.

At this time, for example, if the reproduction data obtained by reading section 12 is judges to be the reproduction data in a silent interval by the CPU 161, which has executed the silent interval judging program 163b4C, then the CPU 161 is adapted to produce the secondary reproducing plan $P_2$ within a condition having a moderated restriction in comparison with that of the constraint condition of the linear programming problem $LP1(t_0, L_J)$ or the improved type linear programming problem $LP2(t_0, L_J)$ on the basis of the primary reproducing plan $P_1$ produced by the CPU 161, which has executed the primary reproducing plan producing program 163b1.

Moreover, for example, if the reproduction data obtained by the reading section 12 is judged not to be the reproduction data in a sound interval by the CPU 161, which has executed the sound interval judging program 163b5C even if the reproduction data obtained by the reading section 12 is judged not to be the reproduction data in a silent interval by the CPU 161, which has executed the silent interval judging program 163b4C, the CPU 161 is adapted to produce the secondary reproducing plan $P_2$ in a condition of a moderated restriction as compared with the constraint condition of the linear programming problem $LP1(t_0, L_J)$ or the improved type linear programming problem $LP2(t_0, L_J)$ on the basis of the primary reproducing plan $P_1$ produced by the CPU 161, which has executed the primary reproducing plan producing program 163b1.

To put it concretely, the condition of the moderated restriction as compared with the constraint condition of the linear programming problem $LP1(t_0, L_J)$ or the improved type linear programming problem $LP2(t_0, L_J)$ is, for example, the condition obtained by removing the constraint condition of the linear programming problem $LP1(t_0, L_J)$ or the improved type linear programming problem $LP2(t_0, L_J)$.

That is, if the reproduction data obtained by the reading section 12 is judged to be the reproduction data in a silent interval, or if the reproduction data is judged not to be the reproduction data in a sound interval, the CPU 161 neglects the constraint condition (for example, the formula (31) and the like), and produces the secondary reproducing plan $P_2$ by solving the linear programming problem $LP1(t_0, L_J)$ or the improved type linear programming problem $LP2(t_0, L_J)$.

Moreover, the secondary reproducing plan producing program 163b2C enables the CPU 161 to realize, for example, the function of judging whether the difference between the primary reproducing plan $P_1$ produced by the CPU 161, which has executed the primary reproducing plan producing program 163b1, and the produced secondary reproducing plan $P_2$ is within a previously set regulated range or not, and of replacing the produced secondary reproducing plan $P_2$ with the primary reproducing plan $P_1$ produced by the CPU 161, which has executed the primary reproducing plan producing program 163b1, if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and the judgment section by executing this secondary reproducing plan producing program 163b2C.

According to the reproducing apparatus 1C of the modification 3, it is possible to judge whether the reproduction data obtained by the reading section is that in a silent interval or not by the CPU 161, which ahs executed the silent interval judging program 163b4C; it is possible to judged whether the reproduction data obtained by the reading section 12 is that in a sound interval or not by the CPU 161, which has executed the sound interval judging program 163b5C; and the CPU 161, which has executed the secondary reproducing plan producing program 163b2C, can produce the secondary reproducing plan $P_2$ in the condition of the moderated restriction as compared with the constraint condition of the linear programming problem $LP1(t_0, L_J)$ or the improved type linear programming problem $LP2(t_0, L_J)$ on the basis of the primary reproducing plan $P_1$ produced by the CPU 161, which has executed the primary reproducing plan producing program 163b1, if the reproduction data obtained by the reading section 12 is judged to be that in a silent interval by the CPU 161, which has executed the silent interval judging program 163b4C, or if the reproduction data obtained by the reading section is judged to not be that in a sound interval by the CPU 161, which has executed the sound interval judging program 163b5C.

Here, because the secondary reproducing plan $P_2$ produced when the reproduction data obtained by the reading section 12 is judged to be that in the silent interval, or when the reproduction data is judged not to that in any sound intervals is that produced in the condition of the moderated restriction as compared with the constraint condition of the linear programming problem LP1($t_0$, $L_J$) or the improved type linear programming problem LP2($t_0$, $L_J$), the secondary reproducing plan $P_2$ becomes a plan nearer to the primary reproducing plan $P_1$ than the secondary reproducing plan $P_2$ produced by solving the linear programming problem LP1($t_0$, $L_J$) or the improved type linear programming problem LP2($t_0$, $L_J$).

Consequently, because the reproducing apparatus 1C produces the secondary reproducing plan $P_2$ nearer to the primary reproducing plan $P_1$ than the secondary reproducing plan $P_2$ produced by solving the linear programming problem LP1($t_0$, $L_J$) or the improved type linear programming problem LP2($t_0$, $L_J$) in a time interval that is judged not to need any restrictions, such as the time interval of the silent interval or the time interval that is not the sound interval, it can be suppressed that the reproduction speed at the time of the reproduction of reproduction data is shifting from the reproduction speed instructed by a user, and reproduction data can be efficiently reproduced.

Incidentally, although the reproducing apparatus 1C is adapted to judge the two items of whether the reproduction data read by the reading section 12 is that in a silent interval or not and whether the reproduction data is that in a sound interval or not, the reproducing apparatus may be adapted to judge only one of the two items.

Moreover, the condition of a moderated restriction as compared with the constraint condition of the linear programming problem LP1($t_0$, $L_J$) or the improved type linear programming problem LP2($t_0$, $L_J$) is not limited to the one obtained by removing the constraint condition of the linear programming problem LP1($t_0$, $L_J$) or the improved type linear programming problem LP2($t_0$, $L_J$), but the condition is arbitrary as long as the condition has a moderated restriction as compared with the constraint condition of the linear programming problem LP1($t_0$, $L_J$) or the improved type linear programming problem LP2($t_0$, $L_J$). For example, a condition that is the constraint condition of the linear programming problem LP1 ($t_0$, $L_J$) or the improved type linear programming problem LP2($t_0$, $L_J$) modified by changing the parameters of the constraint condition may be adopted.

Moreover, the reproducing apparatus 1C is not limited to produce the secondary reproducing plan $P_2$ by solving the linear programming problem like the embodiment, but may produce the secondary reproducing plan $P_2$ by solving a non-linear programming problem like the modification 1, or may produce the secondary reproducing plan $P_2$ by using an approximate method like the modification 2.

<Modification 4>

Although the embodiment makes the constraint condition constant regardless of speech speeds, the constraint condition is produced by using the parameters $M_V(\tau)$, $M_A(\tau)$, $C_{Vk}$, $C_{Ak}$, and $C_{Ck}$, which are quantified as human properties, and the parameters $M_V(\tau)$, $M_A(\tau)$, $C_{Vk}$, $C_{Ak}$, and $C_{Ck}$ depend on the speech speeds. Accordingly, in order to perform the reproduction of reproduction data in a state in which a user can more easily perform looking and listening, the constraint condition may be changed according to the speech speeds.

Figure 21:
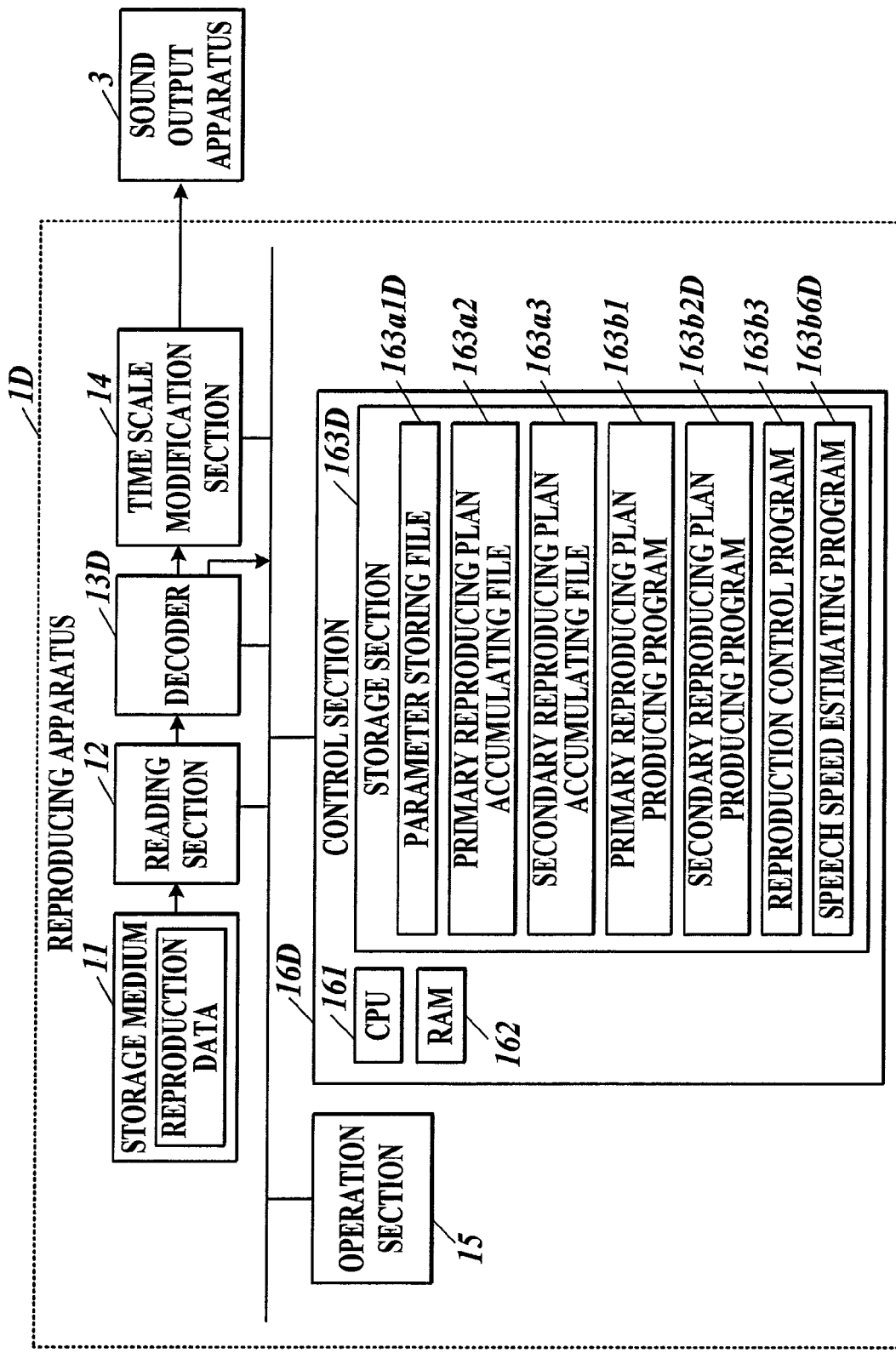
FIG. 21 is a diagram showing the functional configuration of a reproducing apparatus of a modification 4.

To put it concretely, for example, it is preferable to judge a speech speed to perform the changes of the constraint condition according to the speech speed as a reproducing apparatus 1D shown in FIG. 21.

Incidentally, the reproducing apparatus 1D differs from, for example, the reproducing apparatus 1 (FIG. 9) of the embodiment only in a part of the configuration of the decoder 13 and a part of the configuration of the control section 16.

Accordingly, only the different parts are described, and the other common parts are described by being denoted by the same reference marks as those of the reproduction apparatus 1.

To put it concretely, the decoder 13D of the reproducing apparatus 1D performs the predetermined processing, such as decoding, to, for example, the reproduction data input from the reading section 12 in accordance with a control signal input from the control section 16D, and outputs the processed reproduction data to the time scale modification section 14.

Moreover, the control section 16D of the reproducing apparatus 1D is composed of, for example, the CPU 161, the RAM 162, and a storage section 163D, as shown in FIG. 21.

The storage section 163D stores, for example, a parameter storing file 163a1D, the primary reproducing plan accumulating file 163a2, the secondary reproducing plan accumulating file 163a3, the primary reproducing plan producing program 163b1, a secondary reproducing plan producing program 163b2D, the reproduction control program 163b3, and a speech speed estimating program 163b6D as shown in FIG. 21.

The speech speed estimating program 163b6D enables the CPU 161 to realize, for example, the function of analyzing the reproduction data (sound data) input from the decoder 13D to presume the speech speed of a sound on the basis of the reproduction data obtained by the reading section 12.

To put it concretely, the CPU 161 presumes the speech speed by the use of, for example, the magnitude of the energy change of the reproduction data (sound data). That is, the CPU 161 presumes the speech speed by finding, for example, the number of times of crossing of $P_L(t)$ and $P_S(t)$ per second, where $P_L(t)$ denotes the signal energy of reproduction data smoothed by means of a long time constant and $P_S(t)$ denotes the signal energy of the reproduction data smoothed by means of a short time constant.

The CPU 161 functions as a speech speed presuming section by executing this speech speed estimating program 163b6D.

The parameter storing file 163a1D stores, for example, the parameters $M_V(\tau)$, $M_A(\tau)$, $C_{Vk}$, $C_{Ak}$, and $C_{Ck}$, which correspond to the respective speech speeds and have been previously determined.

To put it concretely, for example, the speech speeds presumed by the CPU 161, which has executed the speech speed estimating program 163b6D, are divided into three stages of "fast," "normal," and "slow," and the parameter storing file 163a1D stores the parameters $M_V(\tau)$, $M_A(\tau)$, $C_{Vk}$, $C_{Ak}$, $C_{Ck}$, and the like, which severally make the highest values of the reproduction speed $V_2(t)$ by the secondary reproducing plan $P_2$ measurable in each of the cases of the fast speech speeds, the normal speech speeds, and the slow speech speeds.

Incidentally, although the speech speed are made to be divided into the three stages of "fast," "normal," and "slow," the dividing method is not limited to this, and the number of the stages is arbitrary.

The secondary reproducing plan producing program 163b2D enables the CPU 161 to realize, for example, the function of producing the secondary reproducing plan $P_2$ ranging from the present time to the future, which secondary reproducing plan $P_2$ is the plan modifying the primary reproducing plan $P_1$ by solving the optimization problem as a linear programming problem (linear programming problem LP1($t_0$, $L_J$) or the improved type linear programming problem LP2 ($t_0$, $L_J$)) by the use of the linear programming on the basis of the primary reproducing plan $P_1$ produced by the CPU 161, which has executed the primary reproducing plan producing program 163b1, and the parameters $M_V(\tau)$, $M_A(\tau)$, $C_{Vk}$, $C_{Ak}$, $C_{Ck}$, and the like, which are the ones corresponding to the speech speed presumed by the CPU 161, which has executed the speech speed estimating program 163b6D, among the parameters $M_V(\tau)$, $M_A(\tau)$, $C_{Vk}$, $C_{Ak}$, $C_{Ck}$ stored in the parameter storing file 163a1D.

At this time, the CPU 161 obtains the parameters $M_V(\tau)$, $M_A(\tau)$, $C_{Vk}$, $C_{Ak}$, and $C_{Ck}$ corresponding to the speech speed presumed by the CPU 161, which has executed the speech speed estimating program 163b6D, from the parameter storing file 163a1D to generate the constraint condition, and thereby the CPU 161 is adapted to change the constraint condition according to the speech speed presumed by the CPU 161, which has executed the speech speed estimating program 163b6D.

Moreover, the secondary reproducing plan producing program 163b2D enables the CPU 161 to realize, for example, the function of producing the secondary reproducing plan $P_2$ ranging from the present time to the future by judging whether the difference between the primary reproducing plan $P_1$ produced by the CPU 161, which has executed the primary reproducing plan producing program 163b1, and the produced secondary reproducing plan $P_2$ is within a previously set regulated range or not, and by replacing the produced secondary reproducing plan $P_2$ with the primary reproducing plan $P_1$ produced by the CPU 161, which has executed the primary reproducing plan producing program 163b1, if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and a judgment section by executing this secondary reproducing plan producing program 163b2D.

According to the reproducing apparatus 1D of the modification 4, the speech speed of a sound based on the reproduction data obtained by the reading section 12 can be presumed by the speech speed estimating program 163b6D, and the CPU 161, which has executed the secondary reproducing plan producing program 163b2D can change the constraint condition according to the speech speed presumed by the CPU 161, which has executed the speech speed estimating program 163b6D.

That is, because the constraint condition is changed by generating the constraint condition by the used of a set of the parameters $M_V(\tau)$, $M_A(\tau)$, $C_{Vk}$, $C_{Ak}$, and $C_{Ck}$ according to a speech speed, the secondary reproducing plan $P_2$ having the reproduction speed adjusted, for example, so that the speech speed becomes slow in a time interval in which the speech speed is fast, and so that the speech speed becomes fast in a time interval in which the speech speed is slow, can be produced, and consequently the variable speed reproduction of reproduction data can be efficiently performed in the state in which a user is easy to perform listening.

Incidentally, as a technique to adjust the reproduction speed of reproduction data according to a speech speed in addition to changing the constraint condition according to a speech speed, for example, a technique of weighting the time coordinate of reproduction data by a speech speed is known. To put it concretely, for example, the reproduction speed of reproduction data may be adjusted according to a speech speed by multiplying the distance of the reproduction data on the time coordinate $P_2(t_2)-P_2(t_1)$ by an amount proportioned to the speech speed.

Moreover, the reproducing apparatus 1D is not limited to produce the secondary reproducing plan $P_2$ by solving a linear programming problem as the embodiment, but may produce the secondary reproducing plan $P_2$ by solving a nonlinear programming problem as the modification 1. Furthermore, the reproducing apparatus 1D may produce the secondary reproducing plan $P_2$ by the use of an approximate method as the modification 2, and may produce the secondary reproducing plan $P_2$ under the condition in which the restriction thereof is more moderated as compared with the constraint condition of the embodiment, the modification 1, the modification 2, and the like, in a time interval in which the restriction is judged not to be needed as the modification 3.

<Modification 5>

In the embodiment, it is impossible to make a user hear a sound entirely if the reproduction speed $V_1$ instructed by the user is a high speed and the reproduction speed $V_1$ is kept for a long time. For example, in the case where the reproducing apparatus 1 is performing the reproducing processing (FIG. 10), there is a case where a forcible modification of a reproduction position (the processing of replacing the reproduction position $P_2(t_0)$ with the reproduction position $P_1(t_0)$ at the step S10) caused by the separation between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) frequently occurs and the reproduced sound cannot be endured to be heard. In such a case, it is preferable to abandon the hearing of words and phrases, and to lower the sound volume or turn off the sound volume (turn off the sound or tunes the sound volume to 0).

Figure 22:
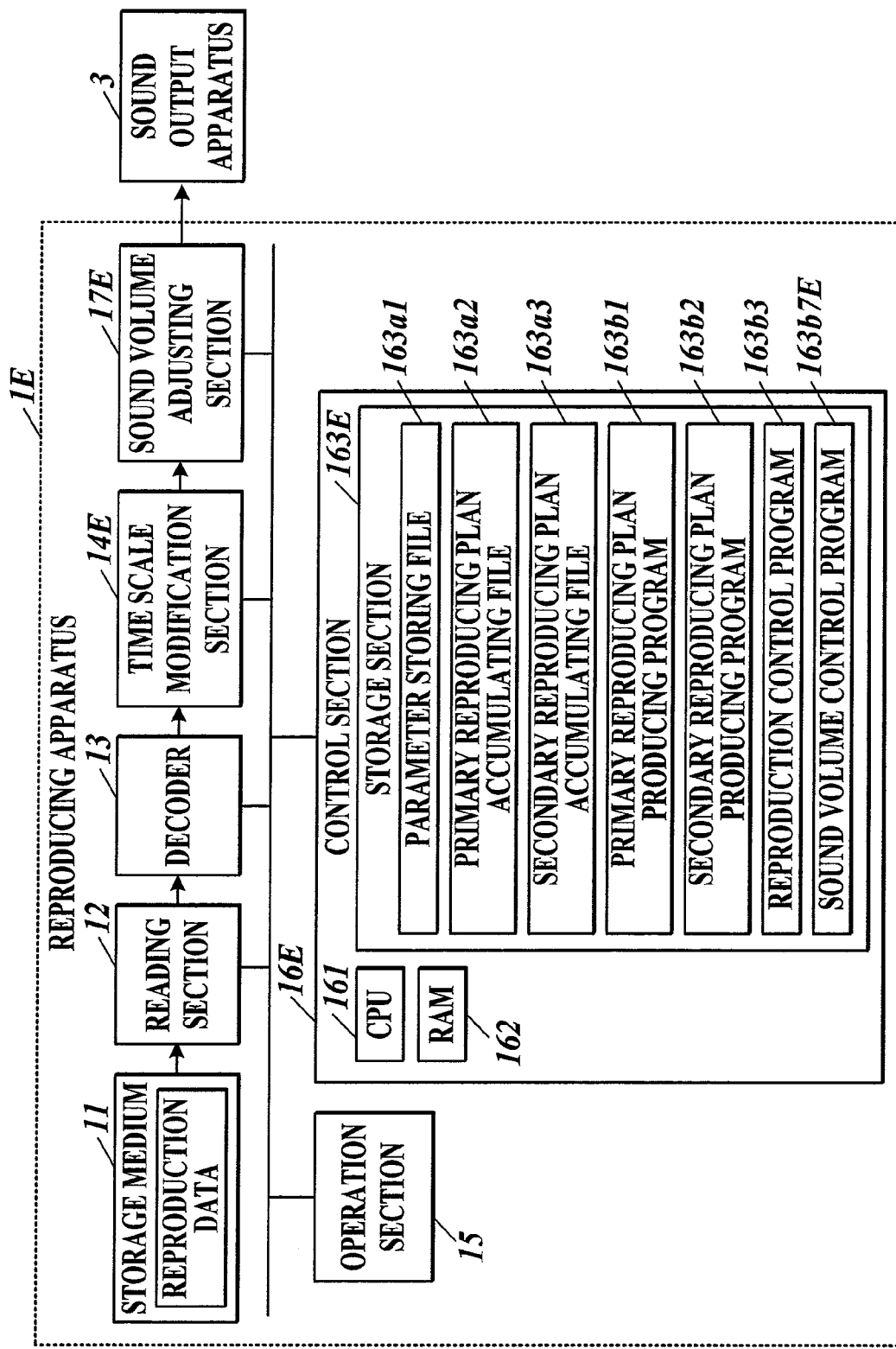
FIG. 22 is a diagram showing the functional configuration of a reproducing apparatus of a modification 5.

To put it concretely, for example, if "1" is set in the region of j=0 in the "hearing possibility $U(t_0+j)$" storing region in the RAM 162, that is, the "hearing possibility $U(t_0)$" storing region in the RAM 162, as the reproducing apparatus 1E shown in FIG. 22, then the sound volume may be lowered, or the sound may be turned off.

Here, U(t)=0 expresses that the secondary reproducing plan $P_2$ is presumed to be able to be heard at the time t, that is, that the loci of the secondary reproducing plan $P_2$ fall in the region $S_0$ satisfying the identifiable condition at the time t.

On the other hand, U(t)=1 expresses that the secondary reproducing plan $P_2$ is presumed not to be able to be heard at the time t, that is, that the loci of the secondary reproducing plan $P_2$ do not fall in the region $S_0$ satisfying the identifiable condition at the time t.

The reproducing processing (FIG. 10) by the reproducing apparatus 1 of the embodiment is adapted to abandon the solution by means of the linear programming to use the primary reproducing plan $P_1$ as it is as the secondary reproducing plan $P_2$ by replacing the secondary reproducing plan $P_2$ with the primary reproducing plan $P_1$ (step S10) if the difference between the primary reproducing plan $P_1$ and the secondary reproducing plan $P_2$ exceeds the regulated range when the constraint condition is tried to be secured. At this time, because the constraint condition is not satisfied, the hearing possibility U(t) is set to 1. Moreover, it is also possible to restrict the minimum reproduction speed and the maximum reproduction speed although it is instantaneous. Also in that case, because the solution of the linear programming does not exist, the hearing possibility U(t) is set to 1.

Moreover, the reproducing processing (FIGS. 17 and 18) of the reproducing apparatus 1B of the modification 2 is adapted to as follows: if the difference between the primary reproducing plan $P_1$ and the secondary reproducing plan $P_2$ exceeds the regulated range, then the secondary reproducing plan $P_2$ is replaced with the primary reproducing plan $P_1$ (step S40); and further if the constraint condition is not satisfied within the previously determined acceleration range (the range of from $a_{MIN}$ to $a_{MAX}$) and the sought amount of correction $d_j$ cannot be found, then the reproduction position $P_1(t_0+j)$ (j=0, 1, . . . , $L_S$-1) by the primary reproducing plan $P_1$ ranging from the present time to the future, which reproduction position $P_1(t_0+j)$ are accumulated in the primary reproducing plan accumulating file 163$a$2, are used as the reproduction position $P_2(t_0+j)$ (j=0, 1, . . . , $L_S$-1) by the secondary reproducing plan $P_2$ ranging from the present time to the future (step S36$m$). Also at this time, because the constraint condition is not satisfied, the hearing possibility U(t) is set to 1.

Incidentally, the reproducing apparatus 1E differs from, for example, the reproducing apparatus 1 (FIG. 9) of the embodiment only in a part of the configuration of the time scale modification section 14, an added sound volume adjusting section 17E, and a part of the configuration of the control section 16. Accordingly, only the different parts are described, and the other common parts are described by the same reference marks as those of the reproduction apparatus 1.

To put it concretely, a time scale modification section 14E of the reproducing apparatus 1E transforms the time scale of the reproduction data input from the decoder 13 by the use of, for example, the existing time scale modification technique (such as TSM) in consideration of the coincidence factor of the waveform of the reproduction data in accordance with a control signal input from the control section 16E as a time scale modification section, and outputs the reproduction data to the sound volume adjusting section 17E and the sound output apparatus 3 through a not-shown amplifier.

Moreover, the sound volume adjusting section 17E of the reproducing apparatus 1E adjusts the sound volume of a sound based on the reproduction data (sound data) output from the sound output apparatus 3 in accordance with a control signal output from the control section 16E.

Moreover, the control section 16E of the reproduction apparatus 1E is composed of, for example, the CPU 161, the RAM 162, and a storage section 163E, as shown in FIG. 22.

To put it concretely, the storage section 163E stores, for example, the parameter storing file 163$a$1, the primary reproducing plan accumulating file 163$a$2, the secondary reproducing plan accumulating file 163$a$3, the primary reproducing plan producing program 163$b$1, the secondary reproducing plan producing program 163$b$2, the reproduction control program 163$b$3, and a sound volume control program 163$b$7E, as shown in FIG. 22.

The sound volume control program 163$b$7E enables the CPU 161 to realize, for example, the function of adjusting the sound volume of the sound based on the reproduction data output from the sound output apparatus 3 to lower a previously set sound volume by inputting a control signal into the sound volume adjusting section 17E if "1" is set in the "hearing possibility $U(t_0)$" storing region in the RAM 162, that is, if the difference between the primary reproducing plan $P_1$ produced by the CPU 161, which has executed the primary reproducing plan producing program 163$b$1, and the secondary reproducing plan $P_2$ produce by the CPU 161, which has executed the secondary reproducing plan producing program 163$b$2, is judged not to be within a previously set regulated range by the CPU 161, which has executed the secondary reproducing plan producing program 163$b$2.

Here, the meaning of adjusting the sound volume of the sound based on the reproduction data to the previously set sound volume is, for example, to lower the sound volume or to turn off the sound volume (turn off the sound or tune the sound volume to 0).

To put it concretely, the CPU 161 controls the sound output apparatus 3, for example, so that the sound volume thereof becomes a general sound volume at $U(t_0)$=0, and a small sound volume (or no sound volume) at $U(t_0)$=1.

The CPU 161 functions as a sound volume adjusting section by executing this sound volume control program 163$b$7E.

According to the reproducing apparatus 1E of the modification 5, if the difference between the primary reproducing plan $P_1$ produced by the CPU 161, which has executed the primary reproducing plan producing program 163$b$1, and the secondary reproducing plan $P_2$ produced by the CPU 161, which has executed the secondary reproducing plan producing program 163$b$2, is judged not to be within the previously set regulated range by the CPU 161, which has executed the secondary reproducing plan producing program 163$b$2, then it is possible to adjust the sound volume of the sound based on the reproduction data output from the sound output apparatus 3 to be lowered by the CPU 161, which has executed the sound volume control program 163$b$7E.

Consequently, if a forcible modification of a reproduction position (the processing of replacing the reproduction position $P_2(t_0)$ with the reproduction position $P_1(t_0)$) caused by the separation between the reproduction position (the reproduction position $P_1(t_0)$ by the primary reproducing plan $P_1$) according to the reproduction speed $V_1$ instructed by a user and the actual reproduction position (the reproduction position $P_2(t_0)$ by the secondary reproducing plan $P_2$) frequently occurs and the reproduced sound cannot be endured to be heard, the sound volume becomes smaller, and consequently the variable speed reproduction of reproduction data can be performed in a state in which the user can hear more easily.

Incidentally, the reproducing apparatus 1E may produce the secondary reproducing plan $P_2$ by the use of an approximate method as the modification 2. In this case, because the cases of setting "1" in the "hearing possibility $U(t_0)$" storing region in the RAM 162 are the following two cases: the case where the difference between the primary reproducing plan $P_1$ produced by the CPU 161, which has executed the primary reproducing plan producing program 163$b$1, and the secondary reproducing plan P2 produced by the CPU 161, which has executed the secondary reproducing plan producing program 163$b$2B, is judged to not to be within the previously set regulated range by the CPU 161, which has executed the secondary reproducing plan producing program 163$b$2B, and the case where no secondary reproducing plans $P_2$ satisfying the constraint condition have been produced by the CPU 161, which has executed the secondary reproducing plan producing program 163$b$2B, it is necessary to adjust the sound volume of the sound based on the reproduction data output from the sound output apparatus 3 to become small also in the case where no secondary reproducing plans $P_2$ satisfying the constraint condition have been produced by the CPU 161, which has executed the secondary reproducing plan producing program 163$b$2B.

Moreover, the control method of the sound volume is not limited to the method of making the sound volume normal at $U(t_0)$=0 and small (or no sound volume) at $U(t_0)$=1, but the method is arbitrary as long as the sound volume of the sound based on the reproduction data output from the sound output apparatus 3 becomes small at $U(t_0)$=1. For example, the method may be as follows: if $U(t_0)$=1 is set, the sound volume is gradually lowered until reaching a previously set sound volume level, and if $U(t_0)$=0 is continuously set for a predetermined times after that, then the sound volume is gradually increased until reaching the normal sound volume. In this case, the sound volume is not frequently controlled, and changes smoothly. Consequently, the method is comfortable for a user.

Moreover, if the secondary reproducing plan $P_2$ is not produced and the reproduction data stored in the storage medium 11 is reproduced in accordance with the primary reproducing plan $P_1$, then it is judges whether K inequalities obtained by substituting "0" for "j" in the formula (30) are true about the primary reproducing plan $P_1$ at the present time or not. If it is judged that there is an inequality that is not trued, even if the inequality is only one, $U(t_0)=1$ is set. Then the sound volume may be adjusted to be small in such a case.

Moreover, the reproducing apparatus 1E is not limited to produce the secondary reproducing plan $P_2$ by solving a linear programming problem as the embodiment, but may produce the secondary reproducing plan $P_2$ by solving a nonlinear programming problem as the modification 1. Furthermore, the reproducing apparatus 1E may produce the secondary reproducing plan $P_2$ under a condition in which the restriction thereof is more moderated as compared with the constraint conditions of the embodiment, the modification 1, the modification 2, and the like, in a time interval in which the restriction is judged not to be needed as the modification 3. Moreover, the reproducing apparatus 1E may produce the secondary reproducing plan $P_2$ by changing the constraint condition according to a speech speed as the modification 4.

<Modification 6>

Although the reproduction data stored in the storage medium 11 is composed of sound data in the embodiment, the reproduction data may be composed of sound data and image data.

Figure 23:
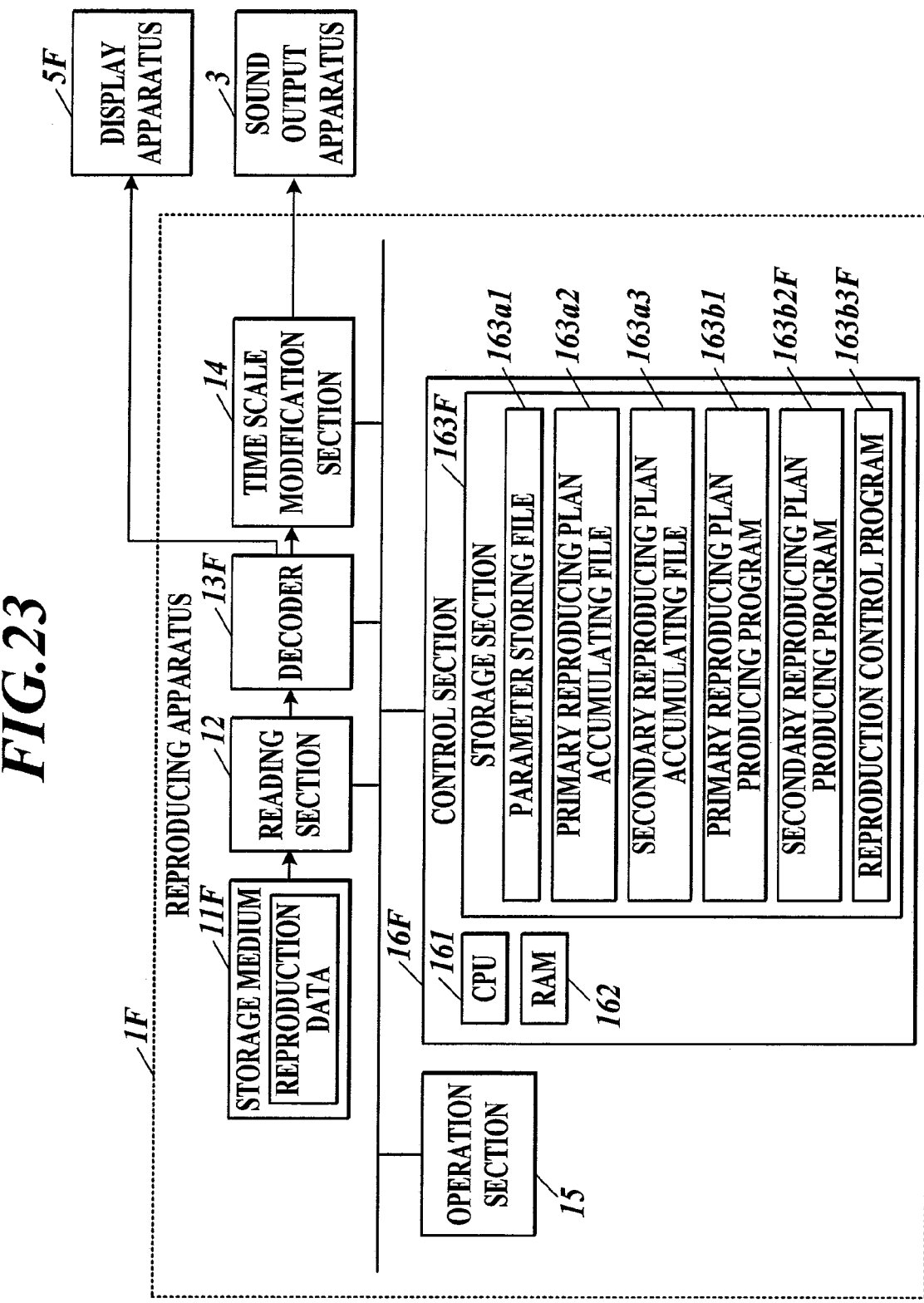
FIG. 23 is a diagram showing the functional configuration of a reproducing apparatus of a modification 6.

In this case, for example, as a reproducing apparatus 1F shown in FIG. 23, the sound data is reproduced in accordance with the secondary reproducing plan $P_2$, and the image data is reproduced in accordance with the primary reproducing plan $P_1$.

Incidentally, the reproducing apparatus 1F is different from, for example, the reproducing apparatus 1 (FIG. 9) of the embodiment only in a part of the configuration of the storage medium 11, a part of the configuration of the decoder 13, and a part of the configuration of the control section 16. Accordingly, only the different parts are described, and the other common parts are described by denoting the same reference marks as those of the reproducing apparatus 1.

To put it concretely, a storage medium 11F of the reproducing apparatus 1F previously stores, for example, reproduction data composed of sound data and image data as the storage section.

Incidentally, the storage medium 11F stores the sound data and the image data in the state of being previously separated.

Moreover, a decoder 13F of the reproducing apparatus 1F performs the predetermined processing, such as decoding, to, for example, the reproduction data input from the reading section 12 in accordance with a control signal input from a control section 16F, and outputs the processed reproduction data to the sound output apparatus through the time scale modification section 14. In addition, the decoder 13F performs predetermined processing, such as decoding, to the image data in the reproduction data input from the reading section 12, and outputs the processed image data to a display apparatus 5F.

Moreover, the display apparatus 5F connected to the reproducing apparatus 1F through the decoder 13F is, for example, liquid crystal display equipment or the like, and displays an image based on the reproduction data (image data) input from the decoder 13F as, for example, a predetermined output apparatus.

Moreover, the control section 16F of the reproducing apparatus 1F is composed of, for example, the CPU 161, the RAM 162, and a storage section 163F, as shown in FIG. 23.

The storage section 163 stores, for example, the parameter storing file 163$a$1, the primary reproducing plan accumulating file 163$a$2, the secondary reproducing plan accumulating file 163$a$3, the primary reproducing plan producing program 163$b$1, a secondary reproducing plan producing program 163$b$2F, and a reproduction control program 163$b$3F, as shown in FIG. 23.

The secondary reproducing plan producing program 163$b$2F enables the CPU 161 to realize, for example, the function of producing the secondary reproducing plan $P_2$ ranging from the present time to the future, which secondary reproducing plan $P_2$ is the plan modifying the primary reproducing plan $P_1$ by solving the optimization problem as a linear programming problem by the use of the linear programming on the basis of the primary reproducing plan $P_1$ produced by the CPU 161, which has executed the primary reproducing plan producing program 163$b$1, and the parameters $M_V(\tau)$, $M_A(\tau)$, $C_{Vk}$, $C_{Ak}$, $C_{Ck}$, and the like, stored in the parameter storing file 163$a$1.

To put it concretely, the optimization problem is solved by using a nonlinear programming method as a nonlinear programming problem so that a vector may fall in a previously set region indicating an identifiable condition, which region is located in a plane or a space in which the vector is geometrically included, as a constraint condition, in order to minimize the sum of a difference $d_j$ between a reproduction position $P_1(t_0+j)$ by the primary reproducing plan $P_1$ and a reproduction position $P_2(t_0+j)$ by the secondary reproducing plan $P_2$ (or the sum of a difference $d_j$ between a reproduction position $P_1(t_0+j)$ by the primary reproducing plan $P_1$ and a reproduction position $P_2(t_0+j)$ by the secondary reproducing plan $P_2$ and the magnitude $a_j+b_j$ of the reproduction acceleration by the secondary reproducing plan $P_2$), and the difference between the reproduction position of the sound data by the secondary reproducing plan $P_2$ and the reproduction position of the image data by the secondary reproducing plan $P_2$, as an objective function. The vector is composed of at least one linear combination of one of a reproduction position $P_2(t_0+j)$ by the secondary reproducing plan $P_2$, a reproduction speed $V_2(t_0+j)$, and the reproduction acceleration $A_2(t_0+j)$ as an element of the vector.

Moreover, the secondary reproducing plan producing program 163$b$2F enables the CPU 161 to realize, for example, the function of judging whether the difference between the primary reproducing plan $P_1$ produced by the CPU 161, which has executed the primary reproducing plan producing program 163$b$1, and the produced secondary reproducing plan $P_2$ is within a previously set regulated range or not, and of replacing the produced secondary reproducing plan $P_2$ with the primary reproducing plan $P_1$ produced by the CPU 161, which has executed the primary reproducing plan producing program 163$b$1, if the CPU 161 judges that the difference is not within the regulated range because the difference between the reproduction position (the reproduction position $P_1(t_0)$ by the primary reproducing plan $P_1$) according to the reproduction speed $V_1$ instructed by the user and the actual reproduction position (the reproduction position $P_2(t_0)$ by the secondary reproducing plan $P_2$) is too large when the "hearing of words and phrases" is kept to be secured.

The CPU 161 functions as the secondary reproducing plan producing section and a judgment section by executing this secondary reproducing plan producing program 163b2F.

The reproduction control program 163b3F enables the CPU 161 to realize, for example, the function of reproducing the sound data in the reproduction data stored in the storage medium 11 in accordance with the secondary reproducing plan $P_2$ ranging from the preset time to the future, which secondary reproducing plan $P_2$ has been produced by the CPU 161, which has executed the secondary reproducing plan producing program 163b2, and of reproducing the image data in the reproduction data stored in the storage medium 11 in accordance with the primary reproducing plan $P_1$ ranging from the present time to the future, which primary reproducing plan $P_1$ has been produced by the CPU 161, which has executed the primary reproducing plan producing program 163b1.

To put it concretely, the CPU 161, for example, inputs a control signal into the reading section 12 to make the reading section 12 obtain the sound data from the storage medium 11 in accordance with the secondary reproducing plan $P_2$ produced by the CPU 161, which has executed the secondary reproducing plan producing program 163b2F, and inputs control signals into the decoder 13 and the time scale modification section 14 to make them output the sound data obtained by the reading section 12 to the sound output apparatus 3. The CPU 161 furthermore inputs a control signal into the reading section 12 to make the reading section 12 obtain the image data from the storage medium 11 in accordance with the primary reproducing plan $P_1$ produced by the CPU 161, which has executed the primary reproducing plan producing program 163b1, and inputs a control signal into the decoder 13 to make it output the image data obtained by the reading section 12 to the display apparatus 5F.

The CPU 161 functions as the output control section by executing this reproduction control program 163b3F.

Because the reproducing apparatus 1F of the modification 6 is adapted to solve an optimization problem by the use of the linear programming as a linear programming problem in order to minimize the sum of the difference $d_j$ between a reproduction position $P_1(t_0+j)$ by the primary reproducing plan $P_1$ and a reproduction position $P_2(t_0+j)$ by the secondary reproducing plan $P_2$ (or the sum of the difference $d_j$ between a reproduction position $P_2(t_0+j)$ by the primary reproducing plan $P_1$ and a reproduction position $P_2(t_0+j)$ by the secondary reproducing plan $P_2$ and a magnitude $a_j+b_j$ of the reproduction acceleration by the secondary reproducing plan $P_2$), and the difference between a reproduction position of sound data by the secondary reproducing plan $P_2$ and a reproduction position of image data by the secondary reproducing plan $P_2$, as an objective function, a shift between a reproduced sound and a reproduce image can be suppressed.

Incidentally, although the image data is made to be reproduced in accordance with the primary reproducing plan $P_1$, the image data may be reproduced in accordance with a secondary reproducing plan for image data that is produced on the basis of the primary reproducing plan $P_1$. At this time, the secondary reproducing plan $P_2$ (the secondary reproducing plan for sound data) may be produced on the basis of the secondary reproducing plan for image data. Alternatively, reversely, the secondary reproducing plan $P_2$ (the secondary reproducing plan for sound data) is first produced on the basis of the primary reproducing plan $P_1$, and the secondary reproducing plan for image data is next produced on the basis of the secondary reproducing plan $P_2$ (the secondary reproducing plan for sound data). Then, the image data may be reproduced in accordance with the secondary reproducing plan for image data. In this case, the difference between the reproduction position of sound data and the reproduction position of image data are removed from an objective function, and an optimization problem is solved by the linear programming as a linear programming problem, for example, in order to minimize the difference $d_j$ between a reproduction position $P_1(t_0+j)$ by the primary reproducing plan $P_1$ and a reproduction position $P_2(t_0+j)$ by the secondary reproducing plan $P_2$ (or the sum of the difference $d_j$ between the reproduction position $P_1(t_0+j)$ by the primary reproducing plan $P_1$ and the reproduction position $P_2(t_0+j)$ by the secondary reproducing plan $P_2$ and the magnitude $a_j+b_j$ of the reproduction acceleration by the secondary reproducing plan $P_2$) as the objective function.

In this case, because the sound data and the image data are reproduced in accordance with the secondary reproducing plans suitable for each of them, the sound and the image can be more naturally heard and looked even if variable speed reproduction is performed.

Moreover, the reproducing apparatus 1F may be configured so that the decoder 13F inputs reproduction data (image data) into the control section 16F, and that the control section 16F analyzes the reproduction data (image data) input from the decoder 13F to judge whether the reproduction data read by the reading section 12 is that in a still image interval or not. Then, if the reproduction data is judged to be that in the still image interval, the reproducing apparatus 1F may be adapted to perform the fast-forward reproduction of the image data.

Moreover, the reproducing apparatus 1F may be configured so that the reproduction data (image data) may be input from the decoder 13F into the control section 16F, and that the control section 16F analyzes the reproduction data (image data) input from the decoder 13F to judges whether the reproduction data read by the reading section 12 is that in a moving image interval, in which there are many changes, or not. Then if the reproduction data is judged to be that in the moving image interval, in which there are many changes, the reproducing apparatus 1F may be adapted to slowly reproduce the image data.

Moreover, the reproducing apparatus 1F is not limited to produce the secondary reproducing plan $P_2$ by solving a linear programming problem like the embodiment, but may produce the secondary reproducing plan $P_2$ by solving a nonlinear programming problem like the modification 1, or may be produce the secondary reproducing plan $P_2$ by the use of an approximate method like the modification 2. Furthermore, the reproducing apparatus 1F may produce the secondary reproducing plan $P_2$ under the condition having a moderated restriction as compared with those of the constraint conditions of the embodiment, the modification 1, and the modification 2 in a time interval in which no restrictions are judged to be needed like the modification 3, and may produce the secondary reproducing plan $P_2$ by changing the constraint condition according to a speech speed like the modification 4. Furthermore the reproducing apparatus 1F may adjust a sound volume like the modification 5.

Incidentally, the reproducing apparatus 1 and 1A-1F are not required to be separated from the sound output apparatus 3 and the display apparatus 5F, and they may be integrally formed in the embodiment and the modifications 1-6.

According to the embodiment of the present invention, a reproducing apparatus to reproduce reproduction data at a speed different from a speed at a time of recording of the reproduction data when the reproduction data is reproduced, the recording apparatus including: a storage section to store the reproduction data; a primary reproducing plan producing section to produce a primary reproducing plan ranging from present time to future, the primary reproducing plan according to the reproduction speed different from the reproduction speed at the time of the recording of the reproduction data; a secondary reproducing plan producing section to produce a secondary reproducing plan ranging from the present time to the future by solving an optimization problem, the secondary reproducing plan produced by modifying the primary reproducing plan based on the primary reproducing plan produced by the primary reproducing plan producing section; an instruction section to instruct the reproduction speed of the reproduction data stored in the storage section; an obtainment section to obtain the reproduction data from the storage section in accordance with the secondary reproducing plan produced by the secondary reproducing plan producing section; and an output control section to make a predetermined output apparatus output the reproduction data obtained by the obtainment section, wherein the primary reproducing plan producing section produces the primary reproducing plan ranging from the present time to the future according to the reproduction speed instructed by the instruction section; the optimization problem is solved by the use of a linear programming as a linear programming problem so that a vector having at least one of a reproduction position, a reproduction speed, and reproduction acceleration by the secondary reproducing plan as an element may fall into a previously set region expressing an identifiable condition of existence of the vector in a plane or a space that geometrically includes the vector, as a constraint condition, in order to make a predetermined value minimum or maximum as an objective function; and the predetermined value includes a difference between the primary reproducing plan and the secondary reproducing plan.

Consequently, because the changes of the reproduction speed of reproduction data can be adjusted to minimize the difference with the reproduction speed instructed by a user and to satisfy the constraint condition to fall in the identifiable condition, the variable speed reproduction of the reproduction data can be performed in the state in which the user can easily perform looking and listening.

The entire disclosure of Japanese Patent Application No. 2007-122542 filed on May 7, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A reproducing apparatus to reproduce reproduction data at a speed different from a speed at a time of recording of the reproduction data, the recording apparatus comprising:
    a storage section to store the reproduction data;
    a primary reproducing plan producing section to produce a primary reproducing plan ranging from present time to future, according to the reproduction speed different from the speed at the time of recording the reproduction data; and
    a secondary reproducing plan producing section to modify to the primary reproducing plan by solving an optimization problem based on the primary reproducing plan produced by the primary reproducing plan producing section, so as to produce a secondary reproducing plan ranging from the present time to the future;
    wherein the reproduction data stored in the storage section includes at least sound data, the apparatus further comprising:
    a judgment section to judge whether the difference between the primary reproducing plan produced by the primary reproducing plan producing section and the secondary reproducing plan produced by the secondary reproducing plan producing section is within a previously set range or not; and
    a sound volume adjusting section to reduce a sound volume of a sound based on the reproduction data output from the output apparatus to a previously set sound volume when the judgment section judges that the difference between the primary reproducing plan produced by the primary reproducing plan producing section and the secondary reproducing plan produced by the secondary reproducing plan producing section is not within the previously set range, or when the secondary reproducing plan producing section has not produced the secondary reproducing plan satisfying the constraint condition.

2. The reproducing apparatus according to claim 1, further comprising:
    an instruction section to instruct the reproduction speed of the reproduction data stored in the storage section;
    an obtainment section to obtain the reproduction data from the storage section in accordance with the secondary reproducing plan produced by the secondary reproducing plan producing section; and
    an output control section to allow a predetermined output apparatus to output the reproduction data obtained by the obtainment section, wherein
    the primary reproducing plan producing section produces the primary reproducing plan ranging from the present time to the future, according to the reproduction speed instructed by the instruction section;
    the optimization problem is solved by using linear programming as a linear programming problem so that a vector having a linear combination of at least one of a reproduction position, a reproduction speed and a reproduction acceleration by the secondary reproducing plan as an element thereof falls in a previously set region expressing an identifiable condition, the region located in a plane or a space geometrically including the vector as a constraint condition in order to minimize or maximize a predetermined value, as an object function; and
    the predetermined value includes a difference between the primary reproducing plan and the secondary reproducing plan.

3. The reproducing apparatus according to claim 2, wherein the predetermined value includes a magnitude of the reproduction acceleration by the secondary reproducing plan.

4. The reproducing apparatus according to claim 2, wherein the reproduction data stored in the storage section includes at least sound data, the apparatus further comprising:
    a silent interval judging section to judge whether the reproduction data obtained by the obtainment section is reproduction data in a silent interval, wherein
    the secondary reproducing plan producing section produces the secondary reproducing plan under a condition having more moderated restriction than the constraint condition based on the primary reproducing plan produced by the primary reproducing plan producing section when the silent interval judging section judges that the reproduction data obtained by the obtainment section is the reproduction data in the silent interval.

5. The reproducing apparatus according to claim 2, wherein the reproduction data stored in the storage section includes at least sound data, the apparatus further comprising:

a sound interval judging section to judge whether the reproduction data obtained by the obtainment section is reproduction data in a sound interval or not, wherein the secondary reproducing plan producing section produces the secondary reproducing plan under a condition having more moderated restriction than the constraint condition based on the primary reproducing plan produced by the primary reproducing plan producing section when the sound interval judging section judges that the reproduction data obtained by the obtainment section is not the reproduction data in the sound interval.

6. The reproducing apparatus according to claim 2, wherein the reproduction data stored in the storage section includes at least sound data, the apparatus further comprising:

a speech speed estimating section to estimate a speech speed of a sound based on the reproduction data obtained by the obtainment section, wherein the secondary reproducing plan producing section changes the constraint condition according to the speech speed estimated by the speech speed estimating section.

7. The reproducing apparatus according to claim 2, wherein the reproduction data stored in the storage section is composed of sound data and image data, and the predetermined value includes a difference between the reproduction position of the sound data by the secondary reproducing plan and the reproduction position of the image data by the secondary reproducing plan.

8. A reproducing apparatus to reproduce reproduction data at a speed different from a speed at a time of recording of the reproduction data when the reproduction data is reproduced, the recording apparatus comprising:

a storage section to store the reproduction data;

an instruction section to instruct the reproduction speed of the reproduction data stored in the storage section;

a primary reproducing plan producing section to produce a primary reproducing plan ranging from present time to future, according to the reproduction speed instructed by the instruction section;

a secondary reproducing plan producing section to modify the primary reproducing plan by solving an optimization problem based on the primary reproducing plan produced by the primary reproducing plan producing section, so as to produce a secondary reproducing plan ranging from the present time to the future;

an obtainment section to obtain the reproduction data from the storage section in accordance with the secondary reproducing plan produced by the secondary reproducing plan producing section; and an output control section to allow a predetermined output apparatus to output the reproduction data obtained by the obtainment section, wherein the optimization problem is solved by using a nonlinear programming method as a nonlinear programming problem so that a vector falls into a previously set region expressing an identifiable condition, the region located in a plane or a space that geometrically includes the vector, the vector having a linear function or a nonlinear function including at least one of a reproduction position, a reproduction speed, and reproduction acceleration by the secondary reproducing plan as an element thereof, as a constraint condition in order to minimize or maximize a predetermined value, as an objective function, and the predetermined value includes a difference between the primary reproducing plan and the secondary reproducing plan in a linear function or a nonlinear function;

wherein the reproduction data stored in the storage section includes at least sound data, the apparatus further comprising:

a judgment section to judge whether the difference between the primary reproducing plan produced by the primary reproducing plan producing section and the secondary reproducing plan produced by the secondary reproducing plan producing section is within a previously set range or not; and a sound volume adjusting section to reduce a sound volume of a sound based on the reproduction data output from the output apparatus to a previously set sound volume when the judgment section judges that the difference between the primary reproducing plan produced by the primary reproducing plan producing section and the secondary reproducing plan produced by the secondary reproducing plan producing section is not within the previously set range, or when the secondary reproducing plan producing section has not produced the secondary reproducing plan satisfying the constraint condition.

9. The reproducing apparatus according to claim 8, wherein the predetermined value includes a magnitude of the reproduction acceleration by the secondary reproducing plan.

10. The reproducing apparatus according to claim 8, wherein the reproduction data stored in the storage section includes at least sound data, the apparatus further comprising:

a silent interval judging section to judge whether the reproduction data obtained by the obtainment section is reproduction data in a silent interval, wherein the secondary reproducing plan producing section produces the secondary reproducing plan under a condition having more moderated restriction than the constraint condition based on the primary reproducing plan produced by the primary reproducing plan producing section when the silent interval judging section judges that the reproduction data obtained by the obtainment section is the reproduction data in the silent interval.

11. The reproducing apparatus according to claim 8, wherein the reproduction data stored in the storage section includes at least sound data, the apparatus further comprising:

a sound interval judging section to judge whether the reproduction data obtained by the obtainment section is reproduction data in a sound interval or not, wherein the secondary reproducing plan producing section produces the secondary reproducing plan under a condition having more moderated restriction than the constraint condition based on the primary reproducing plan produced by the primary reproducing plan producing section when the sound interval judging section judges that the reproduction data obtained by the obtainment section is not the reproduction data in the sound interval.

12. The reproducing apparatus according to claim 8, wherein the reproduction data stored in the storage section includes at least sound data, the apparatus further comprising:

a speech speed estimating section to estimate a speech speed of a sound based on the reproduction data obtained by the obtainment section, wherein the secondary reproducing plan producing section changes the constraint condition according to the speech speed estimated by the speech speed estimating section.

13. The reproducing apparatus according to claim 8, wherein the reproduction data stored in the storage section is composed of sound data and image data, and the predetermined value includes a difference between the reproduction position of the sound data by the secondary reproducing plan and the reproduction position of the image data by the secondary reproducing plan.

14. A reproducing apparatus to reproduce reproduction data at a speed different from a speed at a time of recording of the reproduction data when the reproduction data is reproduced, the recording apparatus comprising:
- a storage section to store the reproduction data;
- an instruction section to instruct the reproduction speed of the reproduction data stored in the storage section;
- a primary reproducing plan producing section to produce a primary reproducing plan ranging from present time to future, according to the reproduction speed instructed by the instruction section;
- a secondary reproducing plan producing section to produce a secondary reproducing plan ranging from the present time to the future, in which the secondary reproducing plan is produced by modifying the primary reproducing plan and is based on the primary reproducing plan produced by the primary reproducing plan producing section;
- an obtainment section to obtain the reproduction data from the storage section in accordance with the secondary reproducing plan produced by the secondary reproducing plan producing section; and
- an output control section to allow a predetermined output apparatus to output the reproduction data obtained by the obtainment section, wherein
- the secondary reproducing plan producing section produces the secondary reproducing plan, where: a vector satisfies a constraint condition that the vector falls in a previously set region expressing an identifiable condition, the region located in a plane or a space that geometrically includes the vector, the vector having at least one linear combination of a reproduction position, the reproduction speed, and a reproduction acceleration by the secondary reproducing plan as an element thereof; the secondary reproducing plan is to minimize or maximize a predetermined value; and the reproduction acceleration is within a predetermined range and is constant in a previously set time interval, and
- the predetermined value includes a difference between the primary reproducing plan and the secondary reproducing plan;
- wherein the reproduction data stored in the storage section includes at least sound data, the apparatus further comprising:
- a judgment section to judge whether the difference between the primary reproducing plan produced by the primary reproducing plan producing section and the secondary reproducing plan produced by the secondary reproducing plan producing section is within a previously set regulated range or not; and
- a sound volume adjusting section to reduce a sound volume of a sound based on the reproduction data output from the output apparatus to a previously set sound volume when the judgment section judges that the difference between the primary reproducing plan produced by the primary reproducing plan producing section and the secondary reproducing plan produced by the secondary reproducing plan producing section is not within the previously set regulated range, or when the secondary reproducing plan producing section has not produced the secondary reproducing plan satisfying the constraint condition.

15. The reproducing apparatus according to claim 14, wherein the predetermined value includes a magnitude of the reproduction acceleration by the secondary reproducing plan.

16. The reproducing apparatus according to claim 14, wherein the reproduction data stored in the storage section includes at least sound data, the apparatus further comprising:
- a silent interval judging section to judge whether the reproduction data obtained by the obtainment section is reproduction data in a silent interval, wherein
- the secondary reproducing plan producing section produces the secondary reproducing plan under a condition having more moderated restriction than the constraint condition based on the primary reproducing plan produced by the primary reproducing plan producing section when the silent interval judging section judges that the reproduction data obtained by the obtainment section is the reproduction data in the silent interval.

17. The reproducing apparatus according to claim 14, wherein the reproduction data stored in the storage section includes at least sound data, the apparatus further comprising:
- a sound interval judging section to judge whether the reproduction data obtained by the obtainment section is reproduction data in a sound interval or not, wherein
- the secondary reproducing plan producing section produces the secondary reproducing plan under a condition having more moderated restriction than the constraint condition based on the primary reproducing plan produced by the primary reproducing plan producing section when the sound interval judging section judges that the reproduction data obtained by the obtainment section is not the reproduction data in the sound interval.

18. The reproducing apparatus according to claim 14, wherein the reproduction data stored in the storage section includes at least sound data, the apparatus further comprising:
- a speech speed estimating section to estimate a speech speed of a sound based on the reproduction data obtained by the obtainment section, wherein
- the secondary reproducing plan producing section changes the constraint condition according to the speech speed estimated by the speech speed estimating section.

19. The reproducing apparatus according to claim 14, wherein
- the reproduction data stored in the storage section is composed of sound data and image data, and
- the predetermined value includes a difference between the reproduction position of the sound data by the secondary reproducing plan and the reproduction position of the image data by the secondary reproducing plan.

20. A reproducing apparatus to reproduce reproduction data at a speed different from a speed at a time of recording of the reproduction data, the reproduction data composed of sound data, the recording apparatus comprising:
- a storage section to store the reproduction data;
- an instruction section to instruct the reproduction speed of the reproduction data stored in the storage section;
- a primary reproducing plan producing section to produce a primary reproducing plan ranging from present time to future, according to the reproduction speed instructed by the instruction section;
- a secondary reproducing plan producing section to modify the primary reproducing plan by solving an optimization problem based on the primary reproducing plan produced by the primary reproducing plan producing section, so as to produce a secondary reproducing plan ranging from the present time to the future;
- an obtainment section to obtain the reproduction data from the storage section in accordance with the secondary reproducing plan produced by the secondary reproducing plan producing section;

a time scale modification section to modify a time scale of the reproduction data in consideration of a coincidence factor of a waveform of the reproduction data obtained by the obtainment section; and an output control section to allow a predetermined output apparatus to output the reproduction data, wherein the time scale of the reproduction data is modified by the time scale modification section, wherein the optimization problem is solved by using a linear programming method as a linear programming problem so that a vector falls into a previously set region expressing an identifiable condition in a plane that geometrically includes the vector, the vector having a linear combination of a reproduction position by the secondary reproducing plan as an element thereof, as a constraint condition in order to minimize a sum of a difference between the primary reproducing plan and the secondary reproducing plan and a magnitude of reproduction acceleration by the secondary reproducing plan, as an objective function;

wherein the reproduction data stored in the storage section includes at least sound data, the apparatus further comprising:

a judgment section to judge whether the difference between the primary reproducing plan produced by the primary reproducing plan producing section and the secondary reproducing plan produced by the secondary reproducing plan producing section is within a previously set range or not; and a sound volume adjusting section to reduce a sound volume of a sound based on the reproduction data output from the output apparatus to a previously set sound volume when the judgment section judges that the difference between the primary reproducing plan produced by the primary reproducing plan producing section and the secondary reproducing plan produced by the secondary reproducing plan producing section is not within the previously set range, or when the secondary reproducing plan producing section has not produced the secondary reproducing plan satisfying the constraint condition.

* * * * *